(12) United States Patent
Flynn

(10) Patent No.: US 8,706,968 B2
(45) Date of Patent: Apr. 22, 2014

(54) APPARATUS, SYSTEM, AND METHOD FOR REDUNDANT WRITE CACHING

(75) Inventor: David Flynn, Sandy, UT (US)

(73) Assignee: Fusion-io, Inc., Salt Lake City, UT (US)

( * ) Notice: Subject to any disclaimer, the term of this patent is extended or adjusted under 35 U.S.C. 154(b) by 928 days.

(21) Appl. No.: 12/847,952

(22) Filed: Jul. 30, 2010

(65) Prior Publication Data

US 2011/0022801 A1    Jan. 27, 2011

Related U.S. Application Data

(63) Continuation-in-part of application No. 11/952,123, filed on Dec. 6, 2007, now Pat. No. 8,019,938.

(60) Provisional application No. 61/240,573, filed on Sep. 8, 2009.

(51) Int. Cl.
*G06F 12/06* (2006.01)

(52) U.S. Cl.
USPC .... 711/120; 711/122; 711/162; 711/E12.024; 714/E11.101

(58) Field of Classification Search
USPC .......... 711/103, 170, E12.002, 122, 120, 162, 711/E12.024, E12.021; 714/E11.101, E11.1
See application file for complete search history.

(56) References Cited

U.S. PATENT DOCUMENTS

| | | |
|---|---|---|
| 4,571,674 A | 2/1986 | Hartung |
| 4,980,861 A | 12/1990 | Herdt et al. |
| 5,261,068 A | 11/1993 | Gaskins et al. |
| 5,291,496 A | 3/1994 | Andaleon et al. |
| 5,307,497 A | 4/1994 | Feigenbaum et al. |
| 5,313,475 A | 5/1994 | Cromer et al. |
| 5,325,509 A | 6/1994 | Lautzenheiser |
| 5,392,427 A | 2/1995 | Barrett et al. |
| 5,404,485 A | 4/1995 | Ban |
| 5,438,671 A | 8/1995 | Miles |

(Continued)

FOREIGN PATENT DOCUMENTS

| | | |
|---|---|---|
| EP | 1100001 | 5/2001 |
| EP | 1418502 | 5/2004 |

(Continued)

OTHER PUBLICATIONS

"Hamming Codes for NAND Flash Memory Devices", Micron TN-29-08: Technical Note, 2005, pp. 7, Boise, Idaho, US.

(Continued)

*Primary Examiner* — Pierre-Michel Bataille
(74) *Attorney, Agent, or Firm* — Kenneth E. Horton; Kirton McConkie

(57) ABSTRACT

An apparatus, system, and method are disclosed for redundant write caching. The apparatus, system, and method are provided with a plurality of modules including a write request module, a first cache write module, a second cache write module, and a trim module. The write request module detects a write request to store data on a storage device. The first cache write module writes data of the write request to a first cache. The second cache write module writes the data to a second cache. The trim module trims the data from one of the first cache and the second cache in response to an indicator that the storage device stores the data. The data remains available in the other of the first cache and the second cache to service read requests.

20 Claims, 12 Drawing Sheets

(56) References Cited

U.S. PATENT DOCUMENTS

| | | |
|---|---|---|
| 5,469,555 A | 11/1995 | Ghosh et al. |
| 5,499,354 A | 3/1996 | Aschoff et al. |
| 5,504,882 A | 4/1996 | Chai |
| 5,551,003 A | 8/1996 | Mattson et al. |
| 5,559,988 A | 9/1996 | Durante et al. |
| 5,586,291 A | 12/1996 | Lasker et al. |
| 5,594,883 A | 1/1997 | Pricer |
| 5,596,736 A | 1/1997 | Kems |
| 5,603,001 A | 2/1997 | Sukegawa et al. |
| 5,680,579 A | 10/1997 | Young et al. |
| 5,701,434 A | 12/1997 | Nakagawa |
| 5,734,861 A | 3/1998 | Cohn et al. |
| 5,745,671 A | 4/1998 | Hodges |
| 5,745,792 A | 4/1998 | Jost |
| 5,754,563 A | 5/1998 | White |
| 5,787,486 A | 7/1998 | Chin et al. |
| 5,797,022 A | 8/1998 | Shimotono et al. |
| 5,809,527 A | 9/1998 | Cooper et al. |
| 5,809,543 A | 9/1998 | Byers et al. |
| 5,822,759 A | 10/1998 | Treynor |
| 5,835,935 A | 11/1998 | Estakhri et al. |
| 5,845,313 A | 12/1998 | Estakhri et al. |
| 5,845,329 A | 12/1998 | Onishi et al. |
| 5,860,083 A | 1/1999 | Sukegawa |
| 5,893,138 A | 4/1999 | Judd et al. |
| 5,907,856 A | 5/1999 | Estakhri et al. |
| 5,924,113 A | 7/1999 | Estakhri et al. |
| 5,930,815 A | 7/1999 | Estakhri et al. |
| 5,960,462 A | 9/1999 | Solomon et al. |
| 5,961,660 A | 10/1999 | Capps, Jr. et al. |
| 6,000,019 A | 12/1999 | Dykstal et al. |
| 6,061,511 A | 5/2000 | Marantz et al. |
| 6,073,232 A | 6/2000 | Kroeker et al. |
| 6,101,601 A | 8/2000 | Mathews et al. |
| 6,105,076 A | 8/2000 | Beardsley et al. |
| 6,128,695 A | 10/2000 | Estakhri et al. |
| 6,141,249 A | 10/2000 | Estakhri et al. |
| 6,145,051 A | 11/2000 | Estakhri et al. |
| 6,170,039 B1 | 1/2001 | Kishida |
| 6,170,047 B1 | 1/2001 | Dye |
| 6,172,906 B1 | 1/2001 | Estakhri et al. |
| 6,173,381 B1 | 1/2001 | Dye |
| 6,185,654 B1 | 2/2001 | Van Doren |
| 6,209,088 B1 | 3/2001 | Reneris |
| 6,223,308 B1 | 4/2001 | Estakhri et al. |
| 6,230,234 B1 | 5/2001 | Estakhri et al. |
| 6,240,040 B1 | 5/2001 | Akaogi et al. |
| 6,278,633 B1 | 8/2001 | Wong et al. |
| 6,279,069 B1 | 8/2001 | Robinson et al. |
| 6,289,413 B1 | 9/2001 | Rogers et al. |
| 6,330,688 B1 | 12/2001 | Brown |
| 6,334,173 B1 | 12/2001 | Won et al. |
| 6,356,986 B1 | 3/2002 | Solomon et al. |
| 6,370,631 B1 | 4/2002 | Dye |
| 6,385,710 B1 | 5/2002 | Goldman et al. |
| 6,393,513 B2 | 5/2002 | Estakhri et al. |
| 6,404,647 B1 | 6/2002 | Minne |
| 6,412,080 B1 | 6/2002 | Fleming et al. |
| 6,418,478 B1 | 7/2002 | Ignatius et al. |
| 6,418,509 B1 | 7/2002 | Yanai et al. |
| 6,424,872 B1 | 7/2002 | Glanzer et al. |
| 6,477,617 B1 | 11/2002 | Golding |
| 6,515,928 B2 | 2/2003 | Sato et al. |
| 6,516,380 B2 | 2/2003 | Kenchammana-Hoskote |
| 6,519,185 B2 | 2/2003 | Harari et al. |
| 6,523,102 B1 | 2/2003 | Dye et al. |
| 6,552,955 B1 | 4/2003 | Miki |
| 6,567,889 B1 | 5/2003 | DeKoning |
| 6,587,915 B1 | 7/2003 | Kim |
| 6,601,211 B1 | 7/2003 | Norman |
| 6,608,793 B2 | 8/2003 | Park et al. |
| 6,625,685 B1 | 9/2003 | Cho et al. |
| 6,633,956 B1 | 10/2003 | Mitani |
| 6,671,757 B1 | 12/2003 | Multer et al. |
| 6,675,349 B1 | 1/2004 | Chen |
| 6,710,901 B2 | 3/2004 | Pastor |
| 6,715,046 B1 | 3/2004 | Shoham et al. |
| 6,728,851 B1 | 4/2004 | Estakhri et al. |
| 6,735,546 B2 | 5/2004 | Scheuerlein |
| 6,745,292 B1 | 6/2004 | Stevens |
| 6,751,155 B2 | 6/2004 | Gorobets |
| 6,754,774 B2 | 6/2004 | Gruner et al. |
| 6,754,800 B2 | 6/2004 | Wong et al. |
| 6,757,800 B1 | 6/2004 | Estakhri et al. |
| 6,760,806 B2 | 7/2004 | Jeon |
| 6,775,185 B2 | 8/2004 | Fujisawa et al. |
| 6,779,088 B1 | 8/2004 | Benveniste et al. |
| 6,785,776 B2 | 8/2004 | Arimilli et al. |
| 6,785,785 B2 | 8/2004 | Piccirillo et al. |
| 6,801,979 B1 | 10/2004 | Estakhri et al. |
| 6,804,755 B2 | 10/2004 | Selkirk et al. |
| 6,816,917 B2 | 11/2004 | Dicorpo et al. |
| 6,839,819 B2 | 1/2005 | Martin |
| 6,845,053 B2 | 1/2005 | Chevallier |
| 6,845,428 B1 | 1/2005 | Kedem |
| 6,871,257 B2 | 3/2005 | Conley et al. |
| 6,877,076 B1 | 4/2005 | Cho et al. |
| 6,880,049 B2 | 4/2005 | Gruner et al. |
| 6,883,068 B2 | 4/2005 | Tsirgotis et al. |
| 6,883,069 B2 | 4/2005 | Yoshida |
| 6,883,079 B1 | 4/2005 | Priborsky |
| 6,910,170 B2 | 6/2005 | Choi et al. |
| 6,912,537 B2 | 6/2005 | Selkirk et al. |
| 6,912,618 B2 | 6/2005 | Estakhri et al. |
| 6,922,754 B2 | 7/2005 | Liu et al. |
| 6,928,505 B1 | 8/2005 | Klingman |
| 6,938,133 B2 | 8/2005 | Johnson et al. |
| 6,977,599 B2 | 12/2005 | Widmer |
| 6,978,342 B1 | 12/2005 | Estakhri et al. |
| 6,981,070 B1 | 12/2005 | Luk et al. |
| 6,996,676 B2 | 2/2006 | Megiddo |
| 7,010,652 B2 | 3/2006 | Piccirillo et al. |
| 7,010,663 B2 | 3/2006 | George et al. |
| 7,013,376 B2 | 3/2006 | Hooper, III |
| 7,013,379 B1 | 3/2006 | Testardi |
| 7,043,599 B1 | 5/2006 | Ware et al. |
| 7,047,366 B1 | 5/2006 | Ezra |
| 7,050,337 B2 | 5/2006 | Iwase et al. |
| 7,057,936 B2 | 6/2006 | Yaegashi et al. |
| 7,058,769 B1 | 6/2006 | Danilak |
| 7,069,380 B2 | 6/2006 | Ogawa et al. |
| 7,076,723 B2 | 7/2006 | Saliba |
| 7,089,391 B2 | 8/2006 | Geiger et al. |
| 7,096,321 B2 | 8/2006 | Modha |
| 7,111,140 B2 | 9/2006 | Estakhri et al. |
| 7,130,956 B2 | 10/2006 | Rao |
| 7,130,957 B2 | 10/2006 | Rao |
| 7,143,228 B2 | 11/2006 | Lida et al. |
| 7,149,947 B1 | 12/2006 | MacLellan et al. |
| 7,162,571 B2 | 1/2007 | Kilian et al. |
| 7,165,144 B2 * | 1/2007 | Choubal et al. ............... 711/118 |
| 7,167,944 B1 | 1/2007 | Estakhri |
| 7,167,953 B2 | 1/2007 | Megiddo |
| 7,177,197 B2 | 2/2007 | Cernea |
| 7,178,081 B2 | 2/2007 | Lee et al. |
| 7,181,572 B2 | 2/2007 | Walmsley |
| 7,194,577 B2 | 3/2007 | Johnson et al. |
| 7,197,657 B1 | 3/2007 | Tobias |
| 7,203,815 B2 | 4/2007 | Haswell |
| 7,219,197 B2 | 5/2007 | Hatakeyama |
| 7,219,238 B2 | 5/2007 | Saito et al. |
| 7,227,777 B2 | 6/2007 | Roohparvar |
| 7,234,082 B2 | 6/2007 | Lai et al. |
| 7,237,141 B2 | 6/2007 | Fredin |
| 7,243,203 B2 | 7/2007 | Scheuerlein |
| 7,246,179 B2 | 7/2007 | Camara |
| 7,248,691 B1 | 7/2007 | Pandit et al. |
| 7,257,129 B2 | 8/2007 | Lee et al. |
| 7,263,591 B2 | 8/2007 | Estakhri et al. |
| 7,280,536 B2 | 10/2007 | Testardi |
| 7,293,196 B2 * | 11/2007 | Hicken et al. ............... 711/120 |
| 7,305,520 B2 | 12/2007 | Voigt |
| 7,337,201 B1 | 2/2008 | Yellin et al. |
| 7,340,558 B2 | 3/2008 | Lee et al. |

(56) References Cited

U.S. PATENT DOCUMENTS

| | | |
|---|---|---|
| 7,340,566 B2 | 3/2008 | Voth |
| 7,340,581 B2 | 3/2008 | Gorobets et al. |
| 7,356,651 B2 | 4/2008 | Liu et al. |
| 7,360,015 B2 | 4/2008 | Mathews et al. |
| 7,360,037 B2 | 4/2008 | Higaki et al. |
| 7,366,808 B2 | 4/2008 | Kano et al. |
| 7,370,163 B2 | 5/2008 | Yang et al. |
| 7,424,593 B2 | 9/2008 | Estakhri et al. |
| 7,437,510 B2 | 10/2008 | Rosenbluth et al. |
| 7,441,081 B2 | 10/2008 | Humlicek |
| 7,441,090 B2 | 10/2008 | Estakhri et al. |
| 7,447,847 B2 | 11/2008 | Louie et al. |
| 7,450,420 B2 | 11/2008 | Sinclair |
| 7,460,432 B2 | 12/2008 | Warner |
| 7,463,521 B2 | 12/2008 | Li |
| 7,480,766 B2 | 1/2009 | Gorobets |
| 7,487,235 B2 | 2/2009 | Andrews et al. |
| 7,487,320 B2 | 2/2009 | Bansai |
| 7,500,000 B2 | 3/2009 | Groves et al. |
| 7,523,249 B1 | 4/2009 | Estakhri et al. |
| 7,529,905 B2 | 5/2009 | Sinclair |
| 7,536,491 B2 | 5/2009 | Kano et al. |
| 7,549,013 B2 | 6/2009 | Estakhri et al. |
| 7,552,271 B2 | 6/2009 | Sinclair |
| 7,580,287 B2 | 8/2009 | Aritome |
| 7,631,138 B2 | 12/2009 | Gonzalez et al. |
| 7,640,390 B2 | 12/2009 | Iwamura et al. |
| 7,644,239 B2 | 1/2010 | Ergan |
| 7,660,911 B2 | 2/2010 | McDaniel |
| 7,689,803 B2 | 3/2010 | Karr et al. |
| 7,725,628 B1 | 5/2010 | Phan |
| 7,725,661 B2 | 5/2010 | Liu et al. |
| 7,856,528 B1 | 12/2010 | Frost et al. |
| 7,873,782 B2 | 1/2011 | Terry |
| 7,908,501 B2 | 3/2011 | Kim et al. |
| 8,234,450 B2 * | 7/2012 | Glover et al. ............ 711/122 |
| 2002/0053009 A1 | 5/2002 | Selkirk et al. |
| 2002/0069317 A1 | 6/2002 | Chow et al. |
| 2002/0069318 A1 | 6/2002 | Chow et al. |
| 2002/0194451 A1 | 12/2002 | Mukaida et al. |
| 2003/0061296 A1 | 3/2003 | Craddock et al. |
| 2003/0070034 A1 | 4/2003 | Friedmann et al. |
| 2003/0093741 A1 | 5/2003 | Argon et al. |
| 2003/0131182 A1 | 7/2003 | Kumar et al. |
| 2003/0163630 A1 | 8/2003 | Aasheim et al. |
| 2003/0163633 A1 | 8/2003 | Aasheim |
| 2003/0163663 A1 | 8/2003 | Aasheim et al. |
| 2003/0198084 A1 | 10/2003 | Fujisawa et al. |
| 2004/0059870 A1 | 3/2004 | Ash |
| 2004/0064647 A1 | 4/2004 | DeWhitt et al. |
| 2004/0093463 A1 | 5/2004 | Shang |
| 2004/0186946 A1 | 9/2004 | Lee |
| 2004/0268359 A1 | 12/2004 | Hanes |
| 2005/0002263 A1 | 1/2005 | Iwase et al. |
| 2005/0015539 A1 | 1/2005 | Horii |
| 2005/0018527 A1 | 1/2005 | Gorobets |
| 2005/0027951 A1 | 2/2005 | Piccirillo et al. |
| 2005/0055497 A1 | 3/2005 | Estakhri et al. |
| 2005/0076107 A1 | 4/2005 | Goud et al. |
| 2005/0132259 A1 | 6/2005 | Emmot et al. |
| 2005/0144361 A1 | 6/2005 | Gonzales et al. |
| 2005/0149618 A1 | 7/2005 | Cheng |
| 2005/0149819 A1 | 7/2005 | Hwang |
| 2005/0177672 A1 | 8/2005 | Rao |
| 2005/0177687 A1 | 8/2005 | Rao |
| 2005/0193166 A1 | 9/2005 | Johnson et al. |
| 2005/0229090 A1 | 10/2005 | Shen et al. |
| 2005/0235132 A1 | 10/2005 | Karr et al. |
| 2005/0240713 A1 | 10/2005 | Wu |
| 2005/0246510 A1 | 11/2005 | Retnamma et al. |
| 2005/0257213 A1 | 11/2005 | Chu et al. |
| 2005/0276092 A1 | 12/2005 | Hansen et al. |
| 2006/0004955 A1 | 1/2006 | Ware et al. |
| 2006/0026339 A1 | 2/2006 | Rostampour |
| 2006/0059326 A1 | 3/2006 | Aasheim |
| 2006/0064556 A1 | 3/2006 | Aasheim et al. |
| 2006/0075057 A1 | 4/2006 | Gildea et al. |
| 2006/0090048 A1 | 4/2006 | Okumoto et al. |
| 2006/0106968 A1 | 5/2006 | Wooi Teoh |
| 2006/0106990 A1 | 5/2006 | Benhase et al. |
| 2006/0143396 A1 | 6/2006 | Cabot |
| 2006/0152981 A1 | 7/2006 | Ryu |
| 2006/0184736 A1 | 8/2006 | Benhase et al. |
| 2006/0224849 A1 | 10/2006 | Rezaul Islam et al. |
| 2006/0230295 A1 | 10/2006 | Schumacher et al. |
| 2006/0248387 A1 | 11/2006 | Nicholson |
| 2006/0265624 A1 | 11/2006 | Moshayedi |
| 2007/0016699 A1 | 1/2007 | Minami |
| 2007/0050571 A1 | 3/2007 | Nakamura et al. |
| 2007/0118676 A1 | 5/2007 | Kano et al. |
| 2007/0124474 A1 | 5/2007 | Margulis |
| 2007/0124540 A1 | 5/2007 | van Riel |
| 2007/0150689 A1 | 6/2007 | Pandit |
| 2007/0162830 A1 | 7/2007 | Stek et al. |
| 2007/0198770 A1 | 8/2007 | Horii et al. |
| 2007/0204128 A1 | 8/2007 | Lee et al. |
| 2007/0204197 A1 | 8/2007 | Yokokawa |
| 2007/0230253 A1 | 10/2007 | Kim |
| 2007/0233455 A1 | 10/2007 | Zimmer et al. |
| 2007/0233937 A1 | 10/2007 | Coulson et al. |
| 2007/0233938 A1 | 10/2007 | Cho et al. |
| 2007/0234021 A1 | 10/2007 | Ruberg et al. |
| 2007/0245094 A1 | 10/2007 | Lee et al. |
| 2007/0245217 A1 | 10/2007 | Valle |
| 2007/0250660 A1 | 10/2007 | Gill |
| 2007/0271468 A1 | 11/2007 | McKenney et al. |
| 2007/0271572 A1 | 11/2007 | Gupta et al. |
| 2007/0274150 A1 | 11/2007 | Gorobets |
| 2007/0276897 A1 | 11/2007 | Tameshige et al. |
| 2007/0300008 A1 | 12/2007 | Rogers |
| 2008/0005748 A1 | 1/2008 | Mathew et al. |
| 2008/0010395 A1 | 1/2008 | Mylly et al. |
| 2008/0016301 A1 | 1/2008 | Chen |
| 2008/0043769 A1 | 2/2008 | Hirai |
| 2008/0052483 A1 | 2/2008 | Rangarajan et al. |
| 2008/0059752 A1 | 3/2008 | Serizawa |
| 2008/0059820 A1 | 3/2008 | Vaden et al. |
| 2008/0080243 A1 | 4/2008 | Edahiro et al. |
| 2008/0091876 A1 | 4/2008 | Fujibayashi et al. |
| 2008/0098159 A1 | 4/2008 | Song et al. |
| 2008/0104344 A1 | 5/2008 | Shimozono et al. |
| 2008/0117686 A1 | 5/2008 | Yamada |
| 2008/0120303 A1 | 5/2008 | Selkirk et al. |
| 2008/0120469 A1 | 5/2008 | Komegay |
| 2008/0123211 A1 | 5/2008 | Chng et al. |
| 2008/0126700 A1 | 5/2008 | El-Batal et al. |
| 2008/0126852 A1 | 5/2008 | Brandyberry et al. |
| 2008/0133963 A1 | 6/2008 | Katano et al. |
| 2008/0137658 A1 | 6/2008 | Wang |
| 2008/0140819 A1 | 6/2008 | Bailey et al. |
| 2008/0183965 A1 | 7/2008 | Shiga et al. |
| 2008/0195801 A1 | 8/2008 | Cheon et al. |
| 2008/0201535 A1 | 8/2008 | Hara |
| 2008/0205286 A1 | 8/2008 | Li et al. |
| 2008/0209090 A1 | 8/2008 | Kano et al. |
| 2008/0229046 A1 | 9/2008 | Raciborski |
| 2008/0235443 A1 | 9/2008 | Chow et al. |
| 2008/0266973 A1 | 10/2008 | Sekar et al. |
| 2008/0276040 A1 | 11/2008 | Moritoki |
| 2008/0294847 A1 | 11/2008 | Maruyama et al. |
| 2008/0313364 A1 | 12/2008 | Flynn |
| 2009/0043952 A1 | 2/2009 | Estakhri et al. |
| 2009/0070541 A1 | 3/2009 | Yochai |
| 2009/0083478 A1 | 3/2009 | Kunimatsu et al. |
| 2009/0083485 A1 | 3/2009 | Cheng |
| 2009/0089485 A1 | 4/2009 | Yeh |
| 2009/0089518 A1 | 4/2009 | Hobbet |
| 2009/0091996 A1 | 4/2009 | Chen et al. |
| 2009/0125650 A1 | 5/2009 | Sebire |
| 2009/0144496 A1 | 6/2009 | Kawaguchi |
| 2009/0150605 A1 | 6/2009 | Flynn et al. |
| 2009/0150621 A1 | 6/2009 | Lee |
| 2009/0157956 A1 | 6/2009 | Kano |
| 2009/0204750 A1 | 8/2009 | Estakhri et al. |

(56) References Cited

U.S. PATENT DOCUMENTS

| | | |
|---|---|---|
| 2009/0228637 A1 | 9/2009 | Moon et al. |
| 2009/0235017 A1 | 9/2009 | Estakhri et al. |
| 2009/0276654 A1 | 11/2009 | Butterworth et al. |
| 2009/0300277 A1 | 12/2009 | Jeddeloh |
| 2009/0313453 A1 | 12/2009 | Stefanus et al. |
| 2009/0327602 A1 | 12/2009 | Moore et al. |
| 2009/0327804 A1 | 12/2009 | Moshayedi |
| 2010/0017556 A1 | 1/2010 | Chin et al. |
| 2010/0023674 A1 | 1/2010 | Aviles |
| 2010/0023676 A1 | 1/2010 | Moon et al. |
| 2010/0023682 A1 | 1/2010 | Lee et al. |
| 2010/0030946 A1 | 2/2010 | Kano et al. |
| 2010/0077194 A1 | 3/2010 | Zhao et al. |
| 2010/0102999 A1 | 4/2010 | Lee et al. |
| 2010/0106917 A1 | 4/2010 | Ruberg et al. |

FOREIGN PATENT DOCUMENTS

| | | |
|---|---|---|
| EP | 1814039 | 8/2007 |
| GB | 0123416 | 11/2002 |
| JP | 04-242848 | 8/1992 |
| JP | 08-153014 | 6/1996 |
| JP | 2000259525 | 9/2000 |
| JP | 2009122850 | 6/2009 |
| KR | 2010022811 | 3/2010 |
| WO | 9419746 | 9/1994 |
| WO | 9518407 | 7/1995 |
| WO | 9612225 | 4/1996 |
| WO | 0131512 | 5/2001 |
| WO | 0201365 | 1/2002 |
| WO | 2008070173 | 6/2008 |
| WO | 2008073421 | 6/2008 |
| WO | 2010036757 | 4/2010 |

OTHER PUBLICATIONS

The Advantages of Object-Based Storage—Secure, Scalable, Dynamic Storage Devices, Seagate Research Technology Paper, Apr. 2005, pp. 7, Scotts Valley, California, US.

Wacha, Rosie, "Improving RAID-Based Storage Systems with Flash Memory", First Annual ISSDM/SRL Research Symposium, Oct. 20-21, 2009, pp. 21.

Wang, Feng, "OBFS: A File System for Object-based Storage Devices", 21st IEEE/12th NASA Goddard Conference on Mass Storage Systems and Technologies, Apr. 2004, pp. 18, College Park, Maryland, US.

U.S. Appl. No. 11/952,123, Notice of Allowance, May 5, 2011.

"DataDirect Storaage Systems Selected for NCSA Cluster", HPCWire, Aug. 15, 2003, pp. 2, vol. 12, No. 32, http://www.hpcwire.com/hpcwire/hpcwireWWW/03/0815/105731.html.

"Introducing Box Hill's Fibre Box", Box Hill Systems Corporation, Jan. 16, 1997, p. 5.

"jZip A Free WinZip Alternative", First JZip by Greg Kowal, 2012.

Application No. PCT/US2012/022244, International Search Report and Written Opinion, Jul. 30, 2012.

Yerrick, Damian, "Block Device", downloaded Mar. 1, 2010, pp. 3, http://www.pineight.com/ds/block/.

Weber, Ralph O., "Information Technology—SCSI Object-Based Storage Device Commands (OSD)", Seagate Technology, Jul. 30, 2004, p. 171, Project T10/1355-D, Revision 10, Reference No. ISO/IEC 14776-391 : 200x ANSI INCITS.***200x.

Makulowich, John, "Strategies, Players and Emerging Markets", Washington Technology, Jun. 26, 1997, pp. 6, http://washingtontechnology.com/Articles/1997/06/26/Strategies-Players-and-Emerging-Ma . . . .

U.S. Appl. No. 12/885,285, Notice of Allowance, Oct. 17, 2012.

Application No. PCT/US2011/046005, International Search Report and Written Opinion, Apr. 6, 2012.

Application No. PCT/US2010/048321, International Search Report and Written Opinion, Apr. 28, 2011.

Megiddo, Nimrod, "ARC: A Self-Tuning, Low Overhead Replacement Cache", USENIX Association, Mar. 31-Apr. 2, 2003, pp. 17, Proceedings of FAST '03 2nd USENIX Conference on File and Storage Technologies.

Whyte, Barry, "IBM SAN Volume Controller 4.2.1 Cache Partitioning", Redpaper, IBM Corporation, Apr. 30, 2003, pp. 12, REDP-4426-00, Poughkeepsie, New York, US.

Stokes, Jon, "Intel's New Flash Tech to Bring Back Turbo Memory, for Real", http://arstechnica.com/hardware/news/2009/09/intels-new-flash-tech-to-b . . . .

Rosenblum, Mendel, "The Design and Implementation of a Log-structured File System", 1992.

Casey, Michael, "SAN Cache: SSD in the SAN", Computer Technology Review's Storage Inc., Quarter 1, 2000, pp. 4, SolidData, Santa Clara, California, US.

"Hynix 48-GB Flash MCP", Slashdot, pp. 17, http://hardware.slashdot.org/article.pl?sid=07/09/06/146218&from=rss.

"Sybase: Maximizing Performance through Solid State File-Caching", SolidData Best Practices Guide, May 2000, pp. 4, Santa Clara, California, US.

"Bulletproof Memory for RAID Servers, Part 1, 2, 3", Agigatech, 2009, pp. 13, http://agigatech:com/blog/bulletproof-memory-for-raid-servers.

Wu, Michael, "eNVy: A Non-Volatile, Main Memory Storage System", 1994, pp. 12, ASPLOS VI-10/94 San Jose, California, US.

IBM, "Method to Improve Reliability of SSD Arrays", Prior Art Database, Nov. 5, 2009, www.ip.com.

"Method for Fault Tolerance in Nonvolatile Storage", Prior Art Database, Feb. 3, 2005, www.ip.com.

"ioDrive—Frequently Asked Questions", Clustered Storage Solutions: Products, 2008, http://www.clusteredstorage.com/clustered_storage_solutions.html.

U.S. Appl. No. 11/952,123 Office Action, May 5, 2010.

Windows PC Accelerators, XP-002476842, Microsoft Corporation, Nov. 30, 2006, pp. 1-16.

Application No. PCT/US2007/025049, International Search Report, May 14, 2008.

Application No. PCT/US2007/025049, International Preliminary Report on Patentability, Mar. 11, 2009.

"White Paper: S2A9550 Overview", DataDirect Networks, www.datadirectnet.com, 2007, 17 pages.

"Pivot3 RAIGE Cluster: Technology Overview", White Paper, www.pivot3,com, Jun. 2007, pp. 1-17.

Plank, James S. "A Tutorial on Reed-Solomon coding for Fault Tolerance in RAID-like Systems", Dept of Computer Science, Univ. of Tennessee, Sep. 1997, pp. 995-1012.

Morgenstern, David, "Is There a Flash Memory RAID in Your Future?", Nov. 2006.

"File System Primer", http://wiki.novell.com/index.php?File_System_Primer, Jul. 2006.

Singer, Dan, "Implementing MLC NAND Flash for Cost-Effective, High-Capacity Memory", M-systems, White Paper, Sep. 2003.

"Introduction to Samsungs Linux Flash File System"—RFS, Samsung Electronics, Nov. 2006.

Mesnier, Ganger, Riedel, "Object-Based Storage", IEEE Comm Magazine, Aug. 2003.

Hensbergen, "Dynamic Policy Disk Caching for Storage Networking", Nov. 2006.

Application No. 200780050973.4, Office Action, Jan. 26, 2011.

Application No. 07867661.6, Office Action, Oct. 6, 2011.

"Design and Use Considerations for NAND Flash Memory", Micron TN-29-17:NAND Flash Memory Introduction, 2006, pp. 8, Boise, Idaho, US.

"Am29DL322D/323D/324D", Spansion Data Sheet, Oct. 7, 2004, 58 pages, Pub. No. 21534, Revision D, Amendment 7, Fujitsu.

Ismail, Ari, "Performance Boosting and Workload Isolation in Storage Area Networks with SANCache", Proceedings of the 23rd IEEE/14th NASA Goddard Conference on Mass Storage Systems and Technologies, May 2006, pp. 263-273, Hewlett Packard Laboratories.

Bandulet, Christian, "Object-Based Storage Devices", Sun Developer Network Site, Jul. 2007, http://developers.sun.com/solaris/articles/osd.html.

(56) References Cited

OTHER PUBLICATIONS

"BiTMICRO Introduces E-Disk PMC Flash Disk Module", Military & Aerospace Electronics East, 2004, http://www.bitmicro.com/press_news_releases_20040518_prt.php.

"EMC Virtual Infrastructure for Microsoft Applications—Data Center Solution Enabled by EMC Symmetrix V-Max and VMware ESX3.5", White Paper, Apr. 2009, pp. 30.

Feresten, Paul, "NETAPP Thin Provisioning: Better for Business", NETAPP White Paper, Mar. 2007, pp. 11, WP-7017-0307.

"How NTFS Works", Mar. 28, 2003, pp. 34.

"Information Technology—SCSI Object-Based Storage Device Commands (OSD)", American National Standards Institute, Jul. 30, 2004, pp. 187, Project T10/1355-D, Revision 10, New York, New York, US.

"Intel Turbo Memory with User Pinning", Intel NAND Storage Solutions, 2008, pp. 4.

Johnson, Michael K., "An Introduction to Block Device Drivers", Jan. 1, 1995, pp. 6.

Leventhal, Adam, "Flash Storage Memory", Communications of the ACM, Jul. 2008, pp. 47-51, vol. 61, No. 7.

Volos, Haris, "Mnemosyne: Lightweight Persistent Memory", ASPLOS'11, Mar. 5-11, 2011, Newport Beach, California, US.

"NAND Flash 101: An Introduction to NAND Flash and How to Design it in to Your Next Product", Micron, Nov. 2006, pp. 27, Boise, Idaho, US.

Coburn, Joel, "NV-Heaps: Making Persistent Objects Fast and Safe with Next-Generation, Non-Volatile Memories", ASPLOS'11, Mar. 5-11, 2011, pp. 13, Newport Beach, California, US.

Brandon, Daniel, "Sparse Matrices in CS Education", Consortium for Computing Sciences in Colleges, 2009, pp. 6.

Application No. PCT/US2011/047659, International Search Report and Written Opinion, Apr. 9, 2012.

* cited by examiner

800 ↘

| First Cache 102 | |
|---|---|
| Log. Add. 804 | Data 810 |
| ⋮ | ⋮ |
| 2183 804a | 1011 0001 |
| 2184 804b | 0110 1010 |
| 2185 804c | 1011 0011 |
| 2186 804d | 1100 0110 |
| 2187 804e | 0101 0100 |
| ⋮ | ⋮ |

| Second Cache 112 | |
|---|---|
| Log. Add. 804 | Data 810 |
| ⋮ | ⋮ |
| 2183 804a | 1011 0001 |
| 2184 804b | 0110 1010 |
| 2185 804c | 1011 0011 |
| 2186 804d | 1100 0110 |
| 2187 804e | 0101 0100 |
| ⋮ | ⋮ |

| First Cache 102 | |
|---|---|
| Log. Add. 804 | Data 810 |
| ⋮ | ⋮ |
| 2183 804a | ///// |
| 2184 804b | 0110 1010 |
| 2185 804c | ///// |
| 2186 804d | 1100 0110 |
| 2187 804e | 0101 0100 |
| ⋮ | ⋮ |

| Second Cache 112 | |
|---|---|
| Log. Add. 804 | Data 810 |
| ⋮ | ⋮ |
| 2183 804a | 1011 0001 |
| 2184 804b | ///// |
| 2185 804c | 1011 0011 |
| 2186 804d | ///// |
| 2187 804e | 0101 0100 |
| ⋮ | ⋮ |

FIG. 8B

APPARATUS, SYSTEM, AND METHOD FOR REDUNDANT WRITE CACHING

CROSS-REFERENCES TO RELATED APPLICATIONS

This is a continuation-in-part application of and claims priority to U.S. patent application Ser. No. 11/952,123 entitled "Apparatus, System, and Method for Solid-State Storage as Cache for High-Capacity, Non-Volatile Storage" and filed on Dec. 6, 2007 for David Flynn, et al., and U.S. Provisional Patent Application No. 61/240,573 entitled "Apparatus, System, and Method for an Improved Nonvolatile Caching Device" and filed on Sep. 8, 2009 for David Flynn, et al., which are incorporated herein by reference. U.S. patent application Ser. No. 11/952,123 is a continuation in part of and claims priority to U.S. Provisional Patent Application No. 60/873,111 filed on Dec. 6, 2006 and U.S. Provisional Patent Application No. 60/974,470 filed on Sep. 22, 2007, which are incorporated herein by reference.

FIELD

This invention relates to caching data and more particularly relates to caching write data for a data storage device.

DESCRIPTION OF THE RELATED ART

In general, caching data is advantageous because data that is accessed often or that is loaded as part of a software application or an operating system may be stored in a cache that has faster access times than a storage device that is used as a backing store with the cache. Because of the cache's faster access times, subsequent accesses can be much quicker than when the data must be accessed directly from the backing store storage device, such as a hard disk drive ("HDD"), an optical drive, tape storage, etc. Several caches are typically included in a computer device to speed data accesses for processors and other computer components.

SUMMARY OF THE INVENTION

Some computers and storage devices include data caches. Typically, caches are implemented in DRAM, making cache capacity a premium, and requiring relatively high power per performance. If power supporting a volatile cache is lost, data stored in the cache is lost. Typically, some battery backup is used to avoid data loss in case of power failure, with sufficient capability to flush the cache to non-volatile memory prior to failure of the batter backup. In addition, battery backup systems consume power, negatively impact reliability, and consume space. Batteries must also be serviced on a regular basis and battery backup can be relatively expensive.

From the foregoing discussion, it should be apparent that a need exists for a method, apparatus, and computer program product that provide write caching for a storage device. Beneficially, such a method, apparatus, and computer program product would provide advantages of data redundancy and of data striping.

The present invention has been developed in response to the present state of the art, and in particular, in response to the problems and needs in the art that have not yet been fully solved by currently available systems for caching data. Accordingly, the present invention has been developed to provide a method, apparatus, and computer program product that overcome many or all of the above-discussed shortcomings in the art.

The method of the present invention is presented for write caching. The method in the disclosed embodiments includes the steps to carry out the functions of redundant write caching. In one embodiment, the method includes detecting a write request to store data on a storage device. The method, in a further embodiment, includes writing data of the write request to a first cache. In another embodiment, the method includes mirroring the data to a second cache. In one embodiment, the method includes clearing the data from one of the first cache and the second cache in response to an indicator that the storage device stores the data. The data, in one embodiment, remains available in the other of the first cache and the second cache to service read requests.

In another embodiment, the method includes selecting one of the first cache and the second cache according to a deterministic protocol. The data, in one embodiment, is cleared in the selected one of the first cache and the second cache. The first cache and the second cache, in a further embodiment, share a logical address space that is directly mapped to distinct physical addresses on the first cache and the second cache. In one embodiment, the deterministic protocol is based on a logical address associated with the write request within the logical address space. The deterministic protocol, in a further embodiment, logically stripes data between the first cache and the second cache by alternating selection of the first cache and the second cache for consecutive logical addresses. In one embodiment, a portion of the logical address space is assigned to the first cache and a portion of the logical address space is assigned to the second cache.

The method, in one embodiment, includes directing, based on the deterministic protocol, a read request for the data to the other of the first cache and the second cache that is not selected. In another embodiment, the method includes detecting a read request to retrieve requested data from the storage device. The method, in a further embodiment, includes determining that the requested data is not stored in either of the first cache and the second cache. In one embodiment, the method includes writing the requested data to one of the first cache and the second cache according to the deterministic protocol in response to detecting that the requested data is not stored in either of the first cache and the second cache.

In one embodiment, the method includes acknowledging the write request in response to writing the data to the first cache. In another embodiment, the method includes selecting one of the first cache and the second cache based on one or more cache attributes and data is cleared in the selected one of the first cache and the second cache.

The method, in a further embodiment, includes reading the data from one of the first cache and the second cache and writing the data to the storage device. In one embodiment, the method includes setting the indicator that the storage device stores the data in response to successfully writing the data to the storage device. In one embodiment, clearing the data in one of the first cache and the second cache is performed in response to a predefined event occurring after setting the indicator that the storage device stores the data.

The method, in another embodiment, includes detecting a replacement of one of the first cache and the second cache with a replacement cache. In a further embodiment, the method includes mirroring dirty data from a remaining one of the first cache and the second cache to the replacement cache. Dirty data, in one embodiment, includes data that is not stored on the storage device.

The apparatus of the present invention is provided, in one embodiment, with a plurality of modules to substantially perform the steps of the method described above. The modules, in the described embodiments, include a write request module, a first cache write module, a second cache write module, a trim module, a cache selection module, a read request module, and a write acknowledgement module.

In one embodiment, the write request module detects a write request to store data on a storage device. In a further embodiment, the write request module receives the write request. In one embodiment, the first cache write module writes data of the write request to a first non-volatile solid-state storage cache. The second cache write module, in one embodiment, writes the data to a second non-volatile solid-state storage cache.

In one embodiment, the trim module trims the data from one of the first non-volatile solid-state storage cache and the second non-volatile solid-state storage cache in response to an indicator that the storage device stores the data. The data, in one embodiment, remains available in the other of the first non-volatile solid-state storage cache and the second non-volatile solid-state storage cache to service read requests.

In one embodiment, the cache selection module selects the first non-volatile solid-state storage cache. The trim module, in a further embodiment, trims the data from the first non-volatile solid-state storage cache in response to the cache selection module selecting the first non-volatile solid-state storage cache. In one embodiment, the read request module directs a subsequent read request for the data to the second non-volatile solid-state storage cache in response to the trim module trimming the data from the first non-volatile solid-state storage cache.

In one embodiment, the write acknowledgement module acknowledges the write request in response to both the first cache write module writing the data to the first non-volatile solid-state storage cache and the second cache write module writing the data to the second non-volatile solid-state storage cache. In a further embodiment, the write acknowledgement module acknowledges the write request in response to the first cache write module writing the data to the first non-volatile solid-state storage cache.

In one embodiment, the storage device, the first cache, and the second cache each have a block storage interface. The storage device and at least one of the first non-volatile solid-state storage cache and the second non-volatile solid-state storage cache, in one embodiment, include a direct attached storage ("DAS") device associated with a host device. The first non-volatile solid-state storage cache, in one embodiment, includes a DAS device associated with the host device and the second non-volatile solid-state storage cache includes an external device that is not directly associated with the host device.

The computer program product of the present invention includes a computer readable storage medium that stores computer usable program code executed to perform operations similar to the steps of the method above. The operations, in one embodiment, include receiving a write request to store data on a storage device. The write request, in one embodiment, includes data that is not stored on the storage device. In another embodiment, the operations include writing data of the write request to a first non-volatile solid-state storage cache. In a further embodiment, the operations include writing the data of the write request to a second non-volatile solid-state storage cache.

In one embodiment, the operations include selecting one of the first non-volatile solid-state storage cache and the second non-volatile solid-state storage cache according to a deterministic protocol. In another embodiment, the operations include trimming the data on the selected one of the first non-volatile solid-state storage cache and the second non-volatile solid-state storage cache in response to an indicator that the storage device stores the data. The data of the write request, in one embodiment, remains available in the unselected one of the first non-volatile solid-state storage cache and the second non-volatile solid-state storage cache to service read requests.

In one embodiment, the operations include determining that both the first non-volatile solid-state storage cache and the second non-volatile solid-state storage cache store the data. In another embodiment, the operations include writing the data to the storage device in response to determining that both the first non-volatile solid-state storage cache and the second non-volatile solid-state storage cache store the data. In a further embodiment, the operations include setting the indicator that the storage device stores the data in response to writing the data to the storage device.

Trimming the data, in one embodiment, includes sending a TRIM command to the selected one of the first non-volatile solid-state storage cache and the second non-volatile solid-state storage cache. The TRIM command, in one embodiment, includes an address for the data. In a further embodiment, the first non-volatile solid-state storage cache is selected in response to a value for the address for the data being odd and the second non-volatile solid-state storage cache is selected in response to a value for the address for the data being even.

In another embodiment, trimming the data includes marking the data as invalid on the selected one of the first non-volatile solid-state storage cache and the second non-volatile solid-state storage cache. The selected one of the first non-volatile solid-state storage cache and the second non-volatile solid-state storage cache, in a further embodiment, recovers storage capacity of physical storage media corresponding to the data in response to marking the data as invalid.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 8A is a schematic block diagram illustrating one embodiment of a first cache and a second cache in accordance with the present invention;

FIG. 8B is a schematic block diagram illustrating another embodiment of a first cache and a second cache in accordance with the present invention;

DETAILED DESCRIPTION OF THE INVENTION

Figure 1:
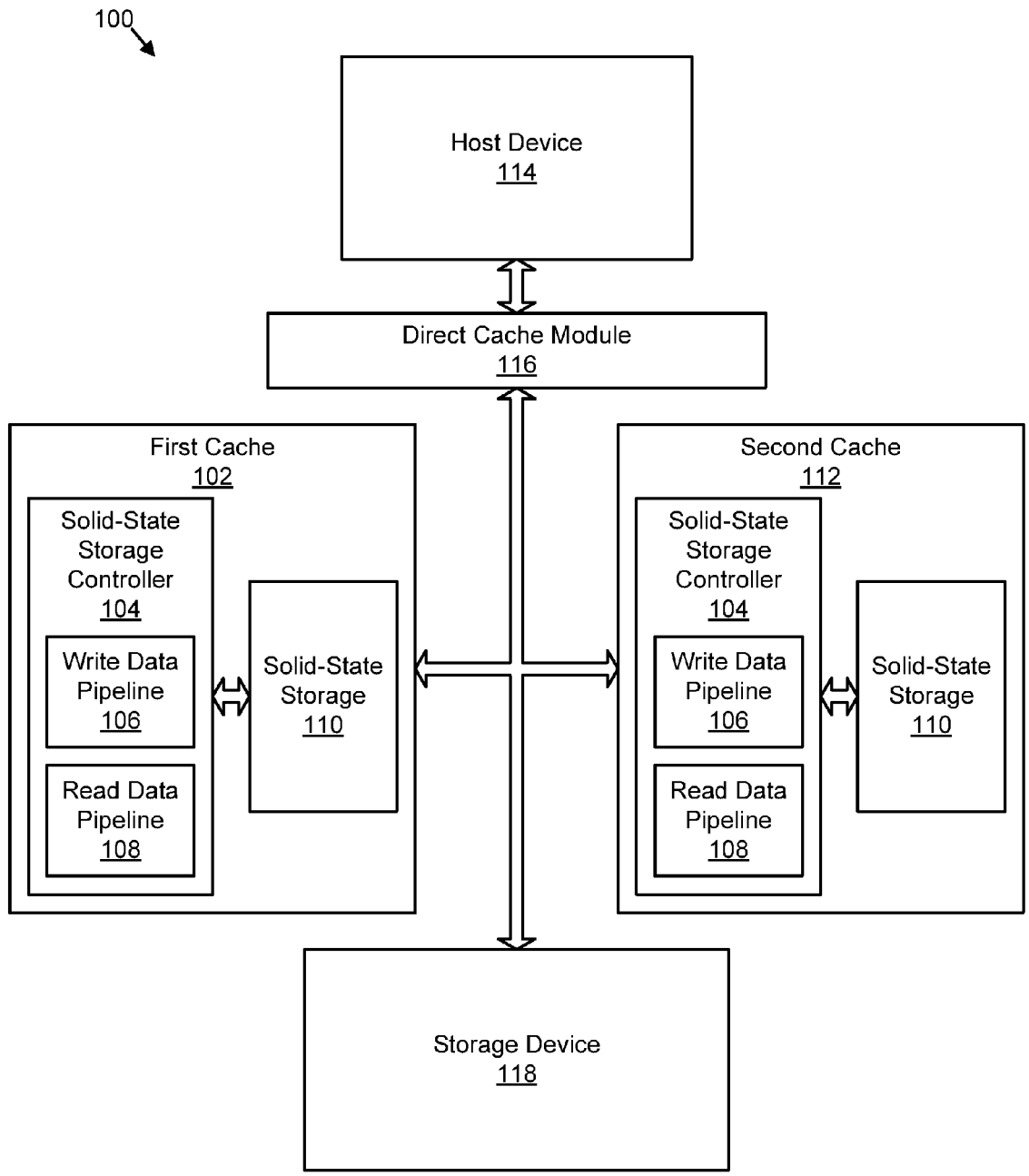
FIG. 1 is a schematic block diagram illustrating one embodiment of a system for redundant write caching in accordance with the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on or in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Caching System

FIG. 1 depicts one embodiment of a system 100 for redundant write caching in accordance with the present invention. The system 100, in the depicted embodiment, includes a first cache 102, a second cache 112, a host device 114, a direct cache module 116, and a storage device 118. The first cache 102 and the second cache 112, in the depicted embodiment, each include a solid-state storage controller 104, a write data pipeline 106, a read data pipeline 108, and a solid-state storage media 110. In general, the system 100 minors data of write requests to both the first cache 102 and the second cache 112. In one embodiment, the system 100 virtually stripes cached data across the first cache 102 and the second cache 112 once the storage device 118 stores the data. The system 100, in one embodiment, preserves the benefits of redundant caching without decreasing the available storage space in the first cache 102 and the second cache 112 by half.

In the depicted embodiment, the system 100 includes two caches 102, 112. In another embodiment, the system 100 may include more than two caches 102, 112. In general, the first cache 102 and the second cache 112 serve as read and/or write caches for the storage device 118. In the depicted embodiment, the first cache 102 and the second cache 112 are each separate data storage devices. In a further embodiment, the first cache 102 and the second cache 112 may both be part of a single data storage device. For example, the first cache 102 and the second cache 112 may be separate partitions, regions, or other sections of a single data storage device.

In the depicted embodiment, the first cache 102 and the second cache 112 are each non-volatile, solid-state storage devices, with a solid-state storage controller 104 and non-volatile, solid-state storage media 110. The non-volatile, solid-state storage media 110 may include flash memory, nano random access memory ("nano RAM or NRAM"), magneto-resistive RAM ("MRAM"), phase change RAM ("PRAM"), etc. Embodiments of the first cache 102 and the second cache 112 that include a solid-state storage controller 104 and solid-state storage media 110 are described in more detail with respect to FIGS. 2 and 3. In further embodiments, the first cache 102 and/or the second cache 112 may include other types of non-volatile and/or volatile data storage, such as dynamic RAM ("DRAM"), static RAM ("SRAM"), magnetic data storage, optical data storage, and/or other data storage technologies.

In general, the first cache 102 and the second cache 112 cache data for the storage device 118. The storage device 118, in one embodiment, is a backing store associated with the first cache 102 and the second cache 112. The storage device 118 may include a hard disk drive, an optical drive with optical media, a magnetic tape drive, or another type of storage device. In one embodiment, the storage device 118 may have a greater data storage capacity than the first cache 102 and/or the second cache 112. In another embodiment, the storage device 118 may have a higher latency, a lower throughput, or the like, than the first cache 102 and/or the second cache 112.

The storage device 118 may have a higher latency, a lower throughput, or the like due to properties of the storage device 118 itself, or due to properties of a connection to the storage device 118. For example, in one embodiment, the first cache 102, the second cache 112, and the storage device 118 may each include non-volatile, solid-state storage media 110 with similar properties, but the storage device 118 may be in communication with the host device 114 over a data network, while the first cache 102 and the second cache 112 may be directly connected to the host device 114, causing the storage device 118 to have a higher latency relative to the host 114 than the first cache 102 and the second cache 112.

In the depicted embodiment, the first cache 102, the second cache 112, and the storage device 118 are in communication with the host device 114 through the direct cache module 116. One or more of the first cache 102, the second cache 112, and the storage device 118, in one embodiment, are direct attached storage ("DAS") of the host device 114. DAS, as used herein, is data storage that is connected to a device, either internally or externally, without a storage network in between.

In one embodiment, the first cache 102, the second cache 112, and/or the storage device 118 are internal to the host device 114 and are connected using a system bus, such as a peripheral component interconnect express ("PCI-e") bus, a Serial Advanced Technology Attachment ("SATA") bus, or the like. In another embodiment, one or more of the first cache 102, the second cache 112, and the storage device 118 may be external to the host device 114 and may be connected using a universal serial bus ("USB") connection, an Institute of Electrical and Electronics Engineers ("IEEE") 1394 bus ("FireWire"), an external SATA ("eSATA") connection, or the like. In other embodiments, the first cache 102, the second cache 112, and/or the storage device 118 may be connected to the host device 114 using a peripheral component interconnect ("PCI") express bus using external electrical or optical bus extension or bus networking solution such as Infiniband or PCI Express Advanced Switching ("PCIe-AS"), or the like.

In various embodiments, the first cache 102 and/or the second cache 112 may be in the form of a dual-inline memory module ("DIMM"), a daughter card, or a micro-module. In another embodiment, the first cache 102 and/or the second cache 112 may be elements within a rack-mounted blade. In another embodiment, the first cache 102 and/or the second cache 112 may be contained within packages that are integrated directly onto a higher level assembly (e.g. mother board, lap top, graphics processor). In another embodiment, individual components comprising the first cache 102 and/or the second cache 112 are integrated directly onto a higher level assembly without intermediate packaging. In the depicted embodiment, the first cache 102 and the second cache 112 each includes one or more solid-state storage controllers 104 with a write data pipeline 106 and a read data pipeline 108 and each includes a solid-state storage media 110, which are described in more detail below with respect to FIGS. 2 and 3.

In a further embodiment, instead of being connected directly to the host device 114 as DAS, one or more of the first cache 102, the second cache 112, and the storage device 118 may be connected to the host device 114 over a data network. For example, the first cache 102, the second cache 112, and/or the storage device 118 may include a storage area network ("SAN") storage device, a network attached storage ("NAS") device, a network share, or the like. In one embodiment, the system 100 may include a data network, such as the Internet, a wide area network ("WAN"), a metropolitan area network ("MAN"), a local area network ("LAN"), a token ring, a wireless network, a fiber channel network, a SAN, a NAS, ESCON, or the like, or any combination of networks. A data network may also include a network from the IEEE 802 family of network technologies, such Ethernet, token ring, Wi-Fi, Wi-Max, and the like. A data network may include servers, switches, routers, cabling, radios, and other equipment used to facilitate networking between the host device 114 and one or more of the first cache 102, the second cache 112, and the storage device 118.

In one embodiment, at least one of the first cache 102 and the second cache 112 is connected directly to the host device 114 as a DAS device. In a further embodiment, the first cache 102 may be directly connected to the host device 114 as a DAS device and another device, such as the second cache 112 or the storage device 118, may be directly connected to the first cache 102. For example, the first cache 102 may be connected directly to the host device 114, and the second cache 112 and/or the storage device 118 may be connected directly to the first cache 102 using a direct, wire-line connection, such as a PCI express bus, an SATA bus, a USB connection, an IEEE 1394 connection, an eSATA connection, a proprietary direct connection, an external electrical or optical bus extension or bus networking solution such as Infiniband or PCIe-AS, or the like. One of skill in the art, in light of this disclosure, will recognize other arrangements and configurations of the first cache 102, the second cache 112, and the storage device 118 suitable for use in the system 100.

The system 100 includes the host device 114 in communication with the first cache 102, the second cache 112, and the storage device 118 through the direct cache module 116. A host device 114 may be a host, a server, a storage controller of a SAN, a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like.

In the depicted embodiment, the host device 114 is in communication with the direct cache module 116. The direct cache module 116, in general, receives or otherwise detects read and write requests from the host device 114 for the storage device 118 and manages the caching of data in the first cache 102 and the second cache 112. In one embodiment, the direct cache module 116 comprises a software application, file system filter driver, or the like.

The direct cache module 116, in various embodiments, may include one or more software drivers on the host device 114, one or more storage controllers, such as the solid-state storage controllers 104 of the first cache 102 and the second cache 112, a combination of one or more software drivers and storage controllers, or the like.

In one embodiment, the host device 114 loads one or more device drivers for the first cache 102, the second cache 112, and/or the storage device 118 and the direct cache module 116 communicates with the one or more device drivers on the host device 114. In another embodiment, the direct cache module 116 may communicate directly with a hardware interface of the first cache 102, the second cache 112, and/or the storage device 118. In a further embodiment, the direct cache module 116 may be integrated with the first cache 102, the second cache 112, and/or the storage device 118.

In one embodiment, the first cache 102, the second cache 112 and/or the storage device 118 have block device interfaces that support block device commands. For example, one or more of the first cache 102, the second cache 112, and the storage device 118 may support the standard block device interface, the ATA interface standard, the ATA Packet Interface ("ATAPI") standard, the small computer system interface ("SCSI") standard, and/or the Fibre Channel standard which are maintained by the InterNational Committee for Information Technology Standards ("INCITS"). The direct cache module 116 may interact with the first cache 102, the second cache 112, and/or the storage device 118 using block device commands to read, write, and clear (or trim) data.

In one embodiment, the direct cache module 116 serves as a proxy for the storage device 118, receiving read and write requests for the storage device 118 directly from the host device 114. The direct cache module 116 may represent itself to the host device 114 as a storage device having a capacity similar to and/or matching the capacity of the storage device 118. The direct cache module 116, upon receiving a read request or write request from the host device 114, in one embodiment, fulfills the request by caching write data in both the first cache 102 and the second cache 112 or by retrieving read data from one of the first cache 102, the second cache 112, or the storage device 118 and returning the read data to the host device 114.

To provide increased data redundancy while also increasing the usable capacity of the first cache 102 and the second cache 112, in one embodiment, the direct cache module 116 caches data from a write request redundantly to both the first cache 102 and the second cache 112 and removes the data from one of the first cache 102 and the second cache 112 once the storage device 118 stores the data. The direct cache module 116, in one embodiment, leaves the data in the other of the first cache 102 and the second cache 112 so that the data remains available to service read requests from the host device 114.

In one embodiment, the direct cache module 116 determines which of the first cache 102 and the second cache 112 to leave the data in and which to remove the data from based on a deterministic protocol, so that the direct cache module 116 can determine which of the first cache 102 and the second cache 112 to send read requests and write requests to without maintaining and accessing a separate record of where data is cached. In further embodiments, the direct cache module 116 may send read requests and write requests to both the first cache 102 and the second cache 112 or maintain a data structure that includes a record of what data is cached in each of the first cache 102 and the second cache 112.

In one embodiment, the direct cache module 116 uses a deterministic protocol that is based on logical or physical addresses of data that the direct cache module 116 caches. For example, the direct cache module 116 may assign even addresses to the first cache 102 and odd addresses to the second cache 112, or the like. This or a similar deterministic protocol, in one embodiment, logically and/or physically stripes data between the first cache 102 and the second cache 112 as the direct cache module 116 clears data from the first cache 102 and the second cache 112 in response to the storage device 118 storing the data.

In one embodiment, logical addresses in the first cache 102 and the second cache 112 correspond to logical and/or physical addresses in the storage device 118. For example, in one embodiment, the first cache 102 and the second cache 112 share a logical address space comprising the logical storage capacity of both the first cache 102 and the second cache 112. The logical address space may correspond to the physical address space of the storage device 118. Logical addresses of the first cache 102 and the second cache 112, in this embodiment, are directly mapped to corresponding physical addresses of the storage device 118.

Alternatively, in certain embodiments, logical addresses of the first cache 102 and the second cache 112 are directly mapped to corresponding logical addresses of the storage device 118. Directly mapping logical addresses of the first cache 102 and the second cache 112 to addresses of the storage device 118, in one embodiment, provides a one-to-one relationship between the addresses of the storage device 118 and the logical addresses of the first cache 102 and the second cache 112. Sharing a logical address space that is directly mapped to the logical or physical address space of the storage device 118, in one embodiment, precludes the use of an extra translation layer in the direct cache module 116, such as the use of cache tags, a cache index, the maintenance of a translation data structure, or the like.

In one embodiment, the shared logical address space of the first cache 102 and the second cache 112 is a sparse address space that is larger than the physical storage capacity of the first cache 102 and the second cache 112, either alone or together. This allows the storage device 118 to have a larger storage capacity than the first cache 102 and the second cache 112, while maintaining a direct mapping between the logical addresses of the first cache 102 and the second cache 112 and logical or physical addresses of the storage device 118. The shared sparse logical address space may be thinly provisioned in one embodiment. In a further embodiment, as the direct cache module 116 writes data to the first cache 102 and the second cache 112 using logical addresses, the first cache 102 and the second cache 112 directly map the logical addresses to distinct physical addresses on the first cache 102 and the second cache 112. As the direct cache module 116 clears data from one or the other of the first cache 102 and the second cache 112, the physical addresses and associated physical storage media, the solid state storage media 110 in the depicted embodiment, are freed to store data for other logical addresses.

In another embodiment, logical addresses of a single cache, such as the first cache 102 or the second cache 112, are directly mapped to corresponding logical addresses of the storage device 118. Directly mapping logical addresses of the single cache to addresses of the storage device 118, in one embodiment, provides a one-to-one relationship between the addresses of the storage device 118 and the logical addresses of the first cache 102 and the second cache 112. Sharing a logical address space that is directly mapped to the logical address space or physical address space of the storage device 118, in one embodiment, precludes the use of an extra translation layer in the direct cache module 116, such as the use of cache tags, a cache index, the maintenance of a translation data structure, or the like.

In one embodiment, the shared logical address space of the single cache is a sparse address space that is larger than the physical storage capacity of the single cache. This allows the storage device 118 to have a larger storage capacity than the single cache, while maintaining a direct mapping between the logical addresses of the single cache and logical addresses and/or physical addresses of the storage device 118. The shared sparse logical address space may be thinly provisioned in one embodiment. In a further embodiment, as the direct cache module 116 writes data to the single cache using logical addresses, the single cache directly maps the logical addresses to distinct physical addresses on the single cache. As the direct cache module 116 clears data from the single cache, the physical addresses and associated physical storage media, the solid state storage media 110 in the depicted embodiment, are freed to store data for other logical addresses. In one embodiment, the physical addresses and associated physical storage media store the data using a log-based, append only writing structure such that data evicted from the cache or overwritten by a subsequent write request invalidates other data in the log such that a garbage collection process can recover the physical capacity.

Solid-State Storage Device

Figure 2:
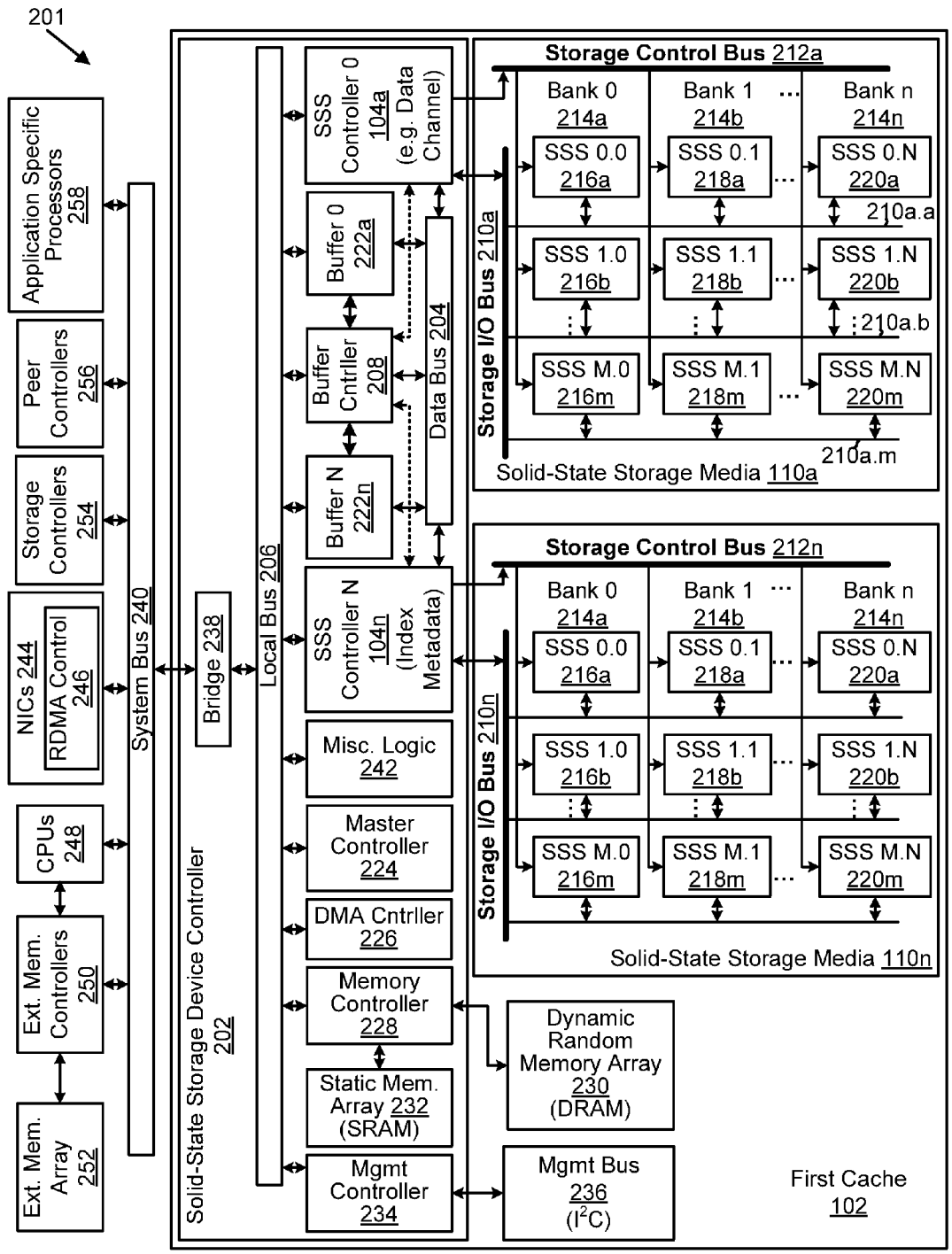
FIG. 2 is a schematic block diagram illustrating one embodiment of a solid-state storage device controller in a cache device in accordance with the present invention.

FIG. 2 is a schematic block diagram illustrating one embodiment 201 of a solid-state storage device controller 202 that includes a write data pipeline 106 and a read data pipeline 108 in a cache 102, 112 in accordance with the present invention. While FIG. 2 depicts one embodiment of the first cache 102, in a further embodiment, the second cache 112 is substantially similar to the depicted embodiment of the first cache 102.

The solid-state storage device controller 202 may be embodied as hardware, as software, or as a combination of hardware and software. The solid-state storage device controller 202 may include a number of solid-state storage controllers 0-N 104a-n, each controlling solid-state storage media 110. In the depicted embodiment, two solid-state controllers are shown: solid-state controller 0 104a and solid-state storage controller N 104n, and each controls solid-state storage media 110a-n. In the depicted embodiment, solid-state storage controller 0 104a controls a data channel so that the attached solid-state storage media 110a stores data. Solid-state storage controller N 104n controls an index metadata channel associated with the stored data and the associated solid-state storage media 110n stores index metadata. In an alternate embodiment, the solid-state storage device controller 202 includes a single solid-state controller 104a with a single solid-state storage media 110a. In another embodiment, there are a plurality of solid-state storage controllers 104a-n and associated solid-state storage media 110a-n. In one embodiment, one or more solid-state storage controllers 104a-104n-1, coupled to their associated solid-state storage media 110a-110n-1, control data while at least one solid-state storage controller 104n, coupled to its associated solid-state storage media 110n, controls index metadata.

In one embodiment, at least one solid-state controller 104 is field-programmable gate array ("FPGA") and controller functions are programmed into the FPGA. In a particular embodiment, the FPGA is a Xilinx® FPGA. In another embodiment, the solid-state storage controller 104 comprises components specifically designed as a solid-state storage controller 104, such as an application-specific integrated circuit ("ASIC") or custom logic solution. Each solid-state storage controller 104 typically includes a write data pipeline 106 and a read data pipeline 108, which are describe further in relation to FIG. 3. In another embodiment, at least one solid-state storage controller 104 is made up of a combination FPGA, ASIC, and custom logic components.

Solid-State Storage

The solid-state storage media 110 is an array of non-volatile solid-state storage elements 216, 218, 220, arranged in banks 214, and accessed in parallel through a bi-directional storage input/output ("I/O") bus 210. The storage I/O bus 210, in one embodiment, is capable of unidirectional communication at any one time. For example, when data is being written to the solid-state storage media 110, data cannot be read from the solid-state storage media 110. In another embodiment, data can flow both directions simultaneously. However bi-directional, as used herein with respect to a data bus, refers to a data pathway that can have data flowing in only one direction at a time, but when data flowing one direction on the bi-directional data bus is stopped, data can flow in the opposite direction on the bi-directional data bus.

A solid-state storage element (e.g. SSS 0.0 216a) is typically configured as a chip (a package of one or more dies) or a die on a circuit board. As depicted, a solid-state storage element (e.g. 216a) operates independently or semi-independently of other solid-state storage elements (e.g. 218a) even if these several elements are packaged together in a chip package, a stack of chip packages, or some other package element. As depicted, a column of solid-state storage elements 216, 218, 220 is designated as a bank 214. As depicted, there may be "n" banks 214a-n and "m" solid-state storage elements 216a-m, 218a-m, 220a-m per bank in an array of n x m solid-state storage elements 216, 218, 220 in a solid-state storage media 110. In one embodiment, a solid-state storage media 110a includes twenty solid-state storage elements per bank (e.g. 216a-m in bank 214a, 218a-m in bank 214b, 220a-m in bank 214n, where m=22) with eight banks (e.g. 214a-n where n=8) and a solid-state storage media 110n includes two solid-state storage elements (e.g. 216a-m where m=2) per bank 214 with one bank 214a. There is no requirement that two solid-state storage media 110a, 110n have the same number of solid-state storage elements and/or same number of banks 214. In one embodiment, each solid-state storage element 216, 218, 220 is comprised of a single-level cell ("SLC") devices. In another embodiment, each solid-state storage element 216, 218, 220 is comprised of multi-level cell ("MLC") devices.

In one embodiment, solid-state storage elements for multiple banks that share a common storage I/O bus 210a row (e.g. 216b, 218b, 220b) are packaged together. In one embodiment, a solid-state storage element 216, 218, 220 may have one or more dies per chip with one or more chips stacked vertically and each die may be accessed independently. In another embodiment, a solid-state storage element (e.g. SSS 0.0 216*a*) may have one or more virtual dies per die and one or more dies per chip and one or more chips stacked vertically and each virtual die may be accessed independently. In another embodiment, a solid-state storage element SSS 0.0 216*a* may have one or more virtual dies per die and one or more dies per chip with some or all of the one or more dies stacked vertically and each virtual die may be accessed independently.

In one embodiment, two dies are stacked vertically with four stacks per group to form eight storage elements (e.g. SSS 0.0-SSS 0.8) 216*a*-220*a*, each in a separate bank 214*a*-n. In another embodiment, 20 storage elements (e.g. SSS 0.0-SSS 20.0) 216 form a virtual bank 214*a* so that each of the eight virtual banks has 20 storage elements (e.g. SSS0.0-SSS 20.8). Data is sent to the solid-state storage media 110 over the storage I/O bus 210 to all storage elements of a particular group of storage elements (SSS 0.0-SSS 0.8) 216*a*, 218*a*, 220*a*. The storage control bus 212*a* is used to select a particular bank (e.g. Bank-0 214*a*) so that the data received over the storage I/O bus 210 connected to all banks 214 is written just to the selected bank 214*a*.

In certain embodiments, the storage control bus 212 and storage I/O bus 210 are used together by the solid-state controller 104 to communicate addressing information, storage element command information, and data to be stored. Those of skill in the art recognize that this address, data, and command information may be communicated using one or the other of these buses 212, 210, or using separate buses for each type of control information. In one embodiment, addressing information, storage element command information, and storage data travel on the storage I/O bus 210 and the storage control bus 212 carries signals for activating a bank as well as identifying whether the data on the storage I/O bus 210 lines constitute addressing information, storage element command information, or storage data.

For example, a control signal on the storage control bus 212 such as "command enable" may indicate that the data on the storage I/O bus 210 lines is a storage element command such as program, erase, reset, read, and the like. A control signal on the storage control bus 212 such as "address enable" may indicate that the data on the storage I/O bus 210 lines is addressing information such as erase block identifier, page identifier, and optionally offset within the page within a particular storage element. Finally, an absence of a control signal on the storage control bus 212 for both "command enable" and "address enable" may indicate that the data on the storage I/O bus 210 lines is storage data that is to be stored on the storage element at a previously addressed erase block, physical page, and optionally offset within the page of a particular storage element.

In one embodiment, the storage I/O bus 210 is comprised of one or more independent I/O buses ("IIOBa-m" comprising 210*a.a*-m, 210*n.a*-m) wherein the solid-state storage elements within each row share one of the independent I/O buses across each solid-state storage element 216, 218, 220 in parallel so that all banks 214 are accessed simultaneously. For example, one HOB 210*a.a* of the storage I/O bus 210 may access a first solid-state storage element 216*a*, 218*a*, 220*a* of each bank 214*a*-n simultaneously. A second HOB 210*a.b* of the storage I/O bus 210 may access a second solid-state storage element 216*b*, 218*b*, 220*b* of each bank 214*a*-n simultaneously. Each row of solid-state storage elements 216, 218, 220 is accessed simultaneously. In one embodiment, where solid-state storage elements 216, 218, 220 are multi-level (physically stacked), all physical levels of the solid-state storage elements 216, 218, 220 are accessed simultaneously. As used herein, "simultaneously" also includes near simultaneous access where devices are accessed at slightly different intervals to avoid switching noise. Simultaneously is used in this context to be distinguished from a sequential or serial access wherein commands and/or data are sent individually one after the other.

Typically, banks 214*a*-n are independently selected using the storage control bus 212. In one embodiment, a bank 214 is selected using a chip enable or chip select. Where both chip select and chip enable are available, the storage control bus 212 may select one level of a multi-level solid-state storage element 216, 218, 220 using either of the chip select signal and the chip enable signal. In other embodiments, other commands are used by the storage control bus 212 to individually select one level of a multi-level solid-state storage element 216, 218, 220. Solid-state storage elements 216, 218, 220 may also be selected through a combination of control and of address information transmitted on storage I/O bus 210 and the storage control bus 212.

In one embodiment, each solid-state storage element 216, 218, 220 is partitioned into erase blocks and each erase block is partitioned into pages. A typical page is 2000 bytes ("2 kB"). In one example, a solid-state storage element (e.g. SSS0.0) includes two registers and can program two pages so that a two-register solid-state storage element has a page size of 4 kB. A single bank 214*a* of 20 solid-state storage elements 216*a*-m would then have an 80 kB capacity of pages accessed with the same address going out of the storage I/O bus 210.

This group of pages in a bank 214 of solid-state storage elements 216, 218, 220 of 80 kB may be called a logical or virtual page. Similarly, an erase block of each storage element 216*a*-m of a bank 214*a* may be grouped to form a logical erase block. In one embodiment, erasing a logical erase block causes a physical erase block of each storage element 216*a*-m of a bank 214*a* to be erased. In one embodiment, an erase block of pages within a solid-state storage element 216, 218, 220 is erased when an erase command is received within a solid-state storage element 216, 218, 220. In another embodiment, a single physical erase block on each storage element (e.g. SSS M.N) collectively forms a logical erase block for the solid-state storage media 110*a*. In such an embodiment, erasing a logical erase block comprises erasing an erase block at the same address within each storage element (e.g. SSS M.N) in the solid-state storage media 110*a*. Whereas the size and number of erase blocks, pages, planes, or other logical and physical divisions within a solid-state storage element 216, 218, 220 may change over time with advancements in technology, it is to be expected that many embodiments consistent with new configurations are possible and are consistent with the general description herein.

In one embodiment, data is written in packets to the storage elements. The solid-state controller 104 uses the storage I/O bus 210 and storage control bus 212 to address a particular bank 214, storage element 216, 218, 220, physical erase block, physical page, and optionally offset within a physical page for writing the data packet. In one embodiment, the solid-state controller 104 sends the address information for the data packet by way of the storage I/O bus 210 and signals that the data on the storage I/O bus 210 is address data by way of particular signals set on the storage control bus 212. The solid-state controller 104 follows the transmission of the address information with transmission of the data packet of data that is to be stored. The physical address contains enough information for the solid-state storage element 216, 218, 220 to direct the data packet to the designated location within the page.

In one embodiment, the storage I/O bus 210*a.a* connects to each storage element in a row of storage elements (e.g. SSS 0.0-SSS 0.N 216*a*, 218*a*, 220*a*). In such an embodiment, the solid-state controller 104*a* activates a desired bank 214*a* using the storage control bus 212*a*, such that data on storage I/O bus 210*a.a* reaches the proper page of a single storage element (e.g. SSS 0.0 216*a*).

In addition, in certain embodiments, the solid-state controller 104*a* simultaneously activates the same bank 214*a* using the storage control bus 212*a*, such that different data (a different data packet) on storage I/O bus 210*a.b* reaches the proper page of a single storage element on another row (e.g. SSS 1.0 216*b*). In this manner, multiple physical pages of multiple storage elements 216, 218, 220 may be written to simultaneously within a single bank 214 to store a logical page.

Similarly, a read command may require a command on the storage control bus 212 to select a single bank 214*a* and the appropriate page within that bank 214*a*. In one embodiment, a read command reads an entire physical page from each storage element, and because there are multiple solid-state storage elements 216, 218, 220 in parallel in a bank 214, an entire logical page is read with a read command. However, the read command may be broken into subcommands, as will be explained below with respect to bank interleave. A logical page may also be accessed in a write operation.

In one embodiment, a solid-state controller 104 may send an erase block erase command over all the lines of the storage I/O bus 210 to erase a physical erase block having a particular erase block address. In addition, the solid-state controller 104 may simultaneously activate a single bank 214 using the storage control bus 212 such that each physical erase block in the single activated bank 214 is erased as part of a logical erase block.

In another embodiment, the solid-state controller 104 may send an erase block erase command over all the lines of the storage I/O bus 210 to erase a physical erase block having a particular erase block address on each storage element 216, 218, 220 (SSS 0.0-SSS M.N). These particular physical erase blocks together may form a logical erase block. Once the address of the physical erase blocks is provided to the storage elements 216, 218, 220, the solid-state controller 104 may initiate the erase command on a bank 214*a* by bank 214*b* by bank 214*n* basis (either in order or based on some other sequence). Other commands may also be sent to a particular location using a combination of the storage I/O bus 210 and the storage control bus 212. One of skill in the art will recognize other ways to select a particular storage location using the bi-directional storage I/O bus 210 and the storage control bus 212.

In one embodiment, the storage controller 104 sequentially writes data on the solid-state storage media 110 in a log structured format and within one or more physical structures of the storage elements, the data is sequentially stored on the solid-state storage media 110. Sequentially writing data involves the storage controller 104 streaming data packets into storage write buffers for storage elements, such as a chip (a package of one or more dies) or a die on a circuit board. When the storage write buffers are full, the data packets are programmed to a designated virtual or logical page ("LP"). Data packets then refill the storage write buffers and, when full, the data packets are written to the next LP. The next virtual page may be in the same bank 214*a* or another bank (e.g. 214*b*). This process continues, LP after LP, typically until a virtual or logical erase block ("LEB") is filled. LPs and LEBs are described in more detail below.

In another embodiment, the streaming may continue across LEB boundaries with the process continuing, LEB after LEB. Typically, the storage controller 104 sequentially stores data packets in an LEB by order of processing. In one embodiment, where a write data pipeline 106 is used, the storage controller 104 stores packets in the order that they come out of the write data pipeline 106. This order may be a result of data segments arriving from a requesting device mixed with packets of valid data that are being read from another storage location as valid data is being recovered from another LEB during a recovery operation.

The sequentially stored data, in one embodiment, can serve as a log to reconstruct data indexes and other metadata using information from data packet headers. For example, in one embodiment, the storage controller 104 may reconstruct a storage index by reading headers to determine the data structure to which each packet belongs and sequence information to determine where in the data structure the data or metadata belongs. The storage controller 104, in one embodiment, uses physical address information for each packet and timestamp or sequence information to create a mapping between the physical locations of the packets and the data structure identifier and data segment sequence. Timestamp or sequence information is used by the storage controller 104 to replay the sequence of changes made to the index and thereby reestablish the most recent state.

In one embodiment, erase blocks are time stamped or given a sequence number as packets are written and the timestamp or sequence information of an erase block is used along with information gathered from container headers and packet headers to reconstruct the storage index. In another embodiment, timestamp or sequence information is written to an erase block when the erase block is recovered.

In a read, modify, write operation, data packets associated with the logical structure are located and read in a read operation. Data segments of the modified structure that have been modified are not written to the location from which they are read. Instead, the modified data segments are again converted to data packets and then written to the next available location in the virtual page currently being written. Index entries for the respective data packets are modified to point to the packets that contain the modified data segments. The entry or entries in the index for data packets associated with the same logical structure that have not been modified will include pointers to original location of the unmodified data packets. Thus, if the original logical structure is maintained, for example to maintain a previous version of the logical structure, the original logical structure will have pointers in the index to all data packets as originally written. The new logical structure will have pointers in the index to some of the original data packets and pointers to the modified data packets in the virtual page that is currently being written.

In a copy operation, the index includes an entry for the original logical structure mapped to a number of packets stored on the solid-state storage media 110. When a copy is made, a new logical structure is created and a new entry is created in the index mapping the new logical structure to the original packets. The new logical structure is also written to the solid-state storage media 110 with its location mapped to the new entry in the index. The new logical structure packets may be used to identify the packets within the original logical structure that are referenced in case changes have been made in the original logical structure that have not been propagated to the copy and the index is lost or corrupted. In another embodiment, the index includes a logical entry for a logical block.

Beneficially, sequentially writing packets facilitates a more even use of the solid-state storage media 110 and allows the solid-storage device controller 202 to monitor storage hot spots and level usage of the various virtual pages in the solid-state storage media 110. Sequentially writing packets also facilitates a powerful, efficient garbage collection system, which is described in detail below. One of skill in the art will recognize other benefits of sequential storage of data packets.

The system 100 may comprise a log-structured storage system or log-structured array similar to a log-structured file system and the order that data is stored may be used to recreate an index. Typically an index that includes a logical-to-physical mapping is stored in volatile memory. If the index is corrupted or lost, the index may be reconstructed by addressing the solid-state storage media 110 in the order that the data was written. Within a logical erase block ("LEB"), data is typically stored sequentially by filling a first logical page, then a second logical page, etc. until the LEB is filled. The solid-state storage controller 104 then chooses another LEB and the process repeats. By maintaining an order that the LEBs were written to and by knowing that each LEB is written sequentially, the index can be rebuilt by traversing the solid-state storage media 110 in order from beginning to end. In other embodiments, if part of the index is stored in non-volatile memory, such as on the solid-state storage media 110, the solid-state storage controller 104 may only need to replay a portion of the solid-state storage media 110 to rebuild a portion of the index that was not stored in non-volatile memory. One of skill in the art will recognize other benefits of sequential storage of data packets.

Solid-State Storage Device Controller

In various embodiments, the solid-state storage device controller 202 also includes a data bus 204, a local bus 206, a buffer controller 208, buffers 0-N 222a-n, a master controller 224, a direct memory access ("DMA") controller 226, a memory controller 228, a dynamic memory array 230, a static random memory array 232, a management controller 234, a management bus 236, a bridge 238 to a system bus 240, and miscellaneous logic 242, which are described below. In other embodiments, the system bus 240 is coupled to one or more network interface cards ("NICs") 244, some of which may include remote DMA ("RDMA") controllers 246, one or more central processing unit ("CPU") 248, one or more external memory controllers 250 and associated external memory arrays 252, one or more storage controllers 254, peer controllers 256, and application specific processors 258, which are described below. The components 244-258 connected to the system bus 240 may be located in the host device 114 or may be other devices.

In one embodiment, the solid-state storage controller(s) 104 communicate data to the solid-state storage media 110 over a storage I/O bus 210. In a certain embodiment where the solid-state storage is arranged in banks 214 and each bank 214 includes multiple storage elements 216, 218, 220 accessible in parallel, the storage I/O bus 210 comprises an array of busses, one for each row of storage elements 216, 218, 220 spanning the banks 214. As used herein, the term "storage I/O bus" may refer to one storage I/O bus 210 or an array of data independent busses 204. In one embodiment, each storage I/O bus 210 accessing a row of storage elements (e.g. 216a, 218a, 220a) may include a logical-to-physical mapping for storage divisions (e.g. erase blocks) accessed in a row of storage elements 216a, 218a, 220a. This mapping allows a logical address mapped to a physical address of a storage division to be remapped to a different storage division if the first storage division fails, partially fails, is inaccessible, or has some other problem. Remapping is explained further in relation to the remapping module 430 of FIG. 4.

Data may also be communicated to the solid-state storage controller(s) 104 from a requesting device 155 through the system bus 240, bridge 238, local bus 206, buffer(s) 222, and finally over a data bus 204. The data bus 204 typically is connected to one or more buffers 222a-n controlled with a buffer controller 208. The buffer controller 208 typically controls transfer of data from the local bus 206 to the buffers 222 and through the data bus 204 to the pipeline input buffer 306 and output buffer 330. The buffer controller 208 typically controls how data arriving from a requesting device 155 can be temporarily stored in a buffer 222 and then transferred onto a data bus 204, or vice versa, to account for different clock domains, to prevent data collisions, etc. The buffer controller 208 typically works in conjunction with the master controller 224 to coordinate data flow. As data arrives, the data will arrive on the system bus 240, be transferred to the local bus 206 through a bridge 238.

Typically the data is transferred from the local bus 206 to one or more data buffers 222 as directed by the master controller 224 and the buffer controller 208. The data then flows out of the buffer(s) 222 to the data bus 204, through a solid-state controller 104, and on to the solid-state storage media 110 such as NAND flash or other storage media. In one embodiment, data and associated out-of-band metadata ("metadata") arriving with the data is communicated using one or more data channels comprising one or more solid-state storage controllers 104a-104n-1 and associated solid-state storage media 110a-110n-1 while at least one channel (solid-state storage controller 104n, solid-state storage media 110n) is dedicated to in-band metadata, such as index information and other metadata generated internally to the cache 102, 112.

The local bus 206 is typically a bidirectional bus or set of busses that allows for communication of data and commands between devices internal to the solid-state storage device controller 202 and between devices internal to the cache 102, 112 and devices 244-258 connected to the system bus 240. The bridge 238 facilitates communication between the local bus 206 and system bus 240. One of skill in the art will recognize other embodiments such as ring structures or switched star configurations and functions of buses 240, 206, 204 and bridges 238.

The system bus 240 is typically a bus of a host device 114 or other device in which the cache 102, 112 is installed or connected. In one embodiment, the system bus 240 may be a PCI-e bus, a Serial Advanced Technology Attachment ("serial ATA") bus, parallel ATA, or the like. In another embodiment, the system bus 240 is an external bus such as small computer system interface ("SCSI"), FireWire, Fiber Channel, USB, PCIe-AS, or the like. The cache 102, 112 may be packaged to fit internally to a device or as an externally connected device.

The solid-state storage device controller 202 includes a master controller 224 that controls higher-level functions within the cache 102, 112. The master controller 224, in various embodiments, controls data flow by interpreting requests, directs creation of indexes to map identifiers associated with data to physical locations of associated data, coordinating DMA requests, etc. Many of the functions described herein are controlled wholly or in part by the master controller 224.

In one embodiment, the master controller 224 uses embedded controller(s). In another embodiment, the master controller 224 uses local memory such as a dynamic memory array 230 (dynamic random access memory "DRAM"), a static memory array 232 (static random access memory "SRAM"), etc. In one embodiment, the local memory is controlled using the master controller 224. In another embodiment, the master controller 224 accesses the local memory via a memory controller 228. In another embodiment, the master controller 224 runs a Linux server and may support various common server interfaces, such as the World Wide Web, hyper-text markup language ("HTML"), etc. In another embodiment, the master controller 224 uses a nano-processor. The master controller 224 may be constructed using programmable or standard logic, or any combination of controller types listed above. The master controller 224 may be embodied as hardware, as software, or as a combination of hardware and software. One skilled in the art will recognize many embodiments for the master controller 224.

In one embodiment, where the storage controller 152/solid-state storage device controller 202 manages multiple data storage devices/solid-state storage media 110*a*-n, the master controller 224 divides the work load among internal controllers, such as the solid-state storage controllers 104*a*-n. For example, the master controller 224 may divide a data structure to be written to the data storage devices (e.g. solid-state storage media 110*a*-n) so that a portion of the data structure is stored on each of the attached data storage devices. This feature is a performance enhancement allowing quicker storage and access to a data structure. In one embodiment, the master controller 224 is implemented using an FPGA. In another embodiment, the firmware within the master controller 224 may be updated through the management bus 236, the system bus 240 over a network connected to a NIC 244 or other device connected to the system bus 240.

In one embodiment, the master controller 224 emulates block storage such that a host device 114 or other device connected to the storage device/cache 102, 112 views the storage device/cache 102, 112 as a block storage device and sends data to specific physical or logical addresses in the storage device/cache 102, 112. The master controller 224 then divides up the blocks and stores the data blocks. The master controller 224 then maps the blocks and physical or logical address sent with the block to the actual locations determined by the master controller 224. The mapping is stored in the index. Typically, for block emulation, a block device application program interface ("API") is provided in a driver in the host device 114, or other device wishing to use the storage device/cache 102, 112 as a block storage device.

In another embodiment, the master controller 224 coordinates with NIC controllers 244 and embedded RDMA controllers 246 to deliver just-in-time RDMA transfers of data and command sets. NIC controller 244 may be hidden behind a non-transparent port to enable the use of custom drivers. Also, a driver on a host device 114 may have access to a computer network through an I/O memory driver using a standard stack API and operating in conjunction with NICs 244.

In one embodiment, the master controller 224 is also a redundant array of independent drive ("RAID") controller. Where the data storage device/cache 102, 112 is networked with one or more other data storage devices, the master controller 224 may be a RAID controller for single tier RAID, multi-tier RAID, progressive RAID, etc. The master controller 224 may also allows some objects and other data structures to be stored in a RAID array and other data structures to be stored without RAID. In another embodiment, the master controller 224 may be a distributed RAID controller element. In another embodiment, the master controller 224 may comprise many RAID, distributed RAID, and other functions as described elsewhere.

In one embodiment, the master controller 224 coordinates with single or redundant network managers (e.g. switches) to establish routing, to balance bandwidth utilization, failover, etc. In another embodiment, the master controller 224 coordinates with integrated application specific logic (via local bus 206) and associated driver software. In another embodiment, the master controller 224 coordinates with attached application specific processors 258 or logic (via the external system bus 240) and associated driver software. In another embodiment, the master controller 224 coordinates with remote application specific logic (via a computer network) and associated driver software. In another embodiment, the master controller 224 coordinates with the local bus 206 or external bus attached hard disk drive ("HDD") storage controller.

In one embodiment, the master controller 224 communicates with one or more storage controllers 254 where the storage device/cache 102, 112 may appear as a storage device connected through a SCSI bus, Internet SCSI ("iSCSI"), fiber channel, etc. Meanwhile the storage device/cache 102, 112 may autonomously manage objects or other data structures and may appear as an object file system or distributed object file system. The master controller 224 may also be accessed by peer controllers 256 and/or application specific processors 258.

In another embodiment, the master controller 224 coordinates with an autonomous integrated management controller to periodically validate FPGA code and/or controller software, validate FPGA code while running (reset) and/or validate controller software during power on (reset), support external reset requests, support reset requests due to watchdog timeouts, and support voltage, current, power, temperature, and other environmental measurements and setting of threshold interrupts. In another embodiment, the master controller 224 manages garbage collection to free erase blocks for reuse. In another embodiment, the master controller 224 manages wear leveling. In another embodiment, the master controller 224 allows the data storage device/cache 102, 112 to be partitioned into multiple virtual devices and allows partition-based media encryption. In yet another embodiment, the master controller 224 supports a solid-state storage controller 104 with advanced, multi-bit ECC correction. One of skill in the art will recognize other features and functions of a master controller 224 in a storage controller 152, or more specifically in a cache 102, 112.

In one embodiment, the solid-state storage device controller 202 includes a memory controller 228 which controls a dynamic random memory array 230 and/or a static random memory array 232. As stated above, the memory controller 228 may be independent or integrated with the master controller 224. The memory controller 228 typically controls volatile memory of some type, such as DRAM (dynamic random memory array 230) and SRAM (static random memory array 232). In other examples, the memory controller 228 also controls other memory types such as electrically erasable programmable read only memory ("EEPROM"), etc. In other embodiments, the memory controller 228 controls two or more memory types and the memory controller 228 may include more than one controller. Typically, the memory controller 228 controls as much SRAM 232 as is feasible and by DRAM 230 to supplement the SRAM 232.

In one embodiment, the logical-to-physical index is stored in memory 230, 232 and then periodically off-loaded to a channel of the solid-state storage media 110*n* or other non-volatile memory. One of skill in the art will recognize other uses and configurations of the memory controller 228, dynamic memory array 230, and static memory array 232.

In one embodiment, the solid-state storage device controller 202 includes a DMA controller 226 that controls DMA operations between the storage device/cache 102, 112 and one or more external memory controllers 250 and associated external memory arrays 252 and CPUs 248. Note that the external memory controllers 250 and external memory arrays 252 are called external because they are external to the storage device/cache 102, 112. In addition the DMA controller 226 may also control RDMA operations with requesting devices through a NIC 244 and associated RDMA controller 246.

In one embodiment, the solid-state storage device controller 202 includes a management controller 234 connected to a management bus 236. Typically the management controller 234 manages environmental metrics and status of the storage device/cache 102, 112. The management controller 234 may monitor device temperature, fan speed, power supply settings, etc. over the management bus 236. The management controller 234 may support the reading and programming of erasable programmable read only memory ("EEPROM") for storage of FPGA code and controller software. Typically the management bus 236 is connected to the various components within the storage device/cache 102, 112. The management controller 234 may communicate alerts, interrupts, etc. over the local bus 206 or may include a separate connection to a system bus 240 or other bus. In one embodiment the management bus 236 is an Inter-Integrated Circuit ("I$^2$C") bus. One of skill in the art will recognize other related functions and uses of a management controller 234 connected to components of the storage device/cache 102, 112 by a management bus 236.

In one embodiment, the solid-state storage device controller 202 includes miscellaneous logic 242 that may be customized for a specific application. Typically where the solid-state device controller 202 or master controller 224 is/are configured using a FPGA or other configurable controller, custom logic may be included based on a particular application, customer requirement, storage requirement, etc.

Data Pipeline

Figure 3:
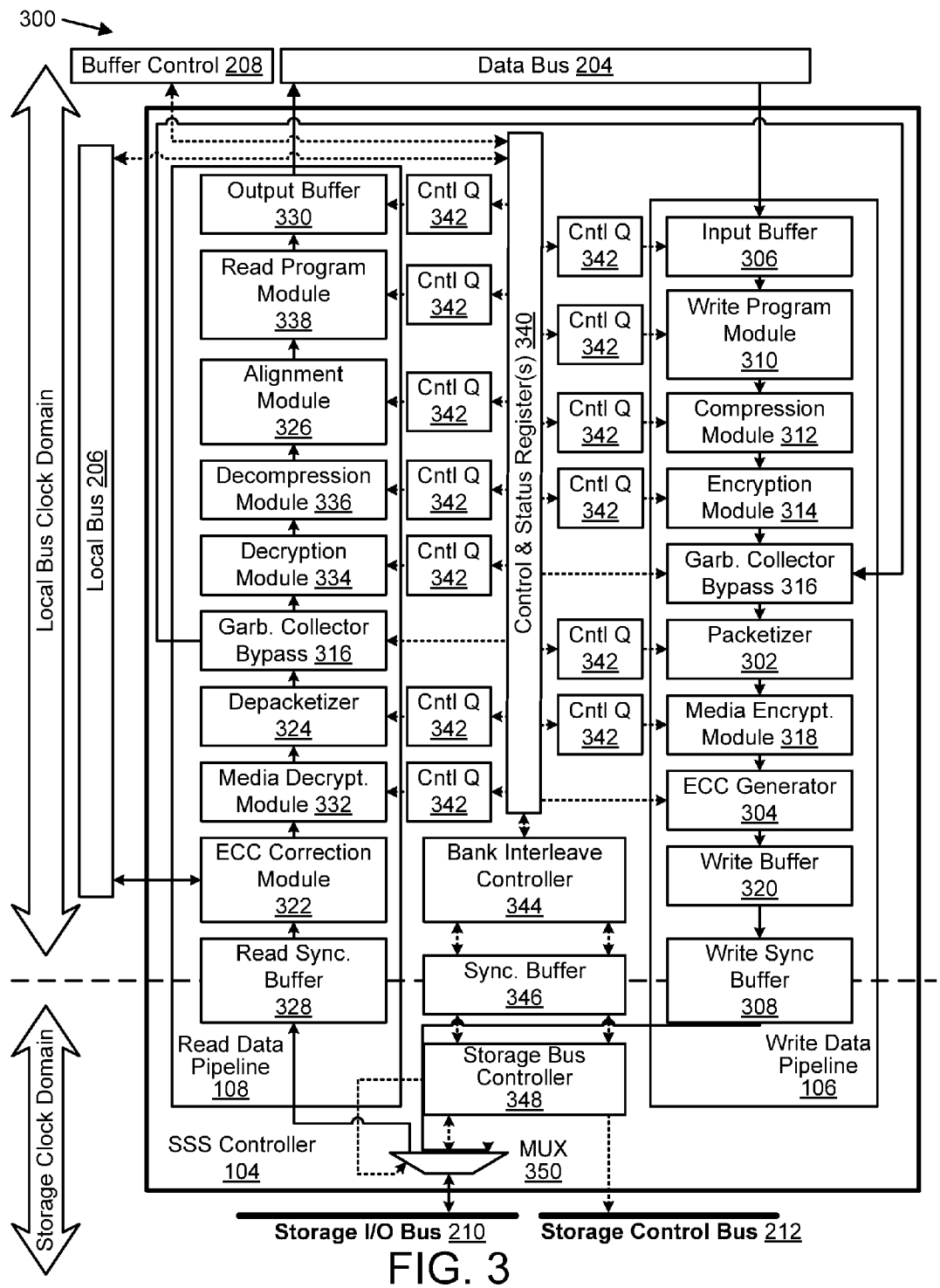
FIG. 3 is a schematic block diagram illustrating one embodiment of a solid-state storage controller with a write data pipeline and a read data pipeline in a solid-state storage device in accordance with the present invention.

FIG. 3 is a schematic block diagram illustrating one embodiment 300 of a solid-state storage controller 104 with a write data pipeline 106 and a read data pipeline 108 in a cache 102, 112 in accordance with the present invention. The embodiment 300 includes a data bus 204, a local bus 206, and buffer control 208, which are substantially similar to those described in relation to the solid-state storage device controller 202 of FIG. 2. The write data pipeline 106 includes a packetizer 302 and an error-correcting code ("ECC") generator 304. In other embodiments, the write data pipeline 106 includes an input buffer 306, a write synchronization buffer 308, a write program module 310, a compression module 312, an encryption module 314, a garbage collector bypass 316 (with a portion within the read data pipeline 108), a media encryption module 318, and a write buffer 320. The read data pipeline 108 includes a read synchronization buffer 328, an ECC correction module 322, a depacketizer 324, an alignment module 326, and an output buffer 330. In other embodiments, the read data pipeline 108 may include a media decryption module 332, a portion of the garbage collector bypass 316, a decryption module 334, a decompression module 336, and a read program module 338. The solid-state storage controller 104 may also include control and status registers 340 and control queues 342, a bank interleave controller 344, a synchronization buffer 346, a storage bus controller 348, and a multiplexer ("MUX") 350. The components of the solid-state controller 104 and associated write data pipeline 106 and read data pipeline 108 are described below. In other embodiments, synchronous solid-state storage media 110 may be used and synchronization buffers 308 328 may be eliminated.

Write Data Pipeline

The write data pipeline 106 includes a packetizer 302 that receives a data or metadata segment to be written to the solid-state storage, either directly or indirectly through another write data pipeline 106 stage, and creates one or more packets sized for the solid-state storage media 110. The data or metadata segment is typically part of a data structure such as an object, but may also include an entire data structure. In another embodiment, the data segment is part of a block of data, but may also include an entire block of data. Typically, a set of data such as a data structure is received from a computer such as the host device 114, or other computer or device and is transmitted to the cache 102, 112 in data segments streamed to the cache 102, 112 or host device 114. A data segment may also be known by another name, such as data parcel, but as referenced herein includes all or a portion of a data structure or data block.

Each data structure is stored as one or more packets. Each data structure may have one or more container packets. Each packet contains a header. The header may include a header type field. Type fields may include data, attribute, metadata, data segment delimiters (multi-packet), data structures, data linkages, and the like. The header may also include information regarding the size of the packet, such as the number of bytes of data included in the packet. The length of the packet may be established by the packet type. The header may include information that establishes the relationship of the packet to a data structure. An example might be the use of an offset in a data packet header to identify the location of the data segment within the data structure. One of skill in the art will recognize other information that may be included in a header added to data by a packetizer 302 and other information that may be added to a data packet.

Each packet includes a header and possibly data from the data or metadata segment. The header of each packet includes pertinent information to relate the packet to the data structure to which the packet belongs. For example, the header may include an object identifier or other data structure identifier and offset that indicate the data segment, object, data structure or data block from which the data packet was formed. The header may also include a logical address used by the storage bus controller 348 to store the packet. The header may also include information regarding the size of the packet, such as the number of bytes included in the packet. The header may also include a sequence number that identifies where the data segment belongs with respect to other packets within the data structure when reconstructing the data segment or data structure. The header may include a header type field. Type fields may include data, data structure attributes, metadata, data segment delimiters (multi-packet), data structure types, data structure linkages, and the like. One of skill in the art will recognize other information that may be included in a header added to data or metadata by a packetizer 302 and other information that may be added to a packet.

The write data pipeline 106 includes an ECC generator 304 that that generates one or more error-correcting codes ("ECC") for the one or more packets received from the packetizer 302. The ECC generator 304 typically uses an error correcting algorithm to generate ECC check bits which are stored with the one or more data packets. The ECC codes generated by the ECC generator 304 together with the one or more data packets associated with the ECC codes comprise an ECC chunk. The ECC data stored with the one or more data packets is used to detect and to correct errors introduced into the data through transmission and storage. In one embodiment, packets are streamed into the ECC generator 304 as un-encoded blocks of length N. A syndrome of length S is calculated, appended and output as an encoded block of length N+S. The value of N and S are dependent upon the characteristics of the algorithm which is selected to achieve specific performance, efficiency, and robustness metrics. In one embodiment, there is no fixed relationship between the ECC blocks and the packets; the packet may comprise more than one ECC block; the ECC block may comprise more than one packet; and a first packet may end anywhere within the ECC block and a second packet may begin after the end of the first packet within the same ECC block. In one embodiment, ECC algorithms are not dynamically modified. In one embodiment, the ECC data stored with the data packets is robust enough to correct errors in more than two bits.

Beneficially, using a robust ECC algorithm allowing more than single bit correction or even double bit correction allows the life of the solid-state storage media 110 to be extended. For example, if flash memory is used as the storage medium in the solid-state storage media 110, the flash memory may be written approximately 100,000 times without error per erase cycle. This usage limit may be extended using a robust ECC algorithm. Having the ECC generator 304 and corresponding ECC correction module 322 onboard the cache 102, 112, the cache 102, 112 can internally correct errors and has a longer useful life than if a less robust ECC algorithm is used, such as single bit correction. However, in other embodiments the ECC generator 304 may use a less robust algorithm and may correct single-bit or double-bit errors. In another embodiment, the solid-state storage device 110 may comprise less reliable storage such as multi-level cell ("MLC") flash in order to increase capacity, which storage may not be sufficiently reliable without more robust ECC algorithms.

In one embodiment, the write pipeline 106 includes an input buffer 306 that receives a data segment to be written to the solid-state storage media 110 and stores the incoming data segments until the next stage of the write data pipeline 106, such as the packetizer 302 (or other stage for a more complex write data pipeline 106) is ready to process the next data segment. The input buffer 306 typically allows for discrepancies between the rate data segments are received and processed by the write data pipeline 106 using an appropriately sized data buffer. The input buffer 306 also allows the data bus 204 to transfer data to the write data pipeline 106 at rates greater than can be sustained by the write data pipeline 106 in order to improve efficiency of operation of the data bus 204. Typically when the write data pipeline 106 does not include an input buffer 306, a buffering function is performed elsewhere, such as in the cache 102, 112 but outside the write data pipeline 106, in the host device 114, such as within a network interface card ("NIC"), or at another device, for example when using remote direct memory access ("RDMA").

In another embodiment, the write data pipeline 106 also includes a write synchronization buffer 308 that buffers packets received from the ECC generator 304 prior to writing the packets to the solid-state storage media 110. The write synch buffer 308 is located at a boundary between a local clock domain and a solid-state storage clock domain and provides buffering to account for the clock domain differences. In other embodiments, synchronous solid-state storage media 110 may be used and synchronization buffers 308 328 may be eliminated.

In one embodiment, the write data pipeline 106 also includes a media encryption module 318 that receives the one or more packets from the packetizer 302, either directly or indirectly, and encrypts the one or more packets using an encryption key unique to the cache 102, 112 prior to sending the packets to the ECC generator 304. Typically, the entire packet is encrypted, including the headers. In another embodiment, headers are not encrypted. In this document, encryption key is understood to mean a secret encryption key that is managed externally from a solid-state storage controller 104.

The media encryption module 318 and corresponding media decryption module 332 provide a level of security for data stored in the solid-state storage media 110. For example, where data is encrypted with the media encryption module 318, if the solid-state storage media 110 is connected to a different solid-state storage controller 104, cache 102, 112, or server, the contents of the solid-state storage media 110 typically could not be read without use of the same encryption key used during the write of the data to the solid-state storage media 110 without significant effort.

In a typical embodiment, the cache 102, 112 does not store the encryption key in non-volatile storage and allows no external access to the encryption key. The encryption key is provided to the solid-state storage controller 104 during initialization. The cache 102, 112 may use and store a non-secret cryptographic nonce that is used in conjunction with an encryption key. A different nonce may be stored with every packet. Data segments may be split between multiple packets with unique nonces for the purpose of improving protection by the encryption algorithm.

The encryption key may be received from a host device 114, a server, key manager, or other device that manages the encryption key to be used by the solid-state storage controller 104. In another embodiment, the solid-state storage media 110 may have two or more partitions and the solid-state storage controller 104 behaves as though it was two or more solid-state storage controllers 104, each operating on a single partition within the solid-state storage media 110. In this embodiment, a unique media encryption key may be used with each partition.

In another embodiment, the write data pipeline 106 also includes an encryption module 314 that encrypts a data or metadata segment received from the input buffer 306, either directly or indirectly, prior sending the data segment to the packetizer 302, the data segment encrypted using an encryption key received in conjunction with the data segment. The encryption keys used by the encryption module 314 to encrypt data may not be common to all data stored within the cache 102, 112 but may vary on an per data structure basis and received in conjunction with receiving data segments as described below. For example, an encryption key for a data segment to be encrypted by the encryption module 314 may be received with the data segment or may be received as part of a command to write a data structure to which the data segment belongs. The cache 102, 112 may use and store a non-secret cryptographic nonce in each data structure packet that is used in conjunction with the encryption key. A different nonce may be stored with every packet. Data segments may be split between multiple packets with unique nonces for the purpose of improving protection by the encryption algorithm.

The encryption key may be received from a host device 114, a computer, key manager, or other device that holds the encryption key to be used to encrypt the data segment. In one embodiment, encryption keys are transferred to the solid-state storage controller 104 from one of a cache 102, 112, a computer, a host device 114, or other external agent which has the ability to execute industry standard methods to securely transfer and protect private and public keys.

In one embodiment, the encryption module 314 encrypts a first packet with a first encryption key received in conjunction with the packet and encrypts a second packet with a second encryption key received in conjunction with the second packet. In another embodiment, the encryption module 314 encrypts a first packet with a first encryption key received in conjunction with the packet and passes a second data packet on to the next stage without encryption. Beneficially, the encryption module 314 included in the write data pipeline 106 of the cache 102, 112 allows data structure-by-data structure or segment-by-segment data encryption without a single file system or other external system to keep track of the different encryption keys used to store corresponding data structures or data segments. Each requesting device 155 or related key manager independently manages encryption keys used to encrypt only the data structures or data segments sent by the requesting device 155.

In one embodiment, the encryption module 314 may encrypt the one or more packets using an encryption key unique to the cache 102, 112. The encryption module 314 may perform this media encryption independently, or in addition to the encryption described above. Typically, the entire packet is encrypted, including the headers. In another embodiment, headers are not encrypted. The media encryption by the encryption module 314 provides a level of security for data stored in the solid-state storage media 110. For example, where data is encrypted with media encryption unique to the specific cache 102, 112 if the solid-state storage media 110 is connected to a different solid-state storage controller 104, cache 102, 112, or host device 114, the contents of the solid-state storage media 110 typically could not be read without use of the same encryption key used during the write of the data to the solid-state storage media 110 without significant effort.

In another embodiment, the write data pipeline 106 includes a compression module 312 that compresses the data for metadata segment prior to sending the data segment to the packetizer 302. The compression module 312 typically compresses a data or metadata segment using a compression routine known to those of skill in the art to reduce the storage size of the segment. For example, if a data segment includes a string of 512 zeros, the compression module 312 may replace the 512 zeros with code or token indicating the 512 zeros where the code is much more compact than the space taken by the 512 zeros.

In one embodiment, the compression module 312 compresses a first segment with a first compression routine and passes along a second segment without compression. In another embodiment, the compression module 312 compresses a first segment with a first compression routine and compresses the second segment with a second compression routine. Having this flexibility within the cache 102, 112 is beneficial so that the host device 114 or other devices writing data to the cache 102, 112 may each specify a compression routine or so that one can specify a compression routine while another specifies no compression. Selection of compression routines may also be selected according to default settings on a per data structure type or data structure class basis. For example, a first data structure of a specific data structure may be able to override default compression routine settings and a second data structure of the same data structure class and data structure type may use the default compression routine and a third data structure of the same data structure class and data structure type may use no compression.

In one embodiment, the write data pipeline 106 includes a garbage collector bypass 316 that receives data segments from the read data pipeline 108 as part of a data bypass in a garbage collection system. A garbage collection system typically marks packets that are no longer valid, typically because the packet is marked for deletion or has been modified and the modified data is stored in a different location. At some point, the garbage collection system determines that a particular section of storage may be recovered. This determination may be due to a lack of available storage capacity, the percentage of data marked as invalid reaching a threshold, a consolidation of valid data, an error detection rate for that section of storage reaching a threshold, or improving performance based on data distribution, etc. Numerous factors may be considered by a garbage collection algorithm to determine when a section of storage is to be recovered.

Once a section of storage has been marked for recovery, valid packets in the section typically must be relocated. The garbage collector bypass 316 allows packets to be read into the read data pipeline 108 and then transferred directly to the write data pipeline 106 without being routed out of the solid-state storage controller 104. In one embodiment, the garbage collector bypass 316 is part of an autonomous garbage collector system that operates within the cache 102, 112. This allows the cache 102, 112 to manage data so that data is systematically spread throughout the solid-state storage media 110 to improve performance, data reliability and to avoid overuse and underuse of any one location or area of the solid-state storage media 110 and to lengthen the useful life of the solid-state storage media 110.

The garbage collector bypass 316 coordinates insertion of segments into the write data pipeline 106 with other segments being written by a host device 114 or other devices. In the depicted embodiment, the garbage collector bypass 316 is before the packetizer 302 in the write data pipeline 106 and after the depacketizer 324 in the read data pipeline 108, but may also be located elsewhere in the read and write data pipelines 106, 108. The garbage collector bypass 316 may be used during a flush of the write pipeline 108 to fill the remainder of the virtual page in order to improve the efficiency of storage within the solid-state storage media 110 and thereby reduce the frequency of garbage collection.

In one embodiment, the write data pipeline 106 includes a write buffer 320 that buffers data for efficient write operations. Typically, the write buffer 320 includes enough capacity for packets to fill at least one virtual page in the solid-state storage media 110. This allows a write operation to send an entire page of data to the solid-state storage media 110 without interruption. By sizing the write buffer 320 of the write data pipeline 106 and buffers within the read data pipeline 108 to be the same capacity or larger than a storage write buffer within the solid-state storage media 110, writing and reading data is more efficient since a single write command may be crafted to send a full virtual page of data to the solid-state storage media 110 instead of multiple commands.

While the write buffer 320 is being filled, the solid-state storage media 110 may be used for other read operations. This is advantageous because other solid-state devices with a smaller write buffer or no write buffer may tie up the solid-state storage when data is written to a storage write buffer and data flowing into the storage write buffer stalls. Read operations will be blocked until the entire storage write buffer is filled and programmed. Another approach for systems without a write buffer or a small write buffer is to flush the storage write buffer that is not full in order to enable reads. Again this is inefficient because multiple write/program cycles are required to fill a page.

For depicted embodiment with a write buffer 320 sized larger than a virtual page, a single write command, which includes numerous subcommands, can then be followed by a single program command to transfer the page of data from the storage write buffer in each solid-state storage element 216, 218, 220 to the designated page within each solid-state storage element 216, 218, 220. This technique has the benefits of eliminating partial page programming, which is known to reduce data reliability and durability and freeing up the destination bank for reads and other commands while the buffer fills.

In one embodiment, the write buffer 320 is a ping-pong buffer where one side of the buffer is filled and then designated for transfer at an appropriate time while the other side of the ping-pong buffer is being filled. In another embodiment, the write buffer 320 includes a first-in first-out ("FIFO") register with a capacity of more than a virtual page of data segments. One of skill in the art will recognize other write buffer 320 configurations that allow a virtual page of data to be stored prior to writing the data to the solid-state storage media 110.

In another embodiment, the write buffer 320 is sized smaller than a virtual page so that less than a page of information could be written to a storage write buffer in the solid-state storage media 110. In the embodiment, to prevent a stall in the write data pipeline 106 from holding up read operations, data is queued using the garbage collection system that needs to be moved from one location to another as part of the garbage collection process. In case of a data stall in the write data pipeline 106, the data can be fed through the garbage collector bypass 316 to the write buffer 320 and then on to the storage write buffer in the solid-state storage media 110 to fill the pages of a virtual page prior to programming the data. In this way a data stall in the write data pipeline 106 would not stall reading from the cache 102, 112.

In another embodiment, the write data pipeline 106 includes a write program module 310 with one or more user-definable functions within the write data pipeline 106. The write program module 310 allows a user to customize the write data pipeline 106. A user may customize the write data pipeline 106 based on a particular data requirement or application. Where the solid-state storage controller 104 is an FPGA, the user may program the write data pipeline 106 with custom commands and functions relatively easily. A user may also use the write program module 310 to include custom functions with an ASIC, however, customizing an ASIC may be more difficult than with an FPGA. The write program module 310 may include buffers and bypass mechanisms to allow a first data segment to execute in the write program module 310 while a second data segment may continue through the write data pipeline 106. In another embodiment, the write program module 310 may include a processor core that can be programmed through software.

Note that the write program module 310 is shown between the input buffer 306 and the compression module 312, however, the write program module 310 could be anywhere in the write data pipeline 106 and may be distributed among the various stages 302-320. In addition, there may be multiple write program modules 310 distributed among the various states 302-320 that are programmed and operate independently. In addition, the order of the stages 302-320 may be altered. One of skill in the art will recognize workable alterations to the order of the stages 302-320 based on particular user requirements.

Read Data Pipeline

The read data pipeline 108 includes an ECC correction module 322 that determines if a data error exists in ECC blocks a requested packet received from the solid-state storage media 110 by using ECC stored with each ECC block of the requested packet. The ECC correction module 322 then corrects any errors in the requested packet if any error exists and the errors are correctable using the ECC. For example, if the ECC can detect an error in six bits but can only correct three bit errors, the ECC correction module 322 corrects ECC blocks of the requested packet with up to three bits in error.

The ECC correction module 322 corrects the bits in error by changing the bits in error to the correct one or zero state so that the requested data packet is identical to when it was written to the solid-state storage media 110 and the ECC was generated for the packet.

If the ECC correction module 322 determines that the requested packets contains more bits in error than the ECC can correct, the ECC correction module 322 cannot correct the errors in the corrupted ECC blocks of the requested packet and sends an interrupt. In one embodiment, the ECC correction module 322 sends an interrupt with a message indicating that the requested packet is in error. The message may include information that the ECC correction module 322 cannot correct the errors or the inability of the ECC correction module 322 to correct the errors may be implied. In another embodiment, the ECC correction module 322 sends the corrupted ECC blocks of the requested packet with the interrupt and/or the message.

In one embodiment, a corrupted ECC block or portion of a corrupted ECC block of the requested packet that cannot be corrected by the ECC correction module 322 is read by the master controller 224, corrected, and returned to the ECC correction module 322 for further processing by the read data pipeline 108. In one embodiment, a corrupted ECC block or portion of a corrupted ECC block of the requested packet is sent to the device requesting the data. The requesting device 155 may correct the ECC block or replace the data using another copy, such as a backup or mirror copy, and then may use the replacement data of the requested data packet or return it to the read data pipeline 108. The requesting device 155 may use header information in the requested packet in error to identify data required to replace the corrupted requested packet or to replace the data structure to which the packet belongs. In another embodiment, the solid-state storage controller 104 stores data using some type of RAID and is able to recover the corrupted data. In another embodiment, the ECC correction module 322 sends an interrupt and/or message and the receiving device fails the read operation associated with the requested data packet. One of skill in the art will recognize other options and actions to be taken as a result of the ECC correction module 322 determining that one or more ECC blocks of the requested packet are corrupted and that the ECC correction module 322 cannot correct the errors.

The read data pipeline 108 includes a depacketizer 324 that receives ECC blocks of the requested packet from the ECC correction module 322, directly or indirectly, and checks and removes one or more packet headers. The depacketizer 324 may validate the packet headers by checking packet identifiers, data length, data location, etc. within the headers. In one embodiment, the header includes a hash code that can be used to validate that the packet delivered to the read data pipeline 108 is the requested packet. The depacketizer 324 also removes the headers from the requested packet added by the packetizer 302. The depacketizer 324 may directed to not operate on certain packets but pass these forward without modification. An example might be a container label that is requested during the course of a rebuild process where the header information is required for index reconstruction. Further examples include the transfer of packets of various types destined for use within the cache 102, 112. In another embodiment, the depacketizer 324 operation may be packet type dependent.

The read data pipeline 108 includes an alignment module 326 that receives data from the depacketizer 324 and removes unwanted data. In one embodiment, a read command sent to the solid-state storage media 110 retrieves a packet of data. A device requesting the data may not require all data within the retrieved packet and the alignment module 326 removes the unwanted data. If all data within a retrieved page is requested data, the alignment module 326 does not remove any data.

The alignment module 326 re-formats the data as data segments of a data structure in a form compatible with a device requesting the data segment prior to forwarding the data segment to the next stage. Typically, as data is processed by the read data pipeline 108, the size of data segments or packets changes at various stages. The alignment module 326 uses received data to format the data into data segments suitable to be sent to the requesting device 155 and joined to form a response. For example, data from a portion of a first data packet may be combined with data from a portion of a second data packet. If a data segment is larger than a data requested by the requesting device 155, the alignment module 326 may discard the unwanted data.

In one embodiment, the read data pipeline 108 includes a read synchronization buffer 328 that buffers one or more requested packets read from the solid-state storage media 110 prior to processing by the read data pipeline 108. The read synchronization buffer 328 is at the boundary between the solid-state storage clock domain and the local bus clock domain and provides buffering to account for the clock domain differences.

In another embodiment, the read data pipeline 108 includes an output buffer 330 that receives requested packets from the alignment module 326 and stores the packets prior to transmission to the requesting device 155. The output buffer 330 accounts for differences between when data segments are received from stages of the read data pipeline 108 and when the data segments are transmitted to other parts of the solid-state storage controller 104 or to the requesting device 155. The output buffer 330 also allows the data bus 204 to receive data from the read data pipeline 108 at rates greater than can be sustained by the read data pipeline 108 in order to improve efficiency of operation of the data bus 204.

In one embodiment, the read data pipeline 108 includes a media decryption module 332 that receives one or more encrypted requested packets from the ECC correction module 322 and decrypts the one or more requested packets using the encryption key unique to the cache 102, 112 prior to sending the one or more requested packets to the depacketizer 324. Typically the encryption key used to decrypt data by the media decryption module 332 is identical to the encryption key used by the media encryption module 318. In another embodiment, the solid-state storage media 110 may have two or more partitions and the solid-state storage controller 104 behaves as though it was two or more solid-state storage controllers 104 each operating on a single partition within the solid-state storage media 110. In this embodiment, a unique media encryption key may be used with each partition.

In another embodiment, the read data pipeline 108 includes a decryption module 334 that decrypts a data segment formatted by the depacketizer 324 prior to sending the data segment to the output buffer 330. The data segment may be decrypted using an encryption key received in conjunction with the read request that initiates retrieval of the requested packet received by the read synchronization buffer 328. The decryption module 334 may decrypt a first packet with an encryption key received in conjunction with the read request for the first packet and then may decrypt a second packet with a different encryption key or may pass the second packet on to the next stage of the read data pipeline 108 without decryption. When the packet was stored with a non-secret cryptographic nonce, the nonce is used in conjunction with an encryption key to decrypt the data packet. The encryption key may be received from a host device 114, a computer, key manager, or other device that manages the encryption key to be used by the solid-state storage controller 104.

In another embodiment, the read data pipeline 108 includes a decompression module 336 that decompresses a data segment formatted by the depacketizer 324. In one embodiment, the decompression module 336 uses compression information stored in one or both of the packet header and the container label to select a complementary routine to that used to compress the data by the compression module 312. In another embodiment, the decompression routine used by the decompression module 336 is dictated by the device requesting the data segment being decompressed. In another embodiment, the decompression module 336 selects a decompression routine according to default settings on a per data structure type or data structure class basis. A first packet of a first object may be able to override a default decompression routine and a second packet of a second data structure of the same data structure class and data structure type may use the default decompression routine and a third packet of a third data structure of the same data structure class and data structure type may use no decompression.

In another embodiment, the read data pipeline 108 includes a read program module 338 that includes one or more user-definable functions within the read data pipeline 108. The read program module 338 has similar characteristics to the write program module 310 and allows a user to provide custom functions to the read data pipeline 108. The read program module 338 may be located as shown in FIG. 3, may be located in another position within the read data pipeline 108, or may include multiple parts in multiple locations within the read data pipeline 108. Additionally, there may be multiple read program modules 338 within multiple locations within the read data pipeline 108 that operate independently. One of skill in the art will recognize other forms of a read program module 338 within a read data pipeline 108. As with the write data pipeline 106, the stages of the read data pipeline 108 may be rearranged and one of skill in the art will recognize other orders of stages within the read data pipeline 108.

The solid-state storage controller 104 includes control and status registers 340 and corresponding control queues 342. The control and status registers 340 and control queues 342 facilitate control and sequencing commands and subcommands associated with data processed in the write and read data pipelines 106, 108. For example, a data segment in the packetizer 302 may have one or more corresponding control commands or instructions in a control queue 342 associated with the ECC generator 304. As the data segment is packetized, some of the instructions or commands may be executed within the packetizer 302. Other commands or instructions may be passed to the next control queue 342 through the control and status registers 340 as the newly formed data packet created from the data segment is passed to the next stage.

Commands or instructions may be simultaneously loaded into the control queues 342 for a packet being forwarded to the write data pipeline 106 with each pipeline stage pulling the appropriate command or instruction as the respective packet is executed by that stage. Similarly, commands or instructions may be simultaneously loaded into the control queues 342 for a packet being requested from the read data pipeline 108 with each pipeline stage pulling the appropriate command or instruction as the respective packet is executed by that stage. One of skill in the art will recognize other features and functions of control and status registers 340 and control queues 342.

Figure 4:
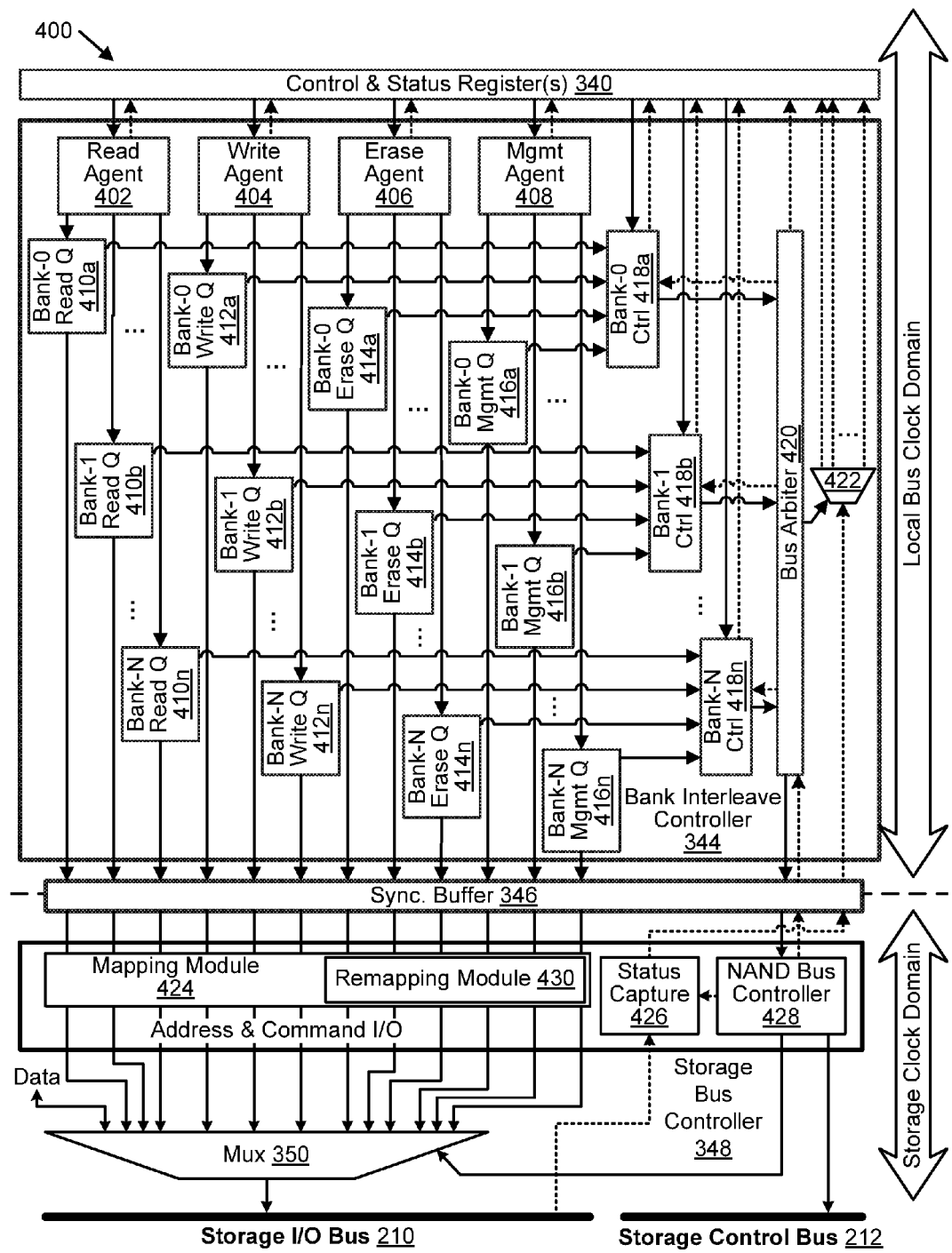
FIG. 4 is a schematic block diagram illustrating one embodiment of a bank interleave controller in the solid-state storage controller in accordance with the present invention.

The solid-state storage controller 104 and or the cache 102, 112 may also include a bank interleave controller 344, a synchronization buffer 346, a storage bus controller 348, and a multiplexer ("MUX") 350, which are described in relation to FIG. 4.

Bank Interleave

FIG. 4 is a schematic block diagram illustrating one embodiment 400 of a bank interleave controller 344 in the solid-state storage controller 104 in accordance with the present invention. The bank interleave controller 344 is connected to the control and status registers 340 and to the storage I/O bus 210 and storage control bus 212 through the MUX 350, storage bus controller 348, and synchronization buffer 346, which are described below. The bank interleave controller 344 includes a read agent 402, a write agent 404, an erase agent 406, a management agent 408, read queues 410a-n, write queues 412a-n, erase queues 414a-n, and management queues 416a-n for the banks 214 in the solid-state storage media 110, bank controllers 418a-n, a bus arbiter 420, and a status MUX 422, which are described below. The storage bus controller 348 includes a mapping module 424 with a remapping module 430, a status capture module 426, and a NAND bus controller 428, which are described below.

The bank interleave controller 344 directs one or more commands to two or more queues in the bank interleave controller 104 and coordinates among the banks 214 of the solid-state storage media 110 execution of the commands stored in the queues, such that a command of a first type executes on one bank 214a while a command of a second type executes on a second bank 214b. The one or more commands are separated by command type into the queues. Each bank 214 of the solid-state storage media 110 has a corresponding set of queues within the bank interleave controller 344 and each set of queues includes a queue for each command type.

The bank interleave controller 344 coordinates among the banks 214 of the solid-state storage media 110 execution of the commands stored in the queues. For example, a command of a first type executes on one bank 214a while a command of a second type executes on a second bank 214b. Typically the command types and queue types include read and write commands and queues 410, 412, but may also include other commands and queues that are storage media specific. For example, in the embodiment depicted in FIG. 4, erase and management queues 414, 416 are included and would be appropriate for flash memory, NRAM, MRAM, DRAM, PRAM, etc.

For other types of solid-state storage media 110, other types of commands and corresponding queues may be included without straying from the scope of the invention. The flexible nature of an FPGA solid-state storage controller 104 allows flexibility in storage media. If flash memory were changed to another solid-state storage type, the bank interleave controller 344, storage bus controller 348, and MUX 350 could be altered to accommodate the media type without significantly affecting the data pipelines 106, 108 and other solid-state storage controller 104 functions.

In the embodiment depicted in FIG. 4, the bank interleave controller 344 includes, for each bank 214, a read queue 410 for reading data from the solid-state storage media 110, a write queue 412 for write commands to the solid-state storage media 110, an erase queue 414 for erasing an erase block in the solid-state storage, an a management queue 416 for management commands. The bank interleave controller 344 also includes corresponding read, write, erase, and management agents 402, 404, 406, 408. In another embodiment, the control and status registers 340 and control queues 342 or similar components queue commands for data sent to the banks 214 of the solid-state storage media 110 without a bank interleave controller 344.

The agents 402, 404, 406, 408, in one embodiment, direct commands of the appropriate type destined for a particular bank 214a to the correct queue for the bank 214a. For example, the read agent 402 may receive a read command for bank-1 214b and directs the read command to the bank-1 read queue 410b. The write agent 404 may receive a write command to write data to a location in bank-0 214a of the solid-state storage media 110 and will then send the write command to the bank-0 write queue 412a. Similarly, the erase agent 406 may receive an erase command to erase an erase block in bank-1 214b and will then pass the erase command to the bank-1 erase queue 414b. The management agent 408 typically receives management commands, status requests, and the like, such as a reset command or a request to read a configuration register of a bank 214, such as bank-0 214a. The management agent 408 sends the management command to the bank-0 management queue 416a.

The agents 402, 404, 406, 408 typically also monitor status of the queues 410, 412, 414, 416 and send status, interrupt, or other messages when the queues 410, 412, 414, 416 are full, nearly full, non-functional, etc. In one embodiment, the agents 402, 404, 406, 408 receive commands and generate corresponding sub-commands. In one embodiment, the agents 402, 404, 406, 408 receive commands through the control & status registers 340 and generate corresponding sub-commands which are forwarded to the queues 410, 412, 414, 416. One of skill in the art will recognize other functions of the agents 402, 404, 406, 408.

The queues 410, 412, 414, 416 typically receive commands and store the commands until required to be sent to the solid-state storage banks 214. In a typical embodiment, the queues 410, 412, 414, 416 are first-in, first-out ("FIFO") registers or a similar component that operates as a FIFO. In another embodiment, the queues 410, 412, 414, 416 store commands in an order that matches data, order of importance, or other criteria.

The bank controllers 418 typically receive commands from the queues 410, 412, 414, 416 and generate appropriate sub-commands. For example, the bank-0 write queue 412a may receive a command to write a page of data packets to bank-0 214a. The bank-0 controller 418a may receive the write command at an appropriate time and may generate one or more write subcommands for each data packet stored in the write buffer 320 to be written to the page in bank-0 214a. For example, bank-0 controller 418a may generate commands to validate the status of bank 0 214a and the solid-state storage array 216, select the appropriate location for writing one or more data packets, clear the input buffers within the solid-state storage memory array 216, transfer the one or more data packets to the input buffers, program the input buffers into the selected location, verify that the data was correctly programmed, and if program failures occur do one or more of interrupting the master controller 224, retrying the write to the same physical location, and retrying the write to a different physical location. Additionally, in conjunction with example write command, the storage bus controller 348 will cause the one or more commands to multiplied to each of the each of the storage I/O buses 210a-n with the logical address of the command mapped to a first physical addresses for storage I/O bus 210a, and mapped to a second physical address for storage I/O bus 210b, and so forth as further described below.

Typically, bus arbiter 420 selects from among the bank controllers 418 and pulls subcommands from output queues within the bank controllers 418 and forwards these to the Storage Bus Controller 348 in a sequence that optimizes the performance of the banks 214. In another embodiment, the bus arbiter 420 may respond to a high level interrupt and modify the normal selection criteria. In another embodiment, the master controller 224 can control the bus arbiter 420 through the control and status registers 340. One of skill in the art will recognize other means by which the bus arbiter 420 may control and interleave the sequence of commands from the bank controllers 418 to the solid-state storage media 110.

The bus arbiter 420 typically coordinates selection of appropriate commands, and corresponding data when required for the command type, from the bank controllers 418 and sends the commands and data to the storage bus controller 348. The bus arbiter 420 typically also sends commands to the storage control bus 212 to select the appropriate bank 214. For the case of flash memory or other solid-state storage media 110 with an asynchronous, bi-directional serial storage I/O bus 210, only one command (control information) or set of data can be transmitted at a time. For example, when write commands or data are being transmitted to the solid-state storage media 110 on the storage I/O bus 210, read commands, data being read, erase commands, management commands, or other status commands cannot be transmitted on the storage I/O bus 210. For example, when data is being read from the storage I/O bus 210, data cannot be written to the solid-state storage media 110.

For example, during a write operation on bank-0 the bus arbiter 420 selects the bank-0 controller 418a which may have a write command or a series of write sub-commands on the top of its queue which cause the storage bus controller 348 to execute the following sequence. The bus arbiter 420 forwards the write command to the storage bus controller 348, which sets up a write command by selecting bank-0 214a through the storage control bus 212, sending a command to clear the input buffers of the solid-state storage elements 110 associated with the bank-0 214a, and sending a command to validate the status of the solid-state storage elements 216, 218, 220 associated with the bank-0 214a. The storage bus controller 348 then transmits a write subcommand on the storage I/O bus 210, which contains the physical addresses including the address of the logical erase block for each individual physical erase solid-stage storage element 216a-m as mapped from the logical erase block address. The storage bus controller 348 then muxes the write buffer 320 through the write sync buffer 308 to the storage I/O bus 210 through the MUX 350 and streams write data to the appropriate page. When the page is full, then storage bus controller 348 causes the solid-state storage elements 216a-m associated with the bank-0 214a to program the input buffer to the memory cells within the solid-state storage elements 216a-m. Finally, the storage bus controller 348 validates the status to ensure that page was correctly programmed.

A read operation is similar to the write example above. During a read operation, typically the bus arbiter 420, or other component of the bank interleave controller 344, receives data and corresponding status information and sends the data to the read data pipeline 108 while sending the status information on to the control and status registers 340. Typically, a read data command forwarded from bus arbiter 420 to the storage bus controller 348 will cause the MUX 350 to gate the read data on storage I/O bus 210 to the read data pipeline 108 and send status information to the appropriate control and status registers 340 through the status MUX 422.

The bus arbiter 420 coordinates the various command types and data access modes so that only an appropriate command type or corresponding data is on the bus at any given time. If the bus arbiter 420 has selected a write command, and write subcommands and corresponding data are being written to the solid-state storage media 110, the bus arbiter 420 will not allow other command types on the storage I/O bus 210. Beneficially, the bus arbiter 420 uses timing information, such as predicted command execution times, along with status information received concerning bank 214 status to coordinate execution of the various commands on the bus with the goal of minimizing or eliminating idle time of the busses.

The master controller 224 through the bus arbiter 420 typically uses expected completion times of the commands stored in the queues 410, 412, 414, 416, along with status information, so that when the subcommands associated with a command are executing on one bank 214a, other subcommands of other commands are executing on other banks 214b-n. When one command is fully executed on a bank 214a, the bus arbiter 420 directs another command to the bank 214a. The bus arbiter 420 may also coordinate commands stored in the queues 410, 412, 414, 416 with other commands that are not stored in the queues 410, 412, 414, 416.

For example, an erase command may be sent out to erase a group of erase blocks within the solid-state storage media 110. An erase command may take 10 to 1000 times more time to execute than a write or a read command or 10 to 100 times more time to execute than a program command. For N banks 214, the bank interleave controller 344 may split the erase command into N commands, each to erase a virtual erase block of a bank 214a. While bank-0 214a is executing an erase command, the bus arbiter 420 may select other commands for execution on the other banks 214b-n. The bus arbiter 420 may also work with other components, such as the storage bus controller 348, the master controller 224, etc., to coordinate command execution among the buses. Coordinating execution of commands using the bus arbiter 420, bank controllers 418, queues 410, 412, 414, 416, and agents 402, 404, 406, 408 of the bank interleave controller 344 can dramatically increase performance over other solid-state storage systems without a bank interleave function.

In one embodiment, the solid-state controller 104 includes one bank interleave controller 344 that serves all of the storage elements 216, 218, 220 of the solid-state storage media 110. In another embodiment, the solid-state controller 104 includes a bank interleave controller 344 for each column of storage elements 216a-m, 218a-m, 220a-m. For example, one bank interleave controller 344 serves one column of storage elements SSS 0.0-SSS M.0 216a, 216b, . . . 216m, a second bank interleave controller 344 serves a second column of storage elements SSS 0.1-SSS M.1 218a, 218b, . . . 218m etc.

Storage-Specific Components

The solid-state storage controller 104 includes a synchronization buffer 346 that buffers commands and status messages sent and received from the solid-state storage media 110. The synchronization buffer 346 is located at the boundary between the solid-state storage clock domain and the local bus clock domain and provides buffering to account for the clock domain differences. The synchronization buffer 346, write synchronization buffer 308, and read synchronization buffer 328 may be independent or may act together to buffer data, commands, status messages, etc. In one embodiment, the synchronization buffer 346 is located where there are the fewest number of signals crossing the clock domains. One skilled in the art will recognize that synchronization between clock domains may be arbitrarily moved to other locations within the cache 102, 112 in order to optimize some aspect of design implementation.

The solid-state storage controller 104 includes a storage bus controller 348 that interprets and translates commands for data sent to and read from the solid-state storage media 110 and status messages received from the solid-state storage media 110 based on the type of solid-state storage media 110. For example, the storage bus controller 348 may have different timing requirements for different types of storage, storage with different performance characteristics, storage from different manufacturers, etc. The storage bus controller 348 also sends control commands to the storage control bus 212.

In one embodiment, the solid-state storage controller 104 includes a MUX 350 that comprises an array of multiplexers 350a-n where each multiplexer is dedicated to a row in the solid-state storage array 110. For example, multiplexer 350a is associated with solid-state storage elements 216a, 218a, 220a. MUX 350 routes the data from the write data pipeline 106 and commands from the storage bus controller 348 to the solid-state storage media 110 via the storage I/O bus 210 and routes data and status messages from the solid-state storage media 110 via the storage I/O bus 210 to the read data pipeline 108 and the control and status registers 340 through the storage bus controller 348, synchronization buffer 346, and bank interleave controller 344.

In one embodiment, the solid-state storage controller 104 includes a MUX 350 for each row of solid-state storage elements (e.g. SSS 0.1 216a, SSS 0.2 218a, SSS 0.N 220a). A MUX 350 combines data from the write data pipeline 106 and commands sent to the solid-state storage media 110 via the storage I/O bus 210 and separates data to be processed by the read data pipeline 108 from commands. Packets stored in the write buffer 320 are directed on busses out of the write buffer 320 through a write synchronization buffer 308 for each row of solid-state storage elements (SSS x.0 to SSS x.N 216, 218, 220) to the MUX 350 for each row of solid-state storage elements (SSS x.0 to SSS x.N 216, 218, 220). The commands and read data are received by the MUXes 350 from the storage I/O bus 210. The MUXes 350 also direct status messages to the storage bus controller 348.

The storage bus controller 348 includes a mapping module 424. The mapping module 424 maps a logical address of an erase block to one or more physical addresses of an erase block. For example, a solid-state storage media 110 with an array of twenty storage elements (e.g. SSS 0.0 to SSS M.0 216) per block 214a may have a logical address for a particular erase block mapped to twenty physical addresses of the erase block, one physical address per storage element. Because the storage elements are accessed in parallel, erase blocks at the same position in each storage element in a row of storage elements 216a, 218a, 220a will share a physical address. To select one erase block (e.g. in storage element SSS 0.0 216a) instead of all erase blocks in the row (e.g. in storage elements SSS 0.0, 0.1, . . . 0.N 216a, 218a, 220a), one bank (in this case bank-0 214a) is selected.

This logical-to-physical mapping for erase blocks is beneficial because if one erase block becomes damaged or inaccessible, the mapping can be changed to map to another erase block. This mitigates the loss of losing an entire virtual erase block when one element's erase block is faulty. The remapping module 430 changes a mapping of a logical address of an erase block to one or more physical addresses of a virtual erase block (spread over the array of storage elements). For example, virtual erase block 1 may be mapped to erase block 1 of storage element SSS 0.0 216a, to erase block 1 of storage element SSS 1.0 216b, . . . , and to storage element M.0 216m, virtual erase block 2 may be mapped to erase block 2 of storage element SSS 0.1 218a, to erase block 2 of storage element SSS 1.1 218b, . . . , and to storage element M.1 218m, etc. Alternatively, virtual erase block 1 may be mapped to one erase block from each storage element in an array such that virtual erase block 1 includes erase block 1 of storage element SSS 0.0 216a to erase block 1 of storage element SSS 1.0 216b to storage element M.0 216m, and erase block 1 of storage element SSS 0.1 218a to erase block 1 of storage element SSS 1.1 218b, . . . , and to storage element M.1 218m, for each storage element in the array up to erase block 1 of storage element M.N 220m.

If erase block 1 of a storage element SSS0.0 216a is damaged, experiencing errors due to wear, etc., or cannot be used for some reason, the remapping module 430 could change the logical-to-physical mapping for the logical address that pointed to erase block 1 of virtual erase block 1. If a spare erase block (call it erase block 221) of storage element SSS 0.0 216a is available and currently not mapped, the remapping module 430 could change the mapping of virtual erase block 1 to point to erase block 221 of storage element SSS 0.0 216a, while continuing to point to erase block 1 of storage element SSS 1.0 216b, erase block 1 of storage element SSS 2.0 (not shown) . . . , and to storage element M.0 216m. The mapping module 424 or remapping module 430 could map erase blocks in a prescribed order (virtual erase block 1 to erase block 1 of the storage elements, virtual erase block 2 to erase block 2 of the storage elements, etc.) or may map erase blocks of the storage elements 216, 218, 220 in another order based on some other criteria.

In one embodiment, the erase blocks could be grouped by access time. Grouping by access time, meaning time to execute a command, such as programming (writing) data into pages of specific erase blocks, can level command completion so that a command executed across the erase blocks of a virtual erase block is not limited by the slowest erase block. In other embodiments, the erase blocks may be grouped by wear level, health, etc. One of skill in the art will recognize other factors to consider when mapping or remapping erase blocks.

In one embodiment, the storage bus controller 348 includes a status capture module 426 that receives status messages from the solid-state storage media 110 and sends the status messages to the status MUX 422. In another embodiment, when the solid-state storage media 110 is flash memory, the storage bus controller 348 includes a NAND bus controller 428. The NAND bus controller 428 directs commands from the read and write data pipelines 106, 108 to the correct location in the solid-state storage media 110, coordinates timing of command execution based on characteristics of the flash memory, etc. If the solid-state storage media 110 is another solid-state storage type, the NAND bus controller 428 would be replaced by a bus controller specific to the storage type. One of skill in the art will recognize other functions of a NAND bus controller 428.

Data Caching

Figure 5:
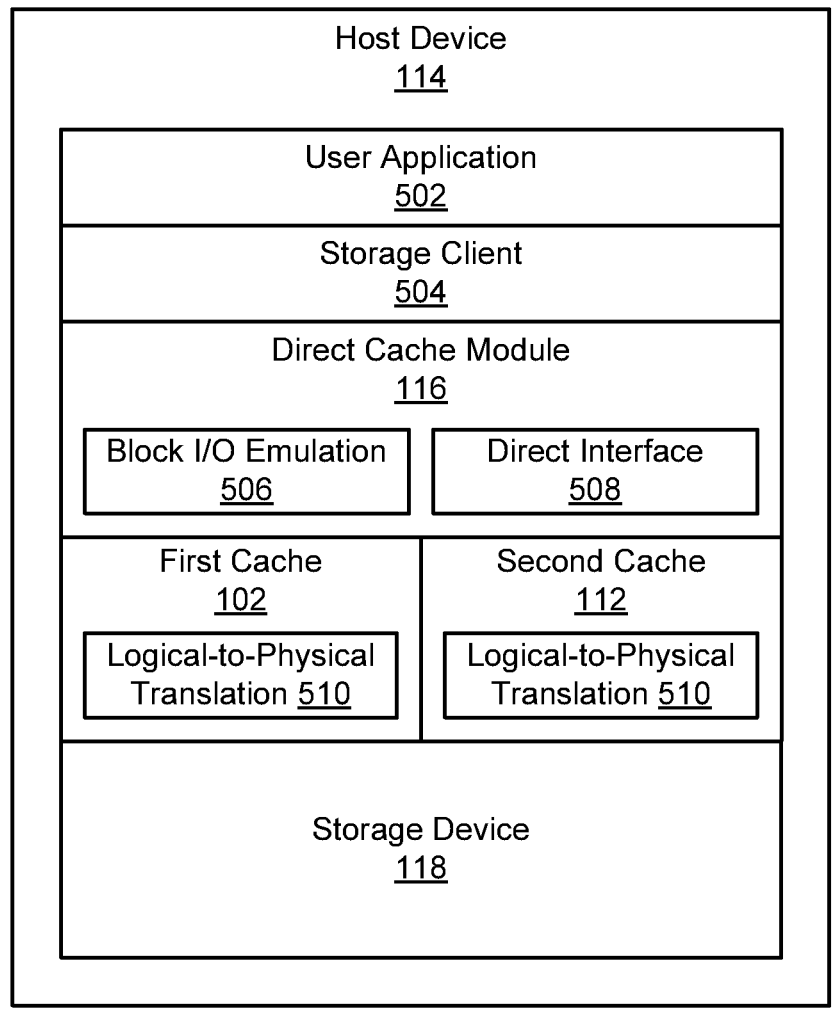
FIG. 5 is a schematic block diagram illustrating one embodiment of a host device in accordance with the present invention.

FIG. 5 depicts one embodiment of a host device 114. The host device 114 may be similar, in certain embodiments, to the host device 114 depicted in FIG. 1. The depicted embodiment includes a user application 502 in communication with a storage client 504. The storage client 504 is in communication with a direct cache module 116, which, in one embodiment, is substantially similar to the direct cache module 116 of FIG. 1, described above. The direct cache module 116, in the depicted embodiment, is in communication with the first cache 102, the second cache 112, and the storage device 118.

In one embodiment, the user application 502 is a software application operating on or in conjunction with the storage client 504. The storage client 504 manages file systems, files, data, and the like and utilizes the functions and features of the direct cache module 116, the first cache 102, the second cache 112, and the storage device 118. Representative examples of storage clients include, but are not limited to, a server, a file system, an operating system, a database management system ("DBMS"), a volume manager, and the like.

In the depicted embodiment, the storage client 504 is in communication with the direct cache module 116. In a further embodiment, the storage client 504 may also be in communication with one or more of the first cache 102, the second cache 112, and the storage device 118 directly. The storage client 504, in one embodiment, reads data from and writes data to the storage device 118 through the direct cache module 116, which uses the first cache 102 and the second cache 112 to cache read data and write data for the storage device 118. In a further embodiment, the direct cache module 116 caches data in a manner that is substantially transparent to the storage client 504, with the storage client 504 sending read requests and write requests directly to the direct cache module 116.

In one embodiment, the direct cache module 116 has exclusive access to, and/or control over the first cache 102, the second cache 112, and the storage device 118. The direct cache module 116 may represent itself to the storage client 504 as a storage device. For example, the direct cache module 116 may represent itself as a conventional block storage device. As described above with regard to the direct cache module 116 depicted in the embodiment of FIG. 1, in various embodiments, the direct cache module 116 may be embodied by one or more of a storage controller of the first cache 102, a storage controller of the second cache 112, and/or a storage controller of the storage device 118; a separate hardware controller device that interfaces with the first cache 102, the second cache 112, and the storage device 118; a device driver loaded on the host device 114; and the like.

In one embodiment, the host device 114 loads a device driver for the direct cache module 116. In a further embodiment, the host device 114 loads device drivers for the first cache 102, the second cache 112, and/or the storage device 118. The direct cache module 116 may communicate with the first cache 102, the second cache 112, and/or the storage device 118 through device drivers loaded on the host device 114, through a storage controller of the first cache 102, a storage controller of the second cache 112, and/or a storage controller of the storage device 118, or the like.

In one embodiment, the storage client 504 communicates with the direct cache module 116 through an Input/Output (I/O) interface represented by a block I/O emulation layer 506. In certain embodiments, the fact that the direct cache module 116 is providing caching services in front of one or more caches 102, 112, and/or one or more backing stores may be transparent to the storage client 504. In such an embodiment, the direct cache module 116 may present (i.e. identify itself as) a conventional block device to the storage client 504. In a further embodiment, one or more of the first cache 102, the second cache 112, and the storage device 118 either include a distinct block I/O emulation layer 506 or are conventional block storage devices. Certain conventional block storage devices divide the storage media into volumes or partitions. Each volume or partition may include a plurality of sectors. One or more sectors are organized into a logical block. In certain storage systems, such as those interfacing with the Windows® operating systems, the logical blocks are referred to as clusters. In other storage systems, such as those interfacing with UNIX, Linux, or similar operating systems, the logical blocks are referred to simply as blocks. A logical block or cluster represents a smallest physical amount of storage space on the storage media that is managed by the storage manager. A block storage device may associate n logical blocks available for user data storage across the storage media with a logical block address, numbered from 0 to n.

In certain block storage devices, the logical block addresses may range from 0 to n per volume or partition. In conventional block storage devices, a logical block address maps directly to a particular logical block. In conventional block storage devices, each logical block maps to a particular set of physical sectors on the storage media.

However, the direct cache module 116, the first cache 102, the second cache 112, and/or the storage device 118 may not directly or necessarily associate logical block addresses with particular physical blocks. The direct cache module 116, the first cache 102, the second cache 112, and/or the storage device 118 may emulate a conventional block storage interface to maintain compatibility with block storage clients 504 and with conventional block storage commands and protocols.

When the storage client 504 communicates through the block I/O emulation layer 506, the direct cache module 116 appears to the storage client 504 as a conventional block storage device. In one embodiment, the direct cache module 116 provides the block I/O emulation layer 506 which serves as a block device interface, or API. In this embodiment, the storage client 504 communicates with the direct cache module 116 through this block device interface. In one embodiment, the block I/O emulation layer 506 receives commands and logical block addresses from the storage client 504 in accordance with this block device interface. As a result, the block I/O emulation layer 506 provides the direct cache module 116 compatibility with block storage clients 504. In a further embodiment, the direct cache module 116 may communicate with the first cache 102, the second cache 112, and/or the storage device 118 using corresponding block device interfaces.

In one embodiment, a storage client 504 communicates with the direct cache module 116 through a direct interface layer 508. In this embodiment, the direct cache module 116 directly exchanges information specific to the first cache 102, the second cache 112, and/or the storage device 118 with the storage client 504. Similarly, the direct cache module 116, in one embodiment, may communicate with the first cache 102, the second cache 112, and/or the storage device 118 through direct interface layers 508.

A direct cache module 116 using the direct interface 508 may store data on the first cache 102, the second cache 112, and/or the storage device 118 as blocks, sectors, pages, logical blocks, logical pages, erase blocks, logical erase blocks, ECC chunks or in any other format or structure advantageous to the technical characteristics of the first cache 102, the second cache 112, and/or the storage device 118. For example, in one embodiment, the storage device 118 comprises a hard disk drive and the direct cache module 116 stores data on the storage device 118 as contiguous sectors of 512 bytes, or the like, using physical cylinder-head-sector addresses for each sector, logical block addresses for each sector, or the like. The direct cache module 116 may receive a logical address and a command from the storage client 504 and perform the corresponding operation in relation to the first cache 102, the second cache 112, and/or the storage device 118. The direct cache module 116, the first cache 102, the second cache 112, and/or the storage device 118 may support a block I/O emulation layer 506, a direct interface 508, or both a block I/O emulation layer 506 and a direct interface 508.

As described above, certain storage devices, while appearing to a storage client 504 to be a block storage device, do not directly associate particular logical block addresses with particular physical blocks, also referred to in the art as sectors. Such storage devices may use a logical-to-physical translation layer 510. In the depicted embodiment, the first cache 102 and the second cache 112 each include a logical-to-physical translation layer 510. In a further embodiment, the storage device 118 may also include a logical-to-physical translation layer 510. In another embodiment, the direct cache module 116 maintains a single logical-to-physical translation layer 510 for the first cache 102, the second cache 112, and the storage device 118. In another embodiment, the direct cache module 116 maintains a distinct logical-to-physical translation layer 510 for each of the first cache 102, the second cache 112, and the storage device 118.

The logical-to-physical translation layer 510 provides a level of abstraction between the logical block addresses used by the storage client 504 and the physical block addresses at which the first cache 102, the second cache 112, and/or the storage device 118 store the data. In the depicted embodiment, the logical-to-physical translation layer 510 maps logical block addresses to physical block addresses of data stored on the media of the first cache 102 and on the media of the second cache 112. This mapping allows data to be referenced in a logical address space using logical identifiers, such as a logical block address. A logical identifier does not indicate the physical location of data in the first cache 102 and the second cache 112, but is an abstract reference to the data. The mapping module 424 and the remapping module 430 of FIG. 4, discussed above, are one example of a logical-to-physical translation layer 510.

In one embodiment, the first cache 102 and the second cache 112 share a logical address space. The direct cache module 116, in one embodiment, mirrors data corresponding to a logical address in the shared address space to both the first cache 102 and the second cache 112, so that both the first cache 102 and the second cache 112 can service subsequent read requests for the data of the logical address. In a further embodiment, the direct cache module 116 may assign separate portions of the logical address space to the first cache 102 and the second cache 112, so that the first cache 102 and the second cache 112 each cache data corresponding to distinct portions of the shared address space. For example, in one embodiment, the direct cache module 116 may divide the shared logical address space into even and odd addresses and assign the even addresses to one of the first cache 102 and the second cache 112 and assign the odd addresses to the other of the first cache 102 and the second cache 112.

In a further embodiment, the direct cache module 116 initially mirrors write request data to both the first cache 102 and the second cache 112, regardless of a logical address corresponding to the write request, and transitions to caching data in one of the first cache 102 and the second cache 112 based on logical addresses as the write request data is subsequently written to the storage device 118. At least a portion of the shared address space of the first cache 102 and the second cache 112, in one embodiment, corresponds to a physical or logical address space for the storage device 118, so that the direct cache module 116 can use the same address identifier for data cached in the first cache 102 and the second cache 112 and for data stored in the storage device 118, without additional mapping or translation.

In the depicted embodiment, the first cache 102 and the second cache 112 manage the physical block addresses in the distinct, separate physical address spaces of the first cache 102 and the second cache 112. In one example, contiguous logical block addresses may in fact be stored in non-contiguous physical block addresses as the logical-to-physical translation layer 510 determines the location on the physical media of the first cache 102 and the physical media of the second cache 112 at which to perform data operations.

Furthermore, in one embodiment, the logical address space of the first cache 102 and the second cache 112 is substantially larger than the physical address space. This "thinly provisioned" or "sparse address space" embodiment, allows the number of logical addresses for data references to greatly exceed the number of possible physical addresses. A thinly provisioned, sparse address space also allows the first cache 102 and the second cache 112 to cache data for a storage device 118 with a larger address space (i.e. a larger storage capacity) than the combined physical address spaces of the first cache 102 and the second cache 112.

In one embodiment, the logical-to-physical translation layers 510 each include a map or index that maps logical block addresses to physical block addresses. The map may be in the form of a b-tree, a content addressable memory ("CAM"), a binary tree, and/or a hash table, and the like. In certain embodiments, the logical-to-physical translation layer 510 is a tree with nodes that represent logical block addresses and include references to corresponding physical block addresses.

As stated above, in conventional block storage devices, a logical block address maps directly to a particular physical block. When a storage client 504 communicating with the conventional block storage device deletes data for a particular logical block address, the storage client 504 may note that the particular logical block address is deleted and can re-use the physical block associated with that deleted logical block address without the need to perform any other action.

Conversely, when a storage client 504, communicating with a storage controller 104 or device driver with a logical-to-physical translation layer 510 (a storage controller 104 or device driver that does not map a logical block address directly to a particular physical block), deletes data of a logical block address, the corresponding physical block address remains allocated because the storage client 504 may not communicate the change in used blocks to the storage controller 104 or device driver. The storage client 504 may not be configured to communicate changes in used blocks (also referred to herein as "data block usage information"). Because the storage client 504, in one embodiment, uses the block I/O emulation 506 layer, the storage client 504 may erroneously believe that the direct cache module 116, the first cache 102, the second cache 112, and/or the storage device 118 is a conventional block storage device that would not utilize the data block usage information. Or, in certain embodiments, other software layers between the storage client 504 and the direct cache module 116, the first cache 102, the second cache 112, and/or the storage device 118 may fail to pass on data block usage information.

Consequently, the storage controller 104 or device driver may preserve the relationship between the logical block address and a physical address and the data on the first cache 102, the second cache 112, and/or the storage device 118 corresponding to the physical block. As the number of allocated blocks increases, the performance of the first cache 102, the second cache 112, and/or the storage device 118 may suffer depending on the configuration of the first cache 102, the second cache 112, and/or the storage device 118.

Specifically, in certain embodiments, the first cache 102, the second cache 112, and/or the storage device 118 is configured to store data sequentially, using an append-only writing process, and use a storage space recovery process that re-uses non-volatile storage media storing deallocated/unused logical blocks. Specifically, as described above, the first cache 102, the second cache 112, and/or the storage device 118 may sequentially write data on the solid-state storage media 110 in a log structured format and within one or more physical structures of the storage elements, the data is sequentially stored on the solid-state storage media 110. Those of skill in the art will recognize that other embodiments that include a single cache, either first cache 102 or second cache 112, can use the same append-only writing process and storage space recovery process.

As a result of storing data sequentially and using an append-only writing process, the first cache 102, the second cache 112, and/or the storage device 118 achieves a high write throughput and a high number of I/O operations per second (IOPS). The first cache 102, the second cache 112, and/or the storage device 118 may include a storage space recovery, or garbage collection process that re-uses data storage cells to provide sufficient storage capacity. The storage space recovery process reuses storage cells for logical blocks marked as deallocated, invalid, unused, or otherwise designated as available for storage space recovery in the logical-physical translation layer 510.

As described above, the storage space recovery process determines that a particular section of storage may be recovered. Once a section of storage has been marked for recovery, the first cache 102, the second cache 112, and/or the storage device 118 may relocate valid blocks in the section. The storage space recovery process, when relocating valid blocks, copies the packets and writes them to another location so that the particular section of storage may be reused as available storage space, typically after an erase operation on the particular section. The first cache 102, the second cache 112, and/or the storage device 118 may then use the available storage space to continue sequentially writing data in an append-only fashion. Consequently, the storage controller 104 expends resources and overhead in preserving data in valid blocks. Therefore, physical blocks corresponding to deleted logical blocks may be unnecessarily preserved by the storage controller 104, which expends unnecessary resources in relocating the physical blocks during storage space recovery.

Some storage devices are configured to receive messages or commands notifying the storage device of these unused logical blocks so that the storage device may deallocate the corresponding physical blocks. As used herein, to deallocate a physical block includes marking the physical block as invalid, unused, or otherwise designating the physical block as available for storage space recovery, its contents on storage media no longer needing to be preserved by the storage device. Data block usage information may also refer to information maintained by a storage device regarding which physical blocks are allocated and/or deallocated/unallocated and changes in the allocation of physical blocks and/or logical-to-physical block mapping information. Data block usage information may also refer to information maintained by a storage device regarding which blocks are in use and which blocks are not in use by a storage client 504. Use of a block may include storing of data in the block on behalf of the storage client 504, reserving the block for use by the storage client 504, and the like.

While physical blocks may be deallocated, in certain embodiments, the first cache 102, the second cache 112, and/or the storage device 118 may not immediately erase the data on the storage media. An erase operation may be performed later in time. In certain embodiments, the data in a deallocated physical block may be marked as unavailable by the first cache 102, the second cache 112, and/or the storage device 118 such that subsequent requests for data in the physical block return a null result or an empty set of data.

One example of a command or message for such deallocation is the "TRIM" function of the "Data Set Management" command under the T13 technical committee command set specification maintained by INCITS. A storage device, upon receiving a TRIM command, may deallocate physical blocks for logical blocks whose data is no longer needed by the storage client 504. A storage device that deallocates physical blocks may achieve better performance and increased storage space, especially storage devices that write data using certain processes and/or use a similar data storage recovery process as that described above.

Consequently, the performance of the storage device is enhanced as physical blocks are deallocated when they are no longer needed such as through the TRIM command or other similar deallocation commands issued to the first cache 102, the second cache 112, and/or the storage device 118. In one embodiment, the direct cache module 116 clears data that is mirrored to both the first cache 102 and the second cache 112 from one of the caches 102, 112 in response to the storage device 118 storing the data. As used herein, clearing or trimming data includes deallocating physical media associated with the data, marking the data as invalid or unused (using either a logical or physical address of the data), erasing physical media associated with the data, overwriting the data with different data, issuing a TRIM command or other deallocation command relative to the data, or otherwise recovering storage capacity of physical storage media corresponding to the data. Clearing data from one of the first cache 102 and the second cache 112 in response to the storage device 118 storing the data frees storage capacity in the first cache 102 and the second cache 112 to cache more data for the storage device 118 while maintaining the benefits of redundant write caching.

Figure 6:
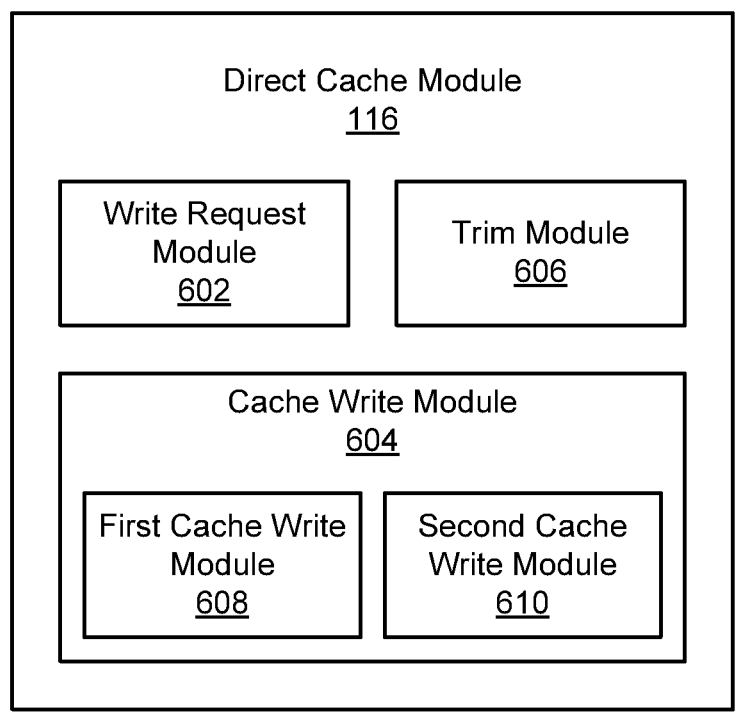
FIG. 6 is a schematic block diagram illustrating one embodiment of a direct cache module in accordance with the present invention.

FIG. 6 depicts one embodiment of the direct cache module 116. In the depicted embodiment, the direct cache module 116 includes a write request module 602, a cache write module 604, and a trim module 606. The direct cache module 116 of FIG. 6, in one embodiment, is substantially similar to the direct cache module 116 described above with regard to FIG. 1 and/or FIG. 5. In general, the direct cache module 116 mirrors dirty data that the storage device 118 does not yet store to provide redundancy for the data. Once the direct cache module 116 or another entity writes the data to the storage device 118, in general, the direct cache module 116 discards the mirror of the data to increase caching capacity of the direct cache module 116.

In one embodiment, the write request module 602 detects a write request to store data on the storage device 118. The write request module 602 may detect the write request by receiving the write request directly, detecting a write request sent to a different module or entity (such as detecting a write request sent directly to the storage device 118), or the like. In one embodiment, the host device 114 sends the write request. The direct cache module 116, in one embodiment, represents itself to the host device 114 as a storage device, and the host device 114 sends write requests directly to the write request module 602.

A write request, in one embodiment, includes data that is not stored on the storage device 118. Data that is not stored on the storage device 118, in various embodiments, includes new data not yet stored on the storage device 118, modifications to data that is stored on the storage device 118, and the like. The write request, in various embodiments, may directly include the data, may include a reference, a pointer, or an address for the data, or the like. For example, in one embodiment, the write request includes a range of addresses indicating data to be stored on the storage device 118 by way of a Direct Memory Access ("DMA") or Remote DMA ("RDMA") operation. In a further embodiment, the write request includes one or more destination addresses for the data, such as logical and/or physical addresses for the data on the first cache 102, the second cache 112, and/or the storage device 118. The write request module 602, in one embodiment, sends the data of the detected write request and the corresponding address or set of addresses to the first cache write module 608 and/or the second cache write module 610 for caching the data in the first cache 102 and the second cache 112. The write request module 602 and/or another cooperating module, in various embodiments, may retrieve the data of a write request directly from the write request itself, from a storage location referenced by a write request (i.e. from a location in system memory or other data storage referenced in a DMA or RDMA request), or the like.

The cache write module 604, in one embodiment, writes data of the write request to the first cache 102 and to the second cache 112, mirroring the data. In the depicted embodiment, the cache write module 604 includes a first cache write module 608 and a second cache write module 610. In one embodiment, the first cache write module 608 writes the data of the write request to the first cache 102 and the second cache write module 610 writes the data of the write request to the second cache 112. The first cache write module 608 and the second cache write module 610, in one embodiment, write the data substantially simultaneously. In a further embodiment, the first cache write module 608 may write the data and transmit the data to the second cache write module 610 for minoring, or vice versa.

The trim module 606, in one embodiment, transitions data stored in the first cache 102 and the second cache 112 from a mirrored state to a logically striped state, conserving storage capacity in the first and second caches 102, 112 once the storage device 118 stores the data. In one embodiment, the trim module 606 transitions data from a mirrored state to a striped state by clearing or trimming the data from either one of the first cache 102 and the second cache 112 in response to an indicator that the storage device 118 stores the data. The data that the trim module 606 clears or trims, in one embodiment, remains available in the other of the first cache 102 and the second cache 112 to service read requests.

The trim module 606, in one embodiment, receives a communication that includes an indicator that the storage device 118 stores the data. For example, in one embodiment, a cleaner module such as the cleaner module 708 described below with regard to FIG. 7 may send an indicator to the trim module 606 that the storage device 118 stores the data, the data has been persisted. In a further embodiment, the trim module 606 queries the storage device 118 to determine that the storage device 118 stores the data (e.g. by way of an indicator), scan the storage device 118 for the data, or the like.

In a further embodiment, the trim module 606 may query or scan the first cache 102 and/or the second cache 112 for an indicator that the data in the caches 102, 112 is clean and is thus stored in the storage device 118. In another embodiment, the trim module 606 checks a clean/dirty data structure that includes an indicator whether the storage device 118 stores the data. The trim module 606, in a further embodiment, references indicators in a mapping of logical addresses to physical media addresses to determine whether the storage device 118 stores the data. In light of this specification, other indicators suitable for use by the trim module 606 will be apparent to one of skill in the art, and are considered embodiments of the present invention.

In one embodiment, the trim module 606 delays clearing the data for a period of time after the indicator that the storage device 118 stores the data, until after a predefined event occurs. Delaying clearing the data, in various embodiments, may decrease a processing load of the first cache 102 and/or the second cache 112, may provide redundant caching of the data for a longer period of time, may increase read performance for the data for a longer period of time, or the like. For example, the trim module 606 may clear the data in response to a predefined event such as a lack of available storage capacity in the first cache 102 and/or the second cache 112, a scheduled cache clearing cycle, a cache ejection event, or another predefined event. A cache clearing cycle, in one embodiment, is a periodic or dynamic procedure that the trim module 606 may perform to routinely clear data from the first cache 102 and/or the second cache 112. A cache clearing cycle may be scheduled as a periodic maintenance procedure, scheduled dynamically in response to the occurrence of a predefined event, or the like.

In a further embodiment, the trim module 606 clears or trims data from a cache 102, 112 in response to an indicator that the data is stored in the storage device 118 by sending a TRIM command to a selected cache 102, 112 with an address (or set of addresses, such as a range of addresses) of data to be trimmed. In one embodiment, a cache selection module (discussed below with regard to FIG. 7) selects one of the first cache 102 and the second cache 112 for the trim module 606 to clear or trim the data from. In various embodiments, the trim module 606 may clear data exclusively from the first cache 102, exclusively from the second cache 112, alternating between the first cache 102 and the second cache 112, based on a logical address of the data, according to a deterministic protocol, based on one or more attributes of the first cache 102 and the second cache 112, or the like.

Figure 7:
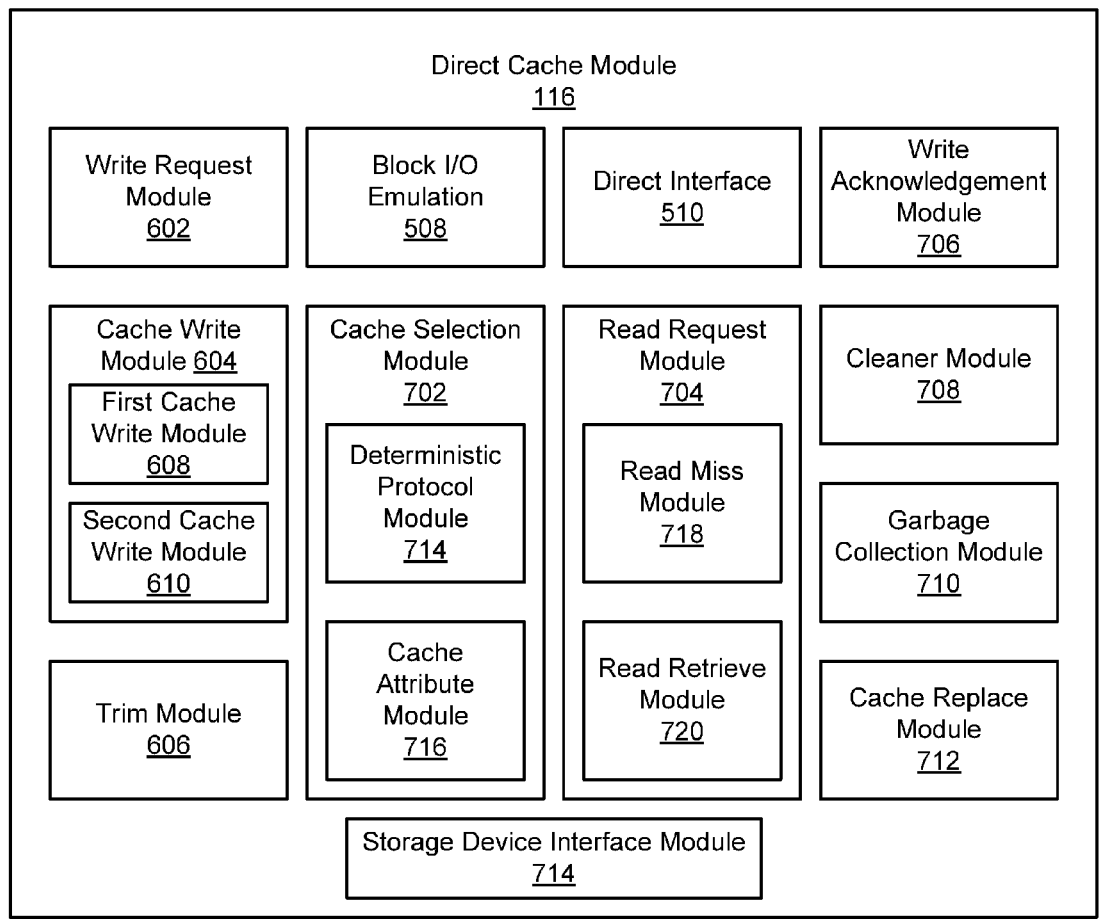
FIG. 7 is a schematic block diagram illustrating another embodiment of a direct cache module in accordance with the present invention.

FIG. 7 depicts another embodiment of the direct cache module 116. In the depicted embodiment, the direct cache module 116 includes the block I/O emulation layer 508, the direct interface layer 510, the write request module 602, the cache write module 604, and the trim module 606, substantially as described above with regard to FIGS. 5 and 6. The direct cache module 116, in the depicted embodiment, further includes a cache selection module 702, a read request module 704, a write acknowledgement module 706, a cleaner module 708, a garbage collection module 710, a cache replace module 712, and a storage device interface module 714.

In one embodiment, the cache selection module 702 selects either the first cache 102 or the second cache 112 for the trim module 606 so that the trim module 606 can clear data from the selected cache 102, 112. In a further embodiment, the cache selection module 702 selects a cache 102, 112 for the trim module 606 to trim data by selecting either the first cache 102 or the second cache 112 in which to maintain the data. In the depicted embodiment, the cache selection module 702 includes a deterministic protocol module 714 and a cache attribute module 716.

In one embodiment, the cache selection module 702 uses the deterministic protocol module 714 to select either the first cache 102 or the second cache 112 according to a deterministic protocol. A deterministic protocol, as used herein, is a predictable, repeatable pattern. In an embodiment where the deterministic protocol module 714 selects one of the first cache 102 and the second cache 112 based on a deterministic protocol, other modules, such as the read request module 704, can determine which of the first cache 102 and the second cache 112 stores data based on the deterministic protocol, without maintaining a separate data structure tracking locations for data within the caches 102, 112 and without querying the first cache 102 and/or the second cache 112 to determine which cache 102, 112 stores specific data.

In one embodiment, the first cache 102 and the second cache 112 share a logical address space, and the deterministic protocol module 714 uses a deterministic protocol that is based on a logical address that is associated with data. For example, the deterministic protocol module 714, in one embodiment, divides logical addresses into two groups and assigns one group to the first cache 102 and assigns the second group to the second cache 112. Examples of groups of logical addresses include even logical addresses and odd logical addresses, high logical addresses and low logical addresses, and the like.

In one embodiment, the deterministic protocol module 714 logically stripes data between the first cache 102 and the second cache 112 by alternating selection of the first cache 102 and the second cache 112 for consecutive logical addresses (or ranges of addresses), effectively assigning even logical addresses to one cache 102, 112 and odd logical addresses to the other cache 102, 112. Data is logically striped across the first cache 102 and the second cache 112, in one embodiment, because data corresponding to consecutive logical addresses is stored in different caches 102, 112. In an embodiment where the first cache 102 and the second cache 112 map logical addresses to distinct physical addresses, data that is logically striped between the caches 102, 112 may or may not be physically striped on the storage media 110 of the first cache 102 and the storage media 110 of the second cache 112. Logical striping of data, in one embodiment, retains the load balancing, capacity, and other advantages of physical data striping.

In another embodiment, the deterministic protocol module 714 exclusively selects the first cache 102, exclusively selects the second cache 112, or the like. For example, in various embodiments, one of the caches 102, 112 may have a smaller storage capacity, may have lower reliability, may have a different type of storage media 110, may have a lower data throughput, or the like and the deterministic protocol module 714 may exclusively select that cache for the trim module 606 to clear data. In other embodiments, the deterministic protocol module 714 uses another type of deterministic protocol, such as a hash function or the like, to predictably select one of the first cache 102 and the second cache 112.

In another embodiment, the deterministic protocol module 714 assigns logical addresses that correspond to addresses of the storage device 118 to the first cache 102 and assigns logical addresses that are outside the physical capacity of the storage device 118 to the second cache 112. The deterministic protocol module 714, in one embodiment, maps the logical addresses that correspond to addresses of the storage device 118, which are assigned to the first cache 102, to the logical addresses that are outside the physical capacity of the storage device 118. The deterministic protocol module 714, in various embodiments, may perform the mapping by adding an offset value to a logical address, maintaining a mapping data structure, shifting the bits of a logical address, adding a prefix to a logical address, performing another deterministic binary operation on a logical address, or the like.

In one embodiment, the range of logical addresses that correspond to addresses of the storage device 118 are at a lower end of the logical address space, with logical addresses that are outside the physical capacity of the storage device 118 at the higher end of the logical address space. For example, in one embodiment, the first cache 102 and the second cache 112 share a logical address space that is 64 bit addressable and the storage device 118 has a physical capacity, such as 2 terabytes or the like, that only needs 32 bit logical block addresses. In the example embodiment, the deterministic protocol module 714 may assign logical addresses 0 through $2^{32}$ to the first cache 102 and assign the remaining logical addresses, $2^{32}$ through $2^{64}$ to the second cache 112. Because the higher range of logical addresses is much larger than the lower range of logical addresses, in the example embodiment, the deterministic protocol module 714 may map the lower range of logical addresses to any set of logical addresses in the higher range.

In one embodiment, the cache selection module 702 uses the cache attribute module 716 to select one of the first cache 102 and the second cache 112 based on one or more cache attributes. Cache attributes, in various embodiments, include the type of storage media, such as SLC or MLC type solid-state storage media 110, erase cycle counts, error rates, age, fault history, total storage capacity, remaining storage capacity, access times, and the like. The cache attribute module 716, in one embodiment, weights or otherwise combines several cache attributes to select one of the first cache 102 and the second cache 112. The cache attributes, in one embodiment, may include user preferences, user settings, user prioritization, and/or user rankings for the first cache 102 and the second cache 112. The cache attributes, in a further embodiment, are user selectable. For example, in one embodiment, the cache selection module 702 may receive user input from a user of the host device 114, or the like, indicating which cache attributes to use, indicating weights for various cache attributes, selecting threshold values for various cache attributes, and the like.

In one embodiment, the cache selection module 702 includes one of the deterministic protocol module 714 and the cache attribute module 716 and not the other. In a further embodiment, the cache selection module 702 includes both the deterministic protocol module 714 and the cache attribute module 716. In another embodiment, the cache selection module 702 does not use the deterministic protocol module 714 or the cache attribute module 716, but selects one of the caches 102, 112 in another manner, such as making a random or pseudorandom selection, or the like.

In an embodiment where the cache selection module 702 does not use the deterministic protocol module 714, for example using the cache attribute module 716 or selecting a cache 102, 112 in another manner, the cache selection module 702 may maintain a mapping indicating which of the first cache 102 and the second cache 112 stores which data according to logical addresses or ranges of logical addresses. The mapping, in various embodiments, may include an index, an array, a linked-list, a look-up table, a b-tree, a CAM, a binary tree, a hash table, or another mapping data structure. In one embodiment, the mapping maps a logical address of data to the first cache 102, the second cache 112, or both. In a further embodiment, the cache selection module 702 does not maintain a mapping or use the deterministic protocol module 714, and instead queries one or both of the first cache 102 and the second cache 112 to determine which cache 102, 112 stores data corresponding to a specific logical address.

In one embodiment, the read request module 704 services read requests for data stored in the first cache 102, the second cache 112, and/or the storage device 118. The read request module 704, in one embodiment, detects a read request to retrieve requested data from the storage device 118. In a further embodiment, the read request module 704 receives read requests from the host device 114. A read request is a read command with an indicator, such as a logical address or range of logical addresses, of the data being requested.

The read request module 704, in one embodiment, directs a read request to one of the first cache 102 and the second cache 112 based on a selection by the cache selection module 702. For example, in an embodiment where the cache selection module 702 selects one of the first cache 102 and the second cache 112 for clearing of data based on a deterministic protocol the read request module 704 directs a read request for the data to the other of the first cache 102 and the second cache 112 that was not selected by the cache selection module 702 for clearing. In a further embodiment, the cache selection module 702 may maintain a mapping of which cache 102, 112 stores which data, or may query the first cache 102 and/or the second cache 112 to determine which cache 102, 112 stores specific data, and the read request module 704 may direct a read request to the appropriate cache 102, 112.

In the depicted embodiment, the read request module 704 includes a read miss module 718 and a read retrieve module 720. The read miss module 718, in one embodiment, determines whether or not requested data is stored in either the first cache 102 or the second cache 112. The read miss module 718 may query the first cache 102 and/or the second cache 112 directly, query one of the first cache 102 and the second cache 112 based on a deterministic protocol used by the cache selection module 702, query a mapping of which cache 102, 112 stores which data, or the like to determine whether or not requested data is stored in either the first cache 102 or the second cache 112.

The read retrieve module 720, in one embodiment, returns requested data to the requesting entity, such as the host device 114. If the read miss module 718 determines that either the first cache 102 or the second cache 112 stores the requested data, in one embodiment, the read retrieve module 720 reads the requested data from the determined cache 102, 112 and returns the data to the requesting entity. If the read miss module 718 determines that neither the first cache 102 or the second cache 112 stores the requested data, in one embodiment, the read retrieve module 720 reads the requested data from the storage device 118, writes the requested data to at least one of the first cache 102 and the second cache 112, and returns the requested data to the requesting entity. In one embodiment, the cache selection module 702 selects one of the first cache 102 and the second cache 112 for the read retrieve module 720 to write the requested data to, using the deterministic protocol module 714, the cache attribute module 716, or the like.

In one embodiment, the read retrieve module 720 caches data of a read request in one of the first cache 102 and the second cache 112 based on a deterministic protocol, using the deterministic protocol module 714, or the like. In a further embodiment, the read retrieve module 720 alternates between selection of the first cache 102 and the second cache 112 for consecutive logical addresses so that a portion of the logical address space is assigned to the first cache 102 and a portion of the logical address space is assigned to the second cache 112. By logically striping read request data across the first cache 102 and the second cache 112 or otherwise distributing read caching operations between the first cache 102 and the second cache 112, in one embodiment, the first cache 102 and the second cache 112 form a single logical read cache for the storage device 118.

In one embodiment, the write acknowledgement module 706 acknowledges, to a requesting entity such as the host device 114, a write request that the write request module 602 receives. The write acknowledgement module 706, in a further embodiment, acknowledges persistence of the write request. In one embodiment, the write acknowledgement module 706 implements a particular data integrity policy. Advantageously, embodiments of the present invention permit variations in the data integrity policy that is implemented.

The write acknowledgement module 706, in one embodiment, acknowledges the write request in response to the first cache write module 608 writing data of the write request to the first cache 102, regardless of whether or not the second cache write module 610 has written the data to the second cache 112. Acknowledging a write request regardless of whether the second cache write module 610 has written data of the write request to the second cache 112, in one embodiment, decreases a write time that a client, such as the host device 114, perceives balanced against the cost of some amount of reliability due to redundancy.

In a further embodiment, the write acknowledgement module 706 acknowledges the write request in response to both the first cache write module 608 writing the data to the first cache 102 and the second cache write module 610 writing the data to the second cache 112. Waiting to acknowledge a write request until both the first cache 102 and the second cache 112 store the data of the write request, in one embodiment, increases reliability and redundancy of the data at the possible cost of a slightly increased write time that a client, such as the host device 114, perceives. The data integrity policy, in one embodiment, is user defined. For example, a user may select a write acknowledgement setting for a data integrity policy, select a performance setting that prioritizes performance relative to data integrity, or the like.

In one embodiment, the cleaner module 708 writes data from the first cache 102 and/or the second cache 112 to the storage device 118. Data that is stored in the first cache 102 and/or the second cache 112 that is not yet stored in the storage device 118 is referred to as "dirty" data. Once the storage device 118 stores data, the data is referred to as "clean." The cleaner module 708 cleans data in the first cache 102 and the second cache 112 by writing the data to the storage device 118. The cleaner module 708, in one embodiment, writes data to the storage device 118 based on a write policy.

In one embodiment, the cleaner module 708 uses a write-back write policy, and does not immediately write data of a write request to the storage device 118 upon receiving the write request. Instead, the cleaner module 708, in one embodiment, performs an opportunistic or "lazy" write, writing data to the storage device 118 when the data is ejected from the caches 102, 112, when the caches 102, 112 or the direct cache module 116 has a light load, when available storage capacity in the first cache 102 and/or the second cache 112 falls below a threshold, or the like. In a write-back embodiment, the cleaner module 708 reads data from one of the first cache 102 and the second cache 112, writes the data to the storage device 118, and sets an indicator that the storage device 118 stores the data in response to successfully writing the data to the storage device 118. Setting the indicator that the storage device 118 stores the data alerts the trim module 606 that the data may be cleared from one of the first cache 102 and the second cache 112.

In one embodiment, the cleaner module 708 sets an indicator that the storage device 118 stores data by marking the data as clean in at least one of the first cache 102 and the second cache 112. In a further embodiment, the cleaner module 708 may set an indicator that the storage device 118 stores data by communicating an address of the data to the trim module 606, sending a command to the trim module 606 to clear the data, updating an indicator in a logical to physical mapping, or the like.

In one embodiment, the cleaner module 708 maintains a data structure indicating which data in the first cache 102 and the second cache 112 is clean and which data is dirty. In another embodiment, the cleaner module 708 references indicators in a mapping of logical addresses to physical media addresses to determine which data in the first cache 102 and the second cache 112 is clean and which data is dirty. In a further embodiment, the cleaner module 708 determines that data is dirty by determining whether the data is stored in both the first cache 102 and the second cache 112. Because dirty data is mirrored in both the first cache 102 and the second cache 112 and clean data is cached in a single one of the first cache 102 and the second cache 112, in one embodiment, the cleaner module 708 can determine whether data is clean or dirty by determining whether the data resides in both the first cache 102 and/or the second cache 112, without tracking clean and dirty data. The cleaner module 708, in this embodiment, writes data to the storage device 118 in response to determining that both the first cache 102 and the second cache 112 store the data.

In another embodiment, instead of cleaning data according to a write-back write policy, the cleaner module 708 uses a write-through policy, performing a synchronous write to the storage device 118 for each write request. The cleaner module 708, in one embodiment, transitions from a write-back to a write-through write policy in response to a predefined error condition, such as an error or failure of one of the first cache 102 and the second cache 112, or the like.

In one embodiment, the garbage collection module 710 recovers storage capacity of physical storage media corresponding to data that is marked as invalid, such as data cleared by the trim module 606. The garbage collection module 710, in one embodiment, is integrated with the cleaner module 708 and/or the trim module 606 and recovers storage capacity of the physical storage media substantially immediately in response to the trim module 606 clearing the data, simultaneously with the trim module 606 clearing the data, or the like.

In a further embodiment, the garbage collection module 710 recovers storage capacity of physical storage media corresponding to invalid data opportunistically. The garbage collection module 710, in another embodiment, recovers data substantially independently of the timing of the cleaner module 708 and/or the trim module 606. For example, the garbage collection module 710 may recover storage capacity in response to a lack of available storage capacity, a percentage of data marked as invalid reaching a predefined threshold level, a consolidation of valid data, an error detection rate for a section of physical storage media reaching a threshold value, performance crossing a threshold value, a scheduled garbage collection cycle, identifying a section of physical storage media with a high amount of invalid data, identifying a section of physical storage media with a low amount of wear, or the like.

In one embodiment, the garbage collection module 710 relocates valid data in a section of physical storage media in the first cache 102 or the second cache 112 that the garbage collection module 710 is recovering. In one embodiment, the garbage collection module 710 is part of an autonomous garbage collector system that operates within the first cache 102 and/or the second cache 112. This allows each cache 102, 112 to manage data so that data is systematically spread throughout the solid-state storage media 110, or other physical storage media, to improve performance, data reliability and to avoid overuse and underuse of any one location or area of the solid-state storage media 110 and to lengthen the useful life of the solid-state storage media 110.

The garbage collection module 710, upon recovering a section of physical storage media, allows the first cache 102 or the second cache 112 to re-use the section of physical storage media to store different data. In one embodiment, the garbage collection module 710 adds the recovered section of physical storage media to an available storage pool, or the like. The garbage collection module 710, in one embodiment, erases existing data in a recovered section. In a further embodiment, the garbage collection module 710 allows the first cache 102 or the second cache 112 to overwrite existing data in a recovered section. Whether or not the garbage collection module 710, in one embodiment, erases existing data in a recovered section may depend on the nature of the physical storage media. For example, Flash media requires that cells be erased prior to reuse where magnetic media such as hard drives does not have that requirement. In an embodiment where the garbage collection module 710 does not erase data in a recovered section, but allows the first cache 102 or the second cache 112 to overwrite data in the recovered section, the garbage collection module 710, in certain embodiments, may mark the data in the recovered section as unavailable to service read requests so that subsequent requests for data in the recovered section return a null result or an empty set of data until the first cache 102 or the second cache 112 overwrites the data.

In one embodiment, the garbage collection module 710 recovers storage capacity of the first cache 102 and/or the second cache 112 one or more storage divisions at a time. A storage division, in one embodiment, is an erase block or other predefined division. For flash memory, an erase operation on an erase block writes ones to every bit in the erase block. This is a lengthy process compared to a program operation which starts with a location being all ones, and as data is written, some bits are changed to zero. However, where the solid-state storage 110 is not flash memory or has flash memory where an erase cycle takes a similar amount of time as other operations, such as a read or a program, the trim module 606 may erase the data of a storage division instead of the garbage collection module 710.

In one embodiment, allowing the trim module 606 to mark data as invalid rather than actually erasing the data and allowing the garbage collection module 710 to recover the physical media associated with invalid data, increases efficiency because, as mentioned above, for flash memory and other similar storage an erase operation takes a significant amount of time. Allowing the garbage collection module 710 to operate autonomously and opportunistically within the first cache 102 and the second cache 112 provides a way to separate erase operations from reads, writes, and other faster operations so that the caches 102, 112 operate very efficiently.

In one embodiment, the cache replace module 712 provides for the physical replacement of one of the first cache 102 and the second cache 112 due to device failure, a device upgrade, or the like. The cache replace module 712, in one embodiment, detects that one of the first cache 102 and the second cache 112 has been replaced with a replacement cache. The cache replace module 712 may detect a replacement cache automatically, in response to a user command, as part of a startup routine, or the like.

The cache replace module 712, in a further embodiment, minors dirty data from the remaining one of the first cache 102 and the second cache 112 to the detected replacement cache in response to detecting the replacement cache. In another embodiment, the cleaner module 708 writes dirty data from the remaining one of the first cache 102 and the second cache 112 to the storage device 118 in response to the cache replace module 712 detecting the replacement cache. Once the cache replace module 712 detects the replacement cache, in one embodiment, the replacement cache becomes either the first cache 102 or the second cache 112, and is treated as such by the direct cache module 116. In one embodiment, the replacement cache shares the logical address space with the remaining one of the first cache 102 and the second cache 112, etc.

In one embodiment, the storage device interface module 714 provides an interface between the direct cache module 116 and the first cache 102, the second cache 112, and/or the storage device 118. As described above with regard to FIG. 5, in various embodiments, the direct cache module 116 may interact with the first cache 102, the second cache 112, and/or the storage device 118 through a block device interface, a direct interface, a device driver on the host device 114, a storage controller, or the like. In one embodiment, the storage device interface module 714 provides the direct cache module 116 with access to one or more of these interfaces. For example, the storage device interface module 714 may receive read commands, write commands, and clear (or TRIM) commands from one or more of the first cache write module 608, the second cache write module 610, the trim module 606, the read request module 704, the cleaner module 708, the garbage collection module 710, the cache replace module 712, and the like and relay the commands to the first cache 102, the second cache 112, and/or the storage device 118. In a further embodiment, the storage device interface module 714 may translate or format a command into a format compatible with an interface for the first cache 102, the second cache 112, and/or the storage device 118.

In one embodiment, the storage device interface module 714 has exclusive ownership over the storage device 118 and the direct cache module 116 is an exclusive gateway to accessing the storage device 118. Providing the storage device interface module 714 with exclusive ownership over the storage device 118 and preventing access to the storage device 118 by other routes obviates stale data issues and cache coherency requirements, because all changes to data in the storage device 114 are processed by the direct cache module 116.

In a further embodiment, the storage device interface module 714 does not have exclusive ownership of the storage device 118, and the storage device interface module 714 manages cache coherency for the first cache 102 and the second cache 112. For example, in various embodiments, the storage device interface module 714 may access a common directory with other users of the storage device 118 to maintain coherency, may monitor write operations from other users of the storage device 118, participate in a predefined coherency protocol with other users of the storage device 118, or the like.

FIG. 8A depicts one embodiment 800 of the first cache 102 and the second cache 112. The depicted embodiment 800 illustrates a portion of a logical address space shared by both the first cache 102 and the second cache 112. As used herein a logical address space shared by two caches means that a given logical address may be mapped to a physical location in both caches. This means that data for a given logical address can exist in one cache or the other cache, or both caches.

The depicted embodiment 800 includes logical addresses 804a-e for the first cache 102 and the second cache 112 and data 810 associated with the logical addresses 804a-e. In the depicted embodiment 800, the logical addresses 804a-e each mirror data 810 between the first cache 102 and the second cache 112.

In the depicted embodiment 800, the first cache 102 and the second cache 112 share a logical address space that includes the set of logical addresses 804a-e. In one embodiment, physical storage capacity of the first cache 102 and the second cache 112 is allocated to a logical address 804 only when the logical address 804 stores data 810, and physical storage capacity of the first cache 102 and the second cache 112 is deallocated when an associated logical address 804 is deallocated, cleared, trimmed, or the like. In a further embodiment, physical storage capacity of the first cache 102 and the second cache 112 is allocated to logical addresses 804 regardless of whether the logical addresses 804 store data 810.

In the depicted embodiment 800, the first cache 102 and the second cache 112 store data 810 from write requests corresponding to the logical addresses 804a-e. The data 810, in the depicted embodiment 800, is mirrored between the first cache 102 and the second cache 112. In one embodiment, the first cache 102 and the second cache 112 store the data 810 corresponding to logical addresses 804a-e redundantly because the storage device 118 does not yet store the data 810 and/or because the trim module 606 has not yet cleared the data 810 from the first cache 102 and/or the second cache 112.

In the depicted embodiment 800, because each of the logical addresses 804a-e stores data 810 that is mirrored between the first cache 102 and the second cache 112, each of the logical addresses 804a-e corresponds to physical storage media 110 of the first cache 102 and the second cache 112 and use storage capacity of both the first cache 102 and the second cache 112. A client, such as the host device 114, in the depicted embodiment 800, can access the data 810 from either the first cache 102 or the second cache 112. If an error occurs in data 810 corresponding to logical addresses 804a-e in either the first cache 102 or the second cache 112, a client, the direct cache module 116, or the like, can retrieve a redundant copy of the data 810 from the other cache 102, 112.

FIG. 8B depicts another embodiment 820 of the first cache 102 and the second cache 112. In the depicted embodiment 820, the storage device 118 stores the data 810 associated with logical addresses 804a-d (e.g. all entries except the last logical address "2187" 804e) and the trim module 606 has cleared the data 810 associated with logical addresses 804a-d from one of the first cache 102 and the second cache 112. Data 810 that the trim module 606 has cleared from a cache 102, 112, in the depicted embodiment 820, is illustrated with diagonal hashing. In the depicted embodiment 820, the data 810 corresponding to logical addresses 804a-d is logically striped between the first cache 102 and the second cache 112 and the data 810 corresponding to logical address 804e is mirrored between the first cache 102 and the second cache 112 (the caches 102, 112 still hold the most current version of the data).

In the depicted embodiment 820, the cache selection module 702 selects odd logical addresses 804 for the trim module 606 to clear data 810 from the first cache 102 and selects even logical addresses 804 for the trim module 606 to clear data 810 from the second cache 112. Once the trim module 606 has cleared data 810 corresponding to one or more odd logical addresses 804 from the first cache 102 and has cleared data 810 corresponding to one or more even logical addresses 804 from the second cache 112, at least a portion of the remaining data 810 is logically striped between the first cache 102 and the second cache 112, and data 810 corresponding to consecutive logical addresses 804 is stored by different caches 102, 112. It should be noted that while the shared address space is logically striped in the depicted embodiment, those of skill in the art recognize that the media of the caches 102, 112 may not be logically striped.

Clearing the data 810 corresponding to logical addresses 804a-d from either the first cache 102 or the second cache 112, in one embodiment, frees storage capacity of the first cache 102 and the second cache 112, as the first cache 102 and the second cache 112 recover physical storage media 110 corresponding to the cleared data 810. In certain embodiments, the caches 102, 112 manage the physical layout of the data on the media and may use a log-based, append protocol that permits for cleared physical media to be reused. Because the trim module 606 clears the data 810 according to a deterministic protocol, the read request module 704, in one embodiment, directs read requests from a client, such as the host device 114, to either the first cache 102 or the second cache 112 based on the deterministic protocol, without first determining whether the first cache 102 or the second cache 112 store data 810 of the read request.

Figure 8C:
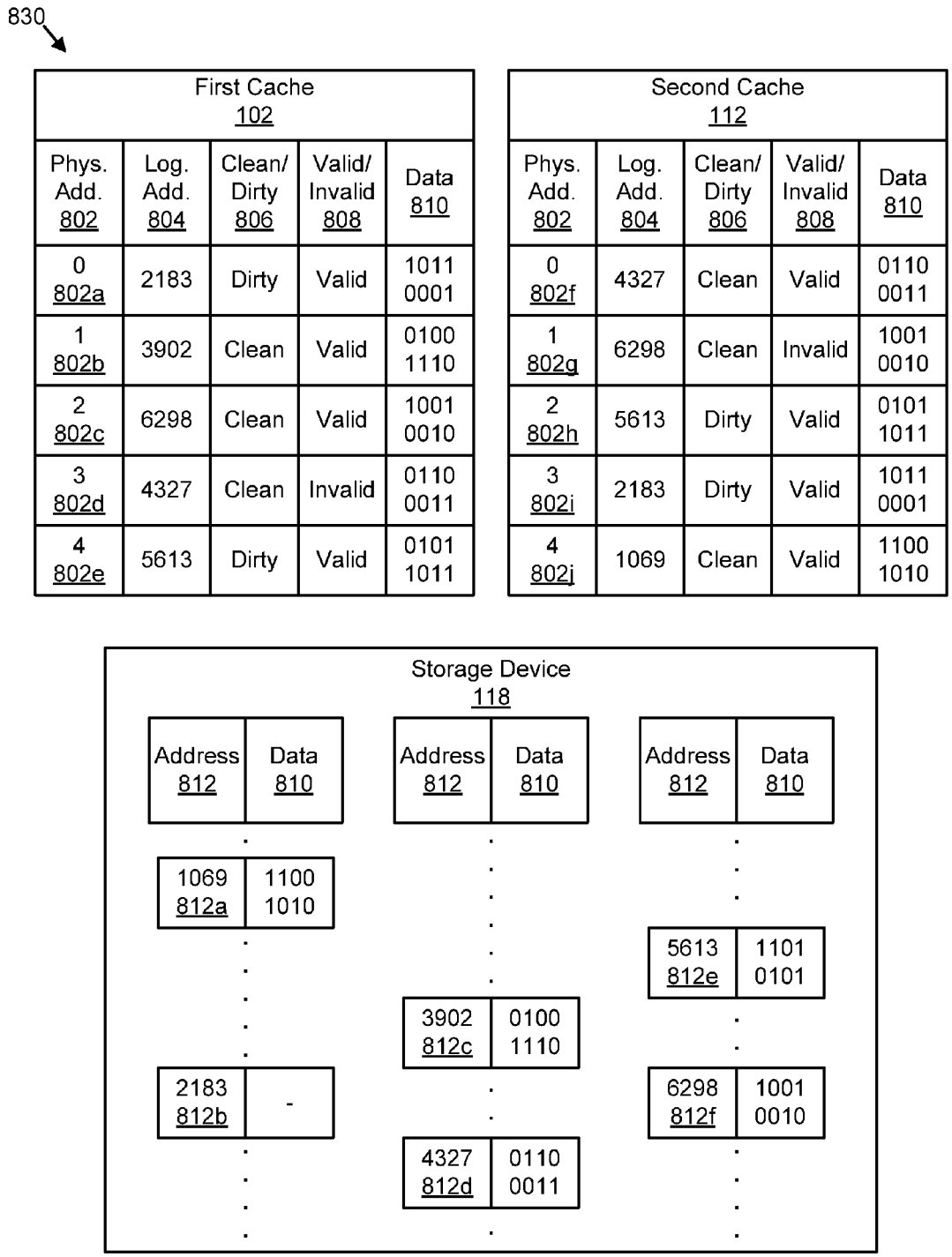
FIG. 8C is a schematic block diagram illustrating one embodiment of a first cache, a second cache, and a storage device in accordance with the present invention.

FIG. 8C depicts one embodiment 830 of the first cache 102, the second cache 112, and the storage device 118. The embodiment 830 depicts a snapshot of a physical layout of data in the first cache 102 and the second cache 112 at a specific moment in time. In the depicted embodiment 830, the first cache 102, the second cache 112, and the storage device 118 are each illustrated with associated data and state information for the data. The state information for the data, including a physical address 802, a logical address 804, a clean/dirty indicator 806, a valid/invalid indicator 808, and a storage device address 812 are depicted for illustration purposes, and may or may not be stored on the first cache 102, the second cache 112, and/or the storage device 118. In various embodiments, the physical addresses 802, the logical addresses 804, the clean/dirty indicators 806, the valid/invalid indicators 808, and the storage device addresses 812 may be stored as metadata by the direct cache module 116 (i.e. in a mapping data structure), determined by the direct cache module 116, or not used by the direct cache module 116.

The depicted embodiment 830 illustrates five example physical addresses 802a-e for the first cache 102 and five example physical addresses 802f-j for the second cache 112. In the depicted embodiment 830, the logical addresses 804 of the first cache 102 and the second cache 112 are part of a shared logical address space used by both the first cache 102 and the second cache 112. The logical addresses 804 of the first cache 102 and the second cache 112, in the depicted embodiment 830, also correspond to the storage device addresses 812 of the storage device 118. The storage device addresses 812 of the storage device 118 may be logical addresses, physical addresses, or the like.

In the depicted embodiment 830, physical address "0" 802a and physical address "4" 802e of the first cache 102 store data 810 that is dirty and valid. The data 810 stored in physical address "0" 802a and physical address "4" 802e of the first cache 102 is mirrored in the second cache 112 at physical address "3" 802i and physical address "2" 802h. While the mirrored data 810 stored in both the first cache 102 and the second cache 112 has different physical addresses 802, the logical addresses 804 of mirrored data 810 are identical in the depicted embodiment 830. Because the data stored in the first cache 102 at physical address "0" 802a and physical address "4" 802e and in the second cache 112 at physical address "3" 802i and physical address "2" 802h is dirty and has not yet been stored in the storage device 118 by the cleaner module 702, the data 810 in corresponding storage device address "2183" 812b and storage device address "5613" 812e is different than the data 810 in the first and second caches 102, 112. The data 810 at storage device address "2183" 812b is null, or empty, and the data 810 at storage device address "5613" 812e is different than the data in the first cache 102 and the second cache 112.

The remaining data 810 in the first cache 102 and the second cache 112, in the depicted embodiment 830, is clean because the storage device 118 stores the remaining data 810. In the depicted embodiment 830, the cache selection module 702 has assigned the first cache 102 to store data 810 for even logical addresses 804 and assigned the second cache 112 to store data 810 for odd logical addresses 804. Because, in the depicted embodiment 830, the cache selection module 702 uses an even/odd deterministic protocol, the trim module 605 clears data 810 corresponding to odd logical addresses 804 from the first cache 102 and clears data 810 corresponding to even logical addresses 804 from the second cache 112.

Physical address "1" 802b of the first cache 102 stores data 810 that is clean and valid, and that is not mirrored to the second cache 112. The data 810 at physical address "1" 802b of the first cache 102 may be cached read data, written to the first cache 102 by the read retrieve module 720, or may be cached write data that the cleaner module 708 has previously written to the storage device 118 and that the trim module 606 has already cleared from the second cache 112. The data 810 at physical address "1" 802b of the first cache 102 matches corresponding data 810 stored at storage device address "3902" 812c because the data 810 is clean. The logical address 804 of "3902" corresponding to physical address "1" 802b of the first cache 102 is even.

In the depicted embodiment 830, the logical address 804 of "4327" associated with the data 810 of physical address "3" 802d of the first cache 102 is odd. Because of the odd logical address 804, the trim module 606, in the depicted embodiment 830, marked the data 810 stored at physical address "3" 802d of the first cache 102 as invalid. Although invalid, the physical address "3" 802d of the first cache 102 still stores the data 810 because the cleaner module 708 has not yet recovered the physical storage media of physical address "3" 802d in the depicted embodiment 830. The logical address 804 of "4327" associated with the data 810 of physical address "0" 802f of the second cache 102 is both clean and valid and available to service any read requests for logical address "4327."

Similarly, the data 810 stored at physical address "1" 802g of the second cache 112 is clean and invalid because the trim module 606 cleared or trimmed the data 810 from physical address "1" 802g of the second cache 112 because the storage device 118 stores corresponding data 810 at storage device address "6298" 812f, and the logical address 804 of "6298" that corresponds to physical address "1" 802g is even. The data 810 that has been marked invalid at physical address "1" 802g of the second cache 112 is cached in physical address "2" 802c of the first cache 102 to service read requests. Physical address "0" 802f and physical address "4" 802j of the second cache 112 store clean and valid data 810 with odd logical addresses 804 that the storage device 118 also stores at storage device address "4327" 812d and storage device address "1069" 812a to service read requests. As described above, data 810 of physical address "0" 802f of the second cache 112 is still mirrored in physical address "3" 802d of the first cache 102 because the cleaner module 708 has not yet recovered the physical storage media of physical address "3" 802d.

In one embodiment, the cleaner module 708 does not track the clean/dirty indicator 806, but determines the clean or dirty state of data 810 based on whether the data 810 is stored in both the first cache 102 and the second cache 112 or just in one of the caches 102, 112. If both the first cache 102 and the second cache 112 store data 810 corresponding to a logical address 804, in one embodiment, the data 810 is known to be dirty. If only one of the first cache 102 and the second cache 112 stores data 810 corresponding to a logical address 804, in one embodiment, the data 810 is known to be clean, in part due to the way redundancy and capacity are balanced between the first cache 102 and the second cache 112.

The cleaner module 708, in one embodiment, may query both the first cache 102 and the second cache 112 with a logical address 804 to determine whether data 810 corresponding to the logical address 804 is clean or dirty (i.e.

whether or not both caches 102, 112 store the data 810). In a further embodiment, the cleaner module 708 may query a single cache 102, 112 based on a deterministic protocol used by the deterministic protocol module 714, and if the selected cache 102, 112 does not store the data 810 (or the data 810 is invalid), then the data 810 is clean. If the selected cache 102, 112 does store the data 810 (and the data is valid), in one embodiment, the data 810 is dirty because the trim module 606 has not yet cleared or trimmed the data 810 from the selected cache 102, 112 in response to the storage device 118 storing the data. In a further embodiment, the cleaner module 708 may refer to a mapping data structure, such as a logical to physical mapping, a mapping maintained by the cache selection module 702, or the like to determine whether data 810 corresponding to a logical address 804 is clean or dirty.

Flow Charts

Figure 9:
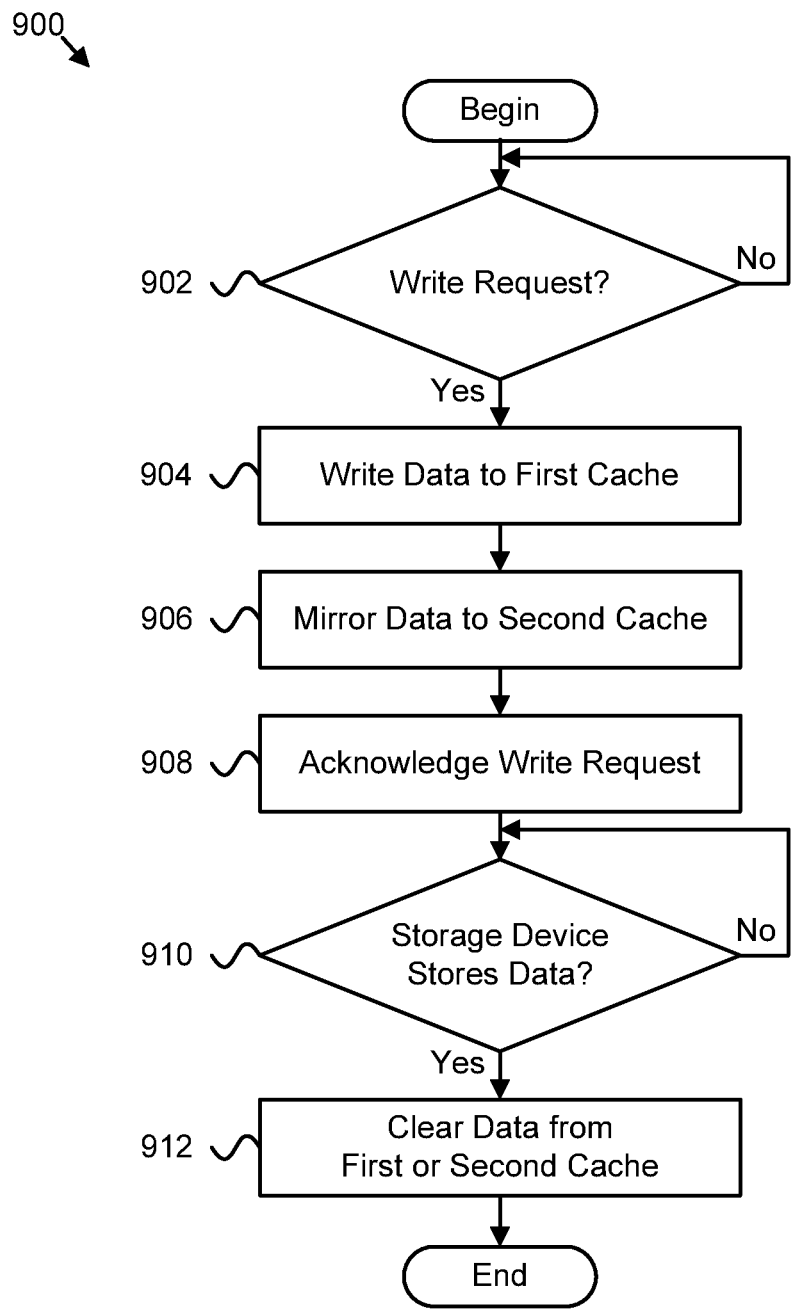
FIG. 9 is a schematic flow chart diagram illustrating one embodiment of a method for redundant write caching in accordance with the present invention.

FIG. 9 depicts one embodiment of a method 900 for redundant write caching. The method 900 begins, and the write request module 602 detects 902 (or receives) a write request from a requesting entity, such as the host device 114, to store data on the storage device 118. If the write request module 602 does not detect 902 a write request, in the depicted embodiment, the write request module 602 continues to monitor for subsequent write requests.

In response to the write request module 602 detecting 902 a write request, the cache write module 604 writes 904 the data of the write request to a first cache 102 and the cache write module 604 mirrors 906 the data to the second cache 112. The write acknowledgement module 706, in the depicted embodiment, acknowledges 908 persistence of the write request 908 to the requesting entity, such as the host device 114.

The trim module 606 determines 910 whether or not the storage device 118 stores the data of the write request. The trim module 606, in various embodiments, may determine 910 whether the storage device 118 stores the data based on an indicator from the cleaner module 708, by scanning the storage device 118 for the data, by querying the storage device 118 for the data, by checking a status of an indicator in a clean/dirty data structure that the cleaner module 706 maintains, or the like. In response to an indicator that the storage device 118 stores the data of the write request, the trim module 606 clears 912 the data of the write request from one of the first cache 102 and the second cache 112 based on a selection by the cache selection module 702 and the method 900 ends. If the trim module 606 determines 910 that the storage device 118 does not store the data of the write request, the trim module 606 continues to check to determine 910 whether or not the storage device 118 stores the data. Subsequent to each determination 910 the trim module 606 may pause for a period of time.

Figure 10:
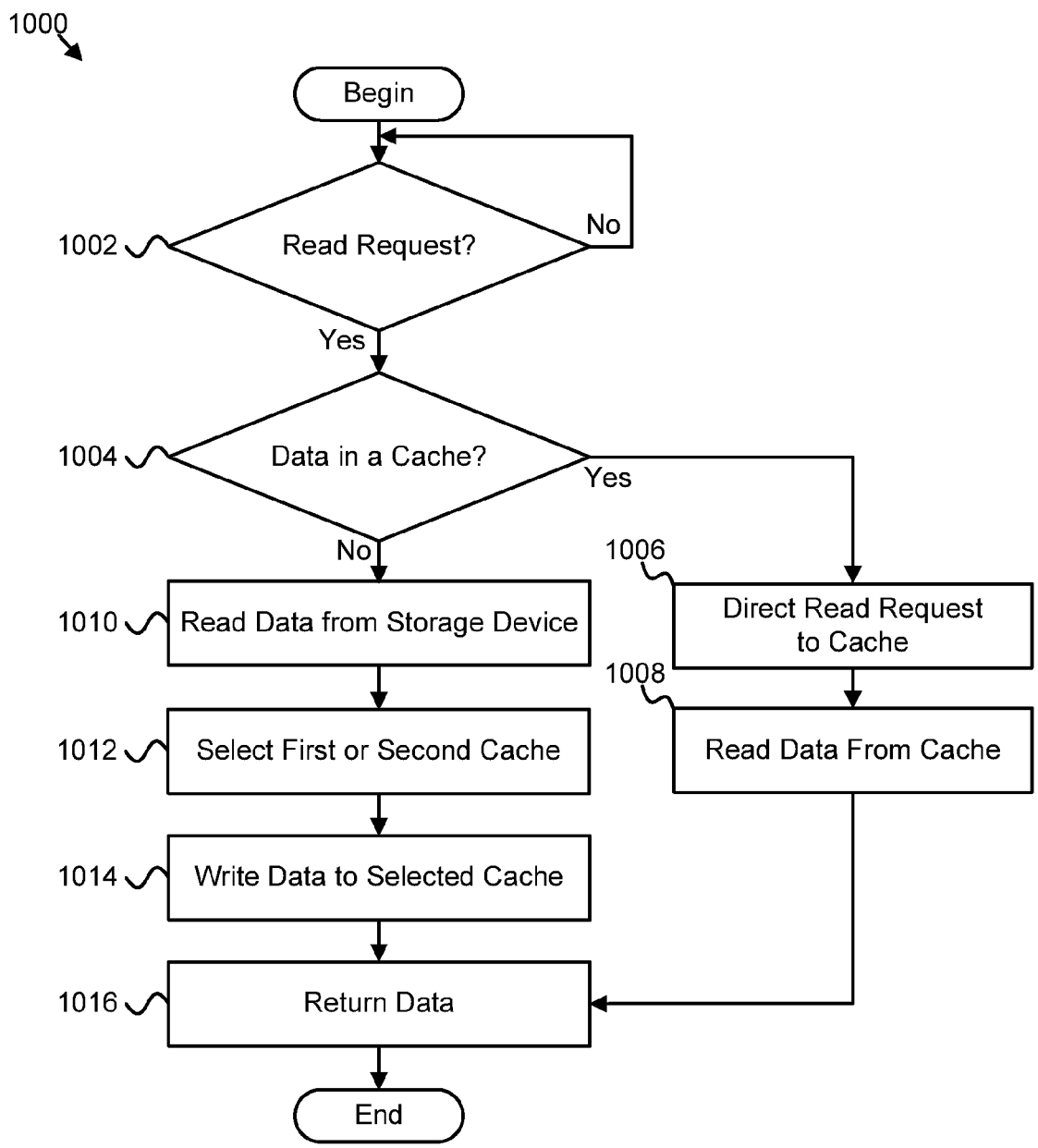
FIG. 10 is a schematic flow chart diagram illustrating one embodiment of a method for read caching in accordance with the present invention.

FIG. 10 depicts one embodiment of a method 1000 for read caching. The method 1000 begins, and the read request module 704 detects 1002 (or receives) a read request from a requesting entity, such as the host device 114, to retrieve requested data from the storage device 118. If the read request module 704 does not detect 1002 a read request, in the depicted embodiment, the read request module 704 continues to detect 1002 subsequent read requests.

In response to the read request module 704 detecting 1002 a read request, the read miss module 704 determines 1004 whether one or more of the first cache 102 and the second cache 112 store the data of the read request. The read miss module 704 may direct the read request to both caches 102, 112, to one of the caches 102, 104 based on a deterministic protocol, may query one or both of the caches 102, 112, or the like to determine 1004 whether one or more of the caches 102, 112 store the data of the read request.

If the read miss module 718 determines 1004 that one of the caches 102, 112 stores the data of the read request, the read request module 704 directs 1006 the read request to the determined cache 102, 112, and the read request module 704 reads 1004 the data of the read request from the determined cache 102, 112. The read request module 704 (or the determined cache 102, 112 itself) returns 1016 the data of the read request to the requesting entity and the method 1000 ends.

If the read miss module 718 determines 1004 that neither of the caches 102, 112 store the data of the read request (i.e. that there is a cache miss), the read request module 704 reads 1010 the data of the read request from the storage device 118. The cache selection module 702 selects 1012 one of the first cache 102 and the second cache 112, using the deterministic protocol module 714, the cache attribute module 716, or the like. The read request module 704 writes 1014 the data of the read request to the selected cache 102, 112. The read request module 704 returns 1016 the data of the read request to the requesting entity and the method 1000 ends.

Figure 11:
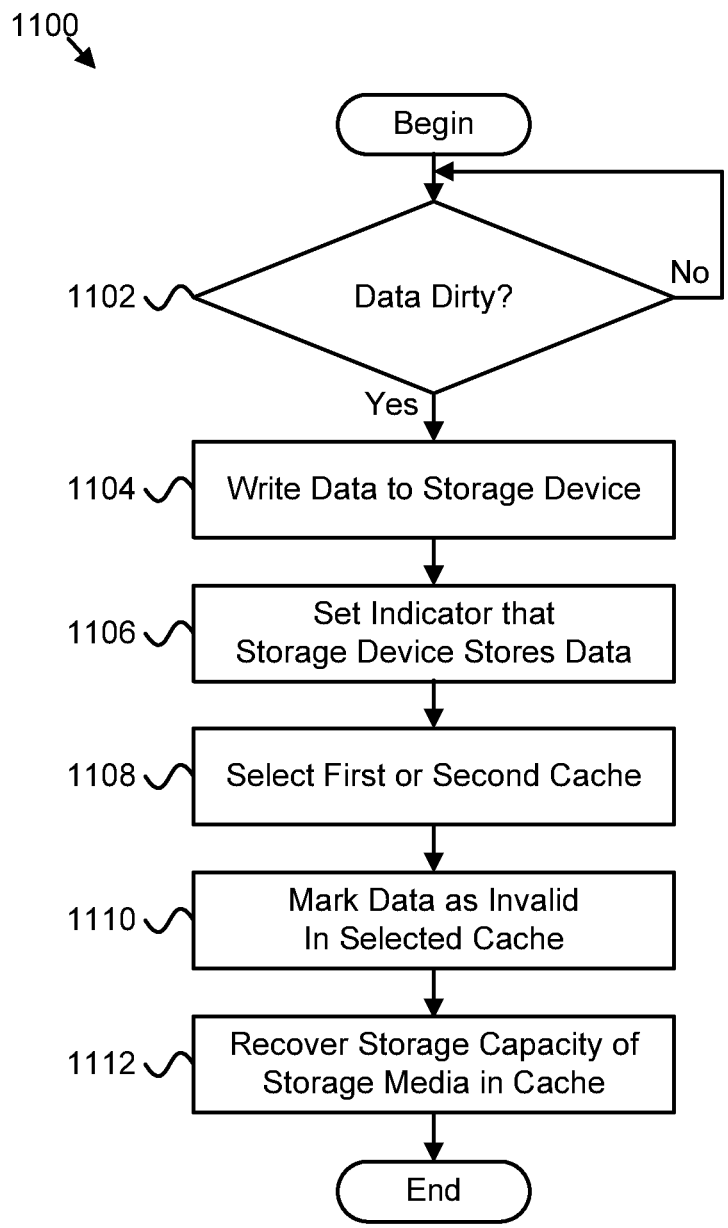
FIG. 11 is a schematic flow chart diagram illustrating one embodiment of a method for cleaning a cache in accordance with the present invention.

FIG. 11 depicts one embodiment of a method 1100 for cleaning a cache 102, 112. The cleaner module 708 determines 1102 whether data in a cache 102, 112 is dirty and not yet stored in the storage device 118. The data, in various embodiments, may correspond to a specific logical address, to a write request, or the like. The cleaner module 708, in one embodiment, determines 1102 that the data is dirty based on a clean/dirty indicator 806 corresponding to the data. In a further embodiment, the cleaner module 708 determines 1102 that the data is dirty based on whether both the first cache 102 and the second cache 112 store the data. If the cleaner module 708 determines 1102 that data is clean and not dirty, the cleaner module 708, in the depicted embodiment, continues to determine 1102 whether different data is dirty, such as data corresponding to a different logical address, to a different write request, or the like.

If the cleaner module 708 determines 1102 that the data is dirty, the cleaner module 708 writes 1104 the data to the storage device 118. The cleaner module 708 sets 1106 an indicator that the storage device 118 stores the data. The cleaner module 708 may set 1106 the indicator by marking the data as clean in one or both of the caches 102, 112, by communicating that the data is clean to the trim module 606, or the like. The cache selection module 702 selects 1108 one of the first cache 102 and the second cache 112 using the deterministic protocol module 714, the cache attribute module 716, or the like. The trim module 606 marks 1110 the data as invalid in the selected cache 102, 112, or otherwise clears or trims the data from the selected cache 102, 112. The garbage collection module 710 recovers 1112 storage capacity of the physical storage media corresponding to the data in the selected 1108 cache 102, 112 and the method 1100 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for write caching, the apparatus comprising:

a write request module that is configured to receive a write request to store data on a non-volatile storage device;

a first cache write module that is configured to cache data of the write request to a first non-volatile solid-state storage cache;

a second cache write module that is configured to cache the data to a second non-volatile solid-state storage cache; and a trim module that is configured to trim the data from one of the first non-volatile solid-state storage cache and the second non-volatile solid-state storage cache in response to an indicator that the non-volatile storage device stores the data, such that the data remains available in the other of the first non-volatile solid-state storage cache and the second non-volatile solid-state storage cache to service read requests.

2. The apparatus of claim 1, further comprising, a cache selection module that selects the first non-volatile solid-state storage cache, wherein the trim module trims the data from the first non-volatile solid-state storage cache in response to the cache selection module selecting the first non-volatile solid-state storage cache; and a read request module that directs a subsequent read request for the data to the second non-volatile solid-state storage cache.

3. The apparatus of claim 1, further comprising a write acknowledgement module that acknowledges the write request in response to both the first cache write module storing the data to the first non-volatile solid-state storage cache and the second cache write module storing the data to the second non-volatile solid-state storage cache.

4. The apparatus of claim 1, wherein the storage device, the first cache, and the second cache each comprise a block storage interface.

5. The apparatus of claim 1, wherein the first non-volatile solid-state storage cache comprises a direct attached storage (DAS) device associated with the host device and the second non-volatile solid-state storage cache comprises an external device that is not directly associated with the host device.

6. A method for write caching, the method comprising:
detecting a write request to store data on a storage device;
writing data of the write request to a first cache;
mirroring the data to a second cache; and
clearing the data from one of the first cache and the second cache in response to an indicator that the storage device stores the data, such that the data remains available in the other of the first cache and the second cache to service read requests.

7. The method of claim 6, further comprising selecting one of the first cache and the second cache according to a deterministic protocol, wherein the data is cleared in the selected one of the first cache and the second cache.

8. The method of claim 7, wherein the first cache and the second cache share a logical address space that is directly mapped to distinct physical addresses on the first cache and the second cache.

9. The method of claim 8, wherein the deterministic protocol is based on a logical address associated with the write request within the logical address space and further wherein the deterministic protocol logically stripes data between the first cache and the second cache by alternating selection of the first cache and the second cache for consecutive logical addresses such that a portion of the logical address space is assigned to the first cache and a portion of the logical address space is assigned to the second cache.

10. The method of claim 7, further comprising directing, based on the deterministic protocol, a read request for the data to the other of the first cache and the second cache that is not selected.

11. The method of claim 7, further comprising,
detecting a read request to retrieve requested data from the storage device;
determining that the requested data is not stored in either of the first cache and the second cache; and
writing the requested data to one of the first cache and the second cache according to the deterministic protocol in response to detecting that the requested data is not stored in either of the first cache and the second cache.

12. The method of claim 6, further comprising acknowledging the write request in response to writing the data to the first cache.

13. The method of claim 6, further comprising selecting one of the first cache and the second cache based on one or more cache attributes, wherein the data is cleared in the selected one of the first cache and the second cache.

14. The method of claim 6, further comprising,
reading the data from one of the first cache and the second cache;
writing the data to the storage device; and
setting the indicator that the storage device stores the data in response to successfully writing the data to the storage device.

15. The method of claim 6, wherein clearing the data in one of the first cache and the second cache is in response to a predefined event occurring after setting the indicator that the storage device stores the data.

16. The method of claim 6, further comprising,
detecting a replacement of one of the first cache and the second cache with a replacement cache; and
mirroring dirty data from a remaining one of the first cache and the second cache to the replacement cache, the dirty data comprising data that is not stored on the storage device.

17. A non-transitory storage medium comprising machine-readable instructions configured to cause a machine to perform a method for write caching, the method comprising:
identifying a write request to store data on a non-volatile storage device, the write request comprising data not stored on the storage device;
storing data of the write request to a first non-volatile solid-state storage cache;
storing the data of the write request to a second non-volatile solid-state storage cache;
selecting one of the first non-volatile solid-state storage cache and the second non-volatile solid-state storage cache according to a deterministic protocol; and
noting that the data on the selected one of the first non-volatile solid-state storage cache and the second non-volatile solid-state storage cache can be erased in response to an indicator that the non-volatile storage device stores the data, such that the data of the write request remains available in the unselected one of the first non-volatile solid-state storage cache and the second non-volatile solid-state storage cache to service read requests.

18. The storage medium of claim 17, further comprising,
determining that both the first non-volatile solid-state storage cache and the second non-volatile solid-state storage cache store the data;
persisting the data to the storage device in response to determining that both the first non-volatile solid-state storage cache and the second non-volatile solid-state storage cache store the data; and
setting the indicator that the storage device stores the data in response to persisting the data to the storage device.

19. The storage medium of claim 17, wherein noting that the data can be erased comprises sending a TRIM command to the selected one of the first non-volatile solid-state storage cache and the second non-volatile solid-state storage cache, the TRIM command comprising an address for the data, wherein the first non-volatile solid-state storage cache is selected in response to a value for the address for the data being odd and the second non-volatile solid-state storage cache is selected in response to a value for the address for the data being even.

20. The storage medium of claim 17, wherein noting that the data can be erased comprises marking the data as invalid on the selected one of the first non-volatile solid-state storage cache and the second non-volatile solid-state storage cache, wherein the selected one of the first non-volatile solid-state storage cache and the second non-volatile solid-state storage cache recovers storage capacity of physical storage media corresponding to the data in response to marking the data as invalid.

* * * * *